United States Patent [19]

Fujisawa et al.

[11] Patent Number: 5,242,210
[45] Date of Patent: Sep. 7, 1993

[54] CONTROL APPARATUS FOR OPENING OR CLOSING ROOF OF A VEHICLE

[75] Inventors: Takashi Fujisawa; Seiji Okada; Mikiharu Itoh; Nobue Kawauchi, all of Hiroshima, Japan

[73] Assignee: Mazda Motor Corporation, Hiroshima, Japan

[21] Appl. No.: 772,130

[22] Filed: Oct. 9, 1991

Related U.S. Application Data

[63] Continuation of Ser. No. 601,104, Oct. 22, 1990, abandoned, which is a continuation-in-part of Ser. No. 497,656, Mar. 23, 1990, abandoned.

[30] Foreign Application Priority Data

Mar. 24, 1989 [JP] Japan ................. 1-72779

[51] Int. Cl.⁵ ............................. B60J 7/06
[52] U.S. Cl. .................... 296/219; 296/223; 364/424.05
[58] Field of Search .............. 296/219, 223; 364/424.05

[56] References Cited

U.S. PATENT DOCUMENTS

| 4,644,235 | 2/1987 | Ohta | 296/117 X |
| 4,700,982 | 10/1987 | Kuraoka et al. | 296/107 |
| 5,018,784 | 5/1991 | Yokouchi et al. | 296/219 |
| 5,052,747 | 10/1991 | Kubota et al. | 296/219 |

FOREIGN PATENT DOCUMENTS

| 0353695 | 2/1990 | European Pat. Off. | 296/219 |
| 1-71323 | 7/1990 | Japan | 296/219 |

Primary Examiner—Dennis H. Pedder
Attorney, Agent, or Firm—Fish & Richardson

[57] ABSTRACT

A roof panel connected to a vehicle body through at least a pair of front pillars and a pair of rear pillars is provided with a large aperture on the roof with a front header and a pair of roof side rails. A rear window glass panel is fixed to the rear pillars and the rear header. A flexible top is contractible or expandable in a longitudinal direction of the vehicle and disposed so as to uncover or cover the roof aperture. When the flexible top closes the roof aperture, it is abutted at its front end portion with the front header, at its side end portions with the roof side rails, and at its rear end portion with the rear header. When the top is in a folded state, it is located in a second posture nearby the trunk lid. The top can be transferred up to its third posture in a position nearby a lower end portion of the rear window glass panel. Vertical movement of the top at least between the second and third postures can automatically be performed by a control unit in condition where the vehicle halts. The vertical movement of the top can be continued when the vehicle is shifted to its running state in the course of a transfer thereof between the second and third postures, thereby ensuring a transfer to the second posture or to the third posture.

11 Claims, 38 Drawing Sheets

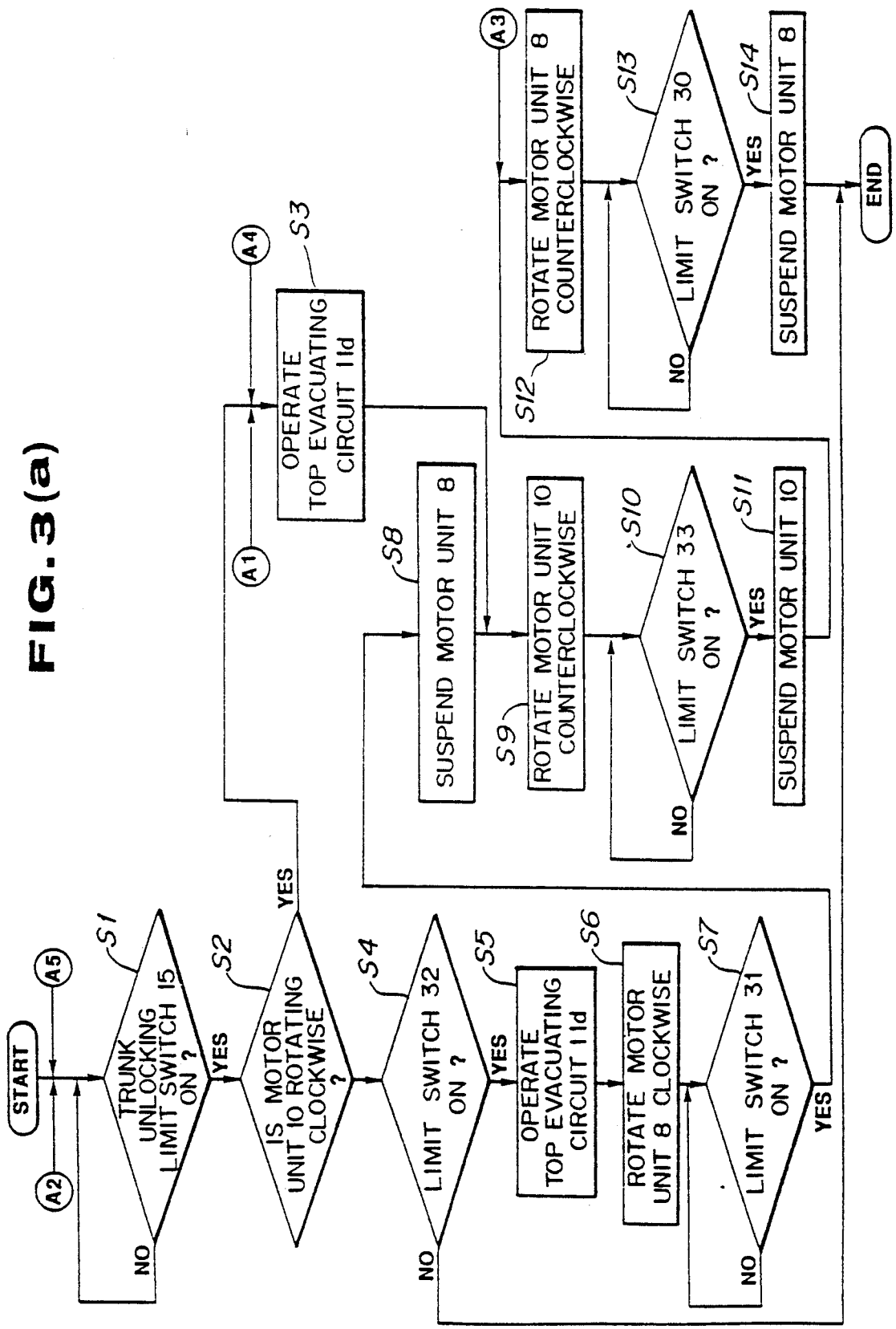

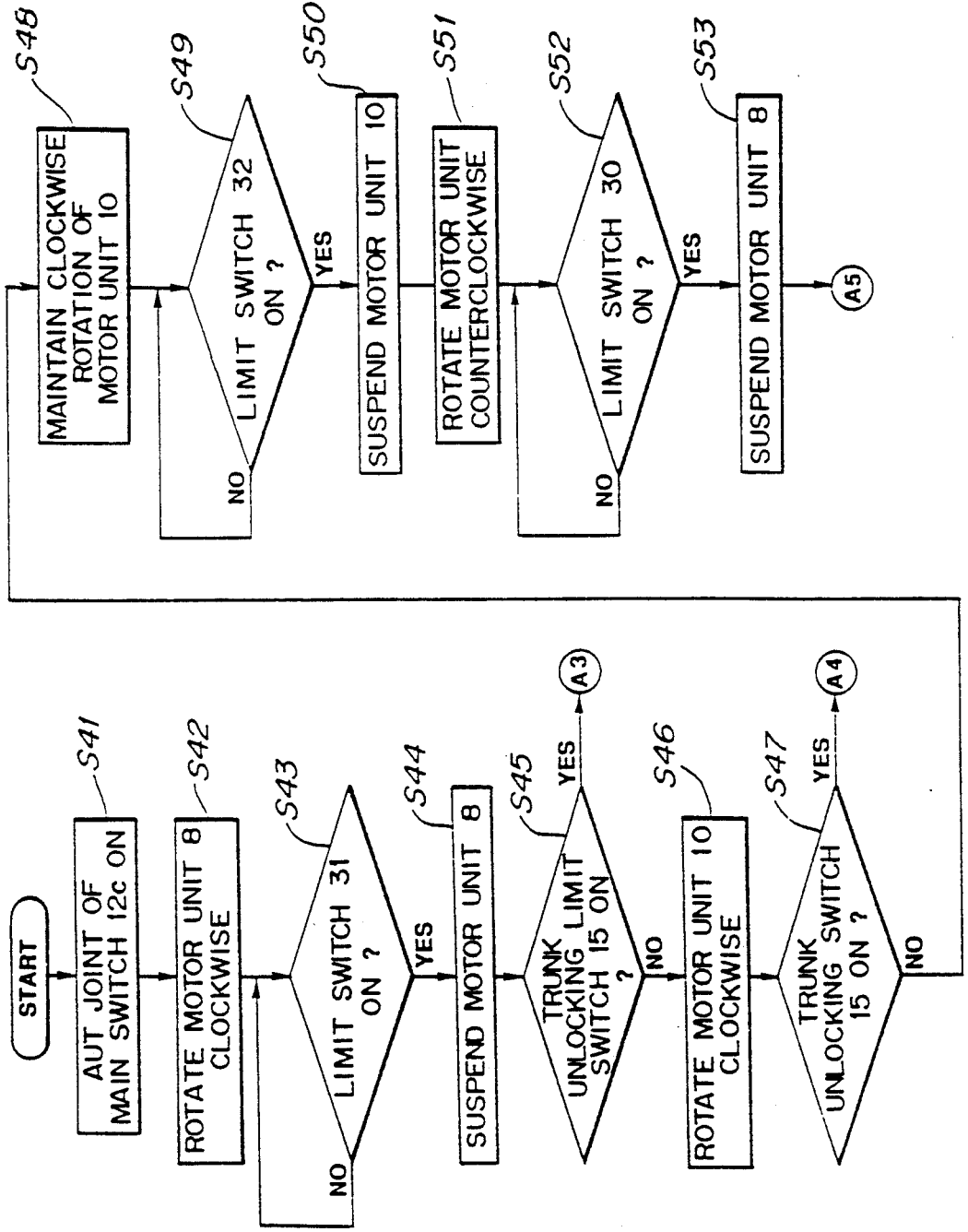

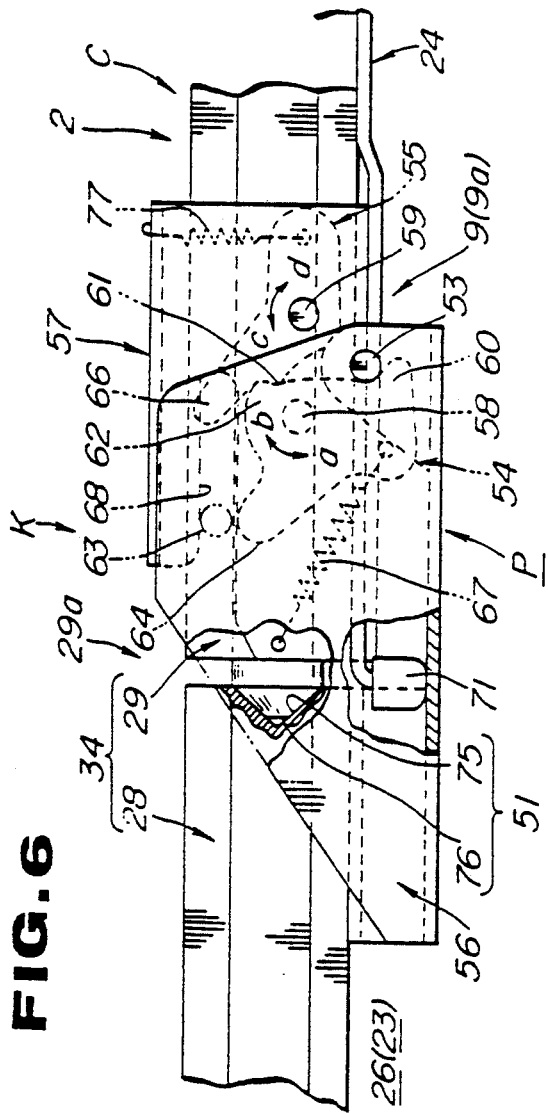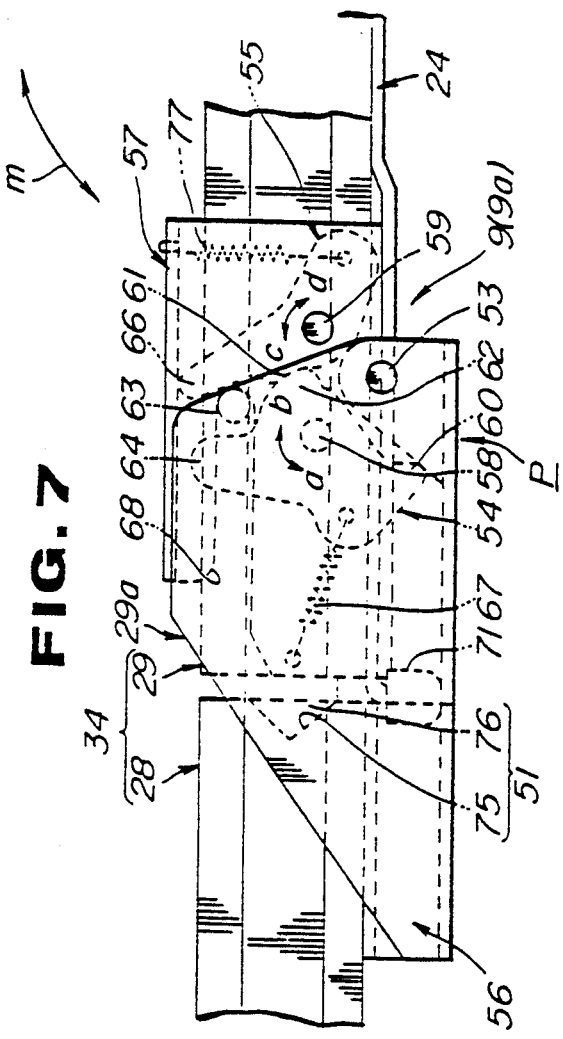

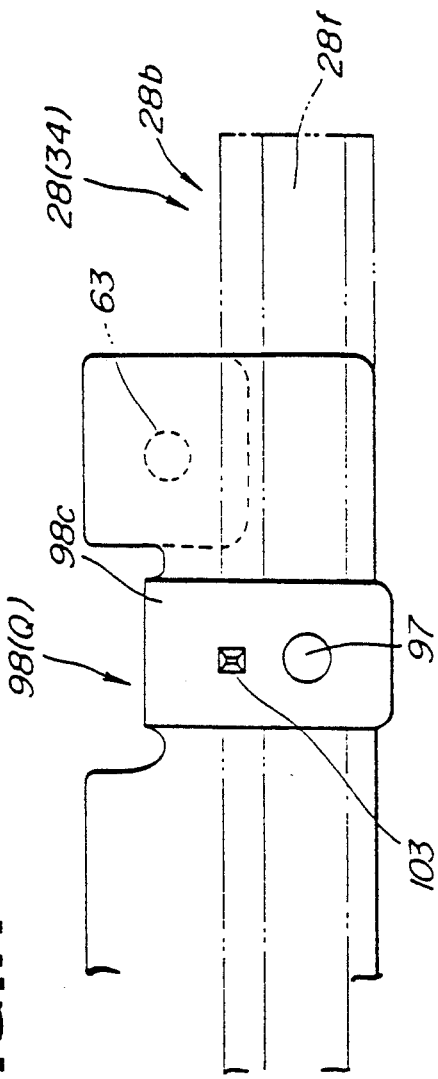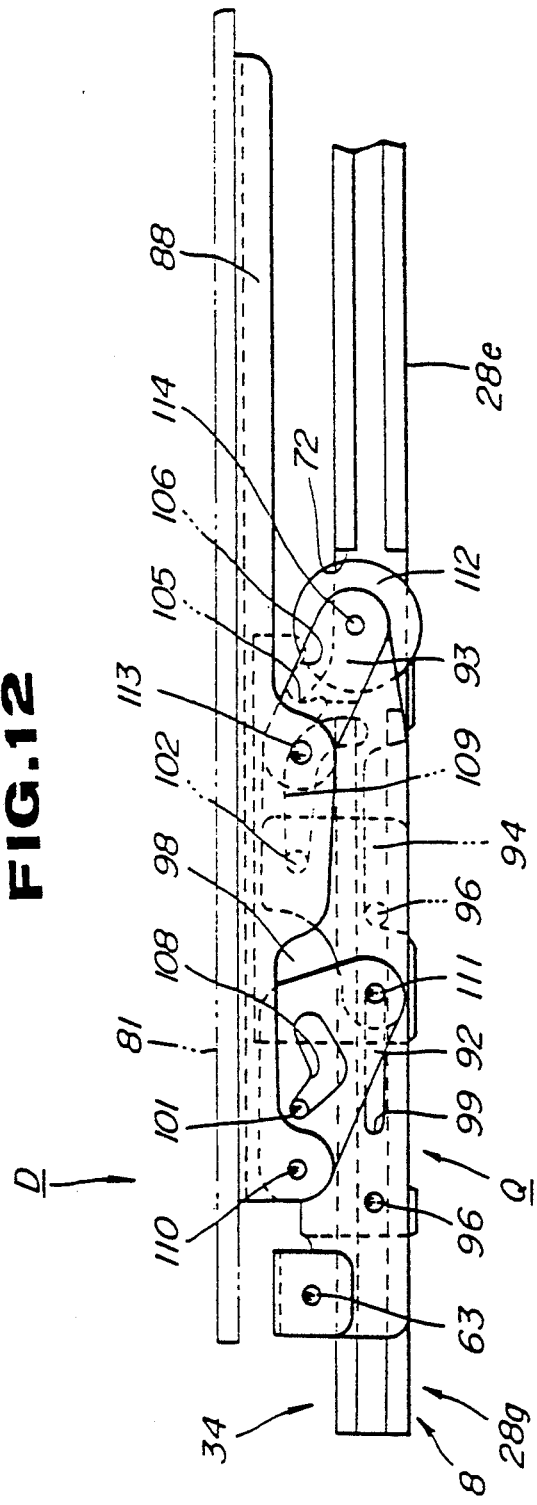

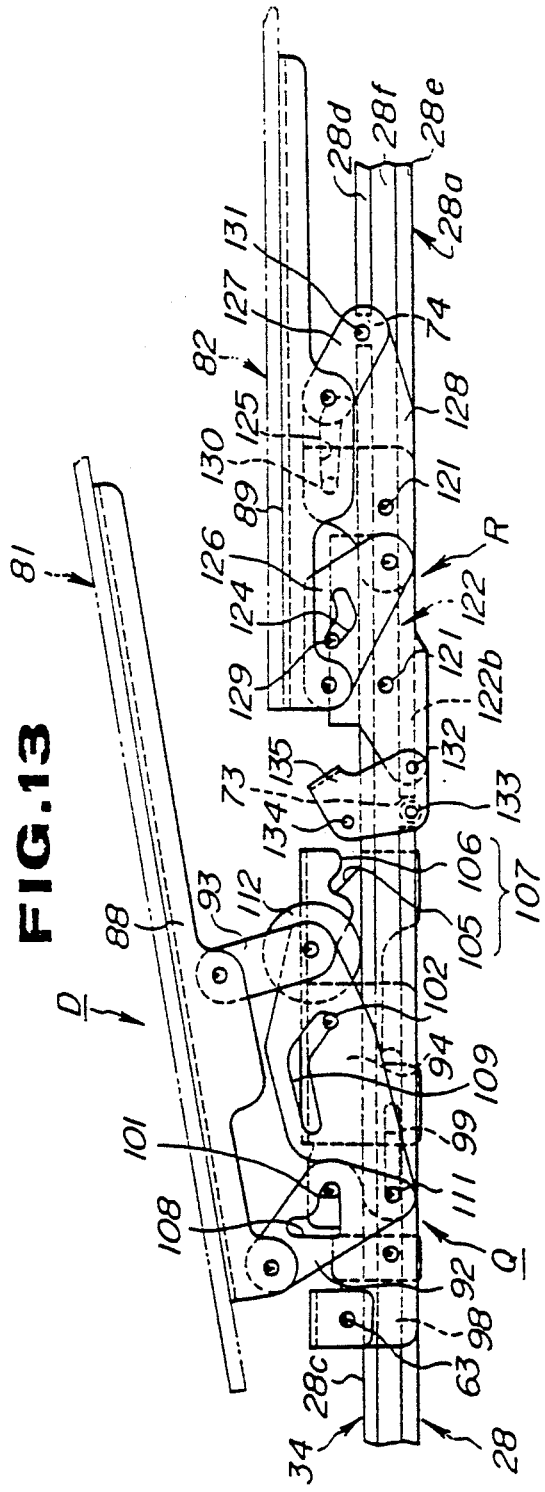
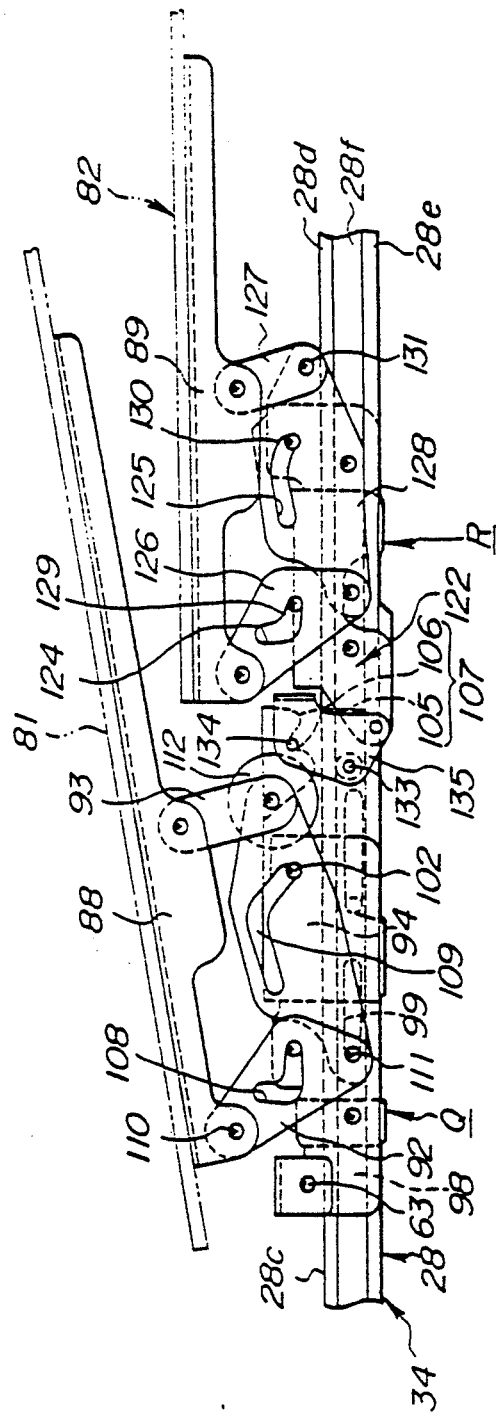

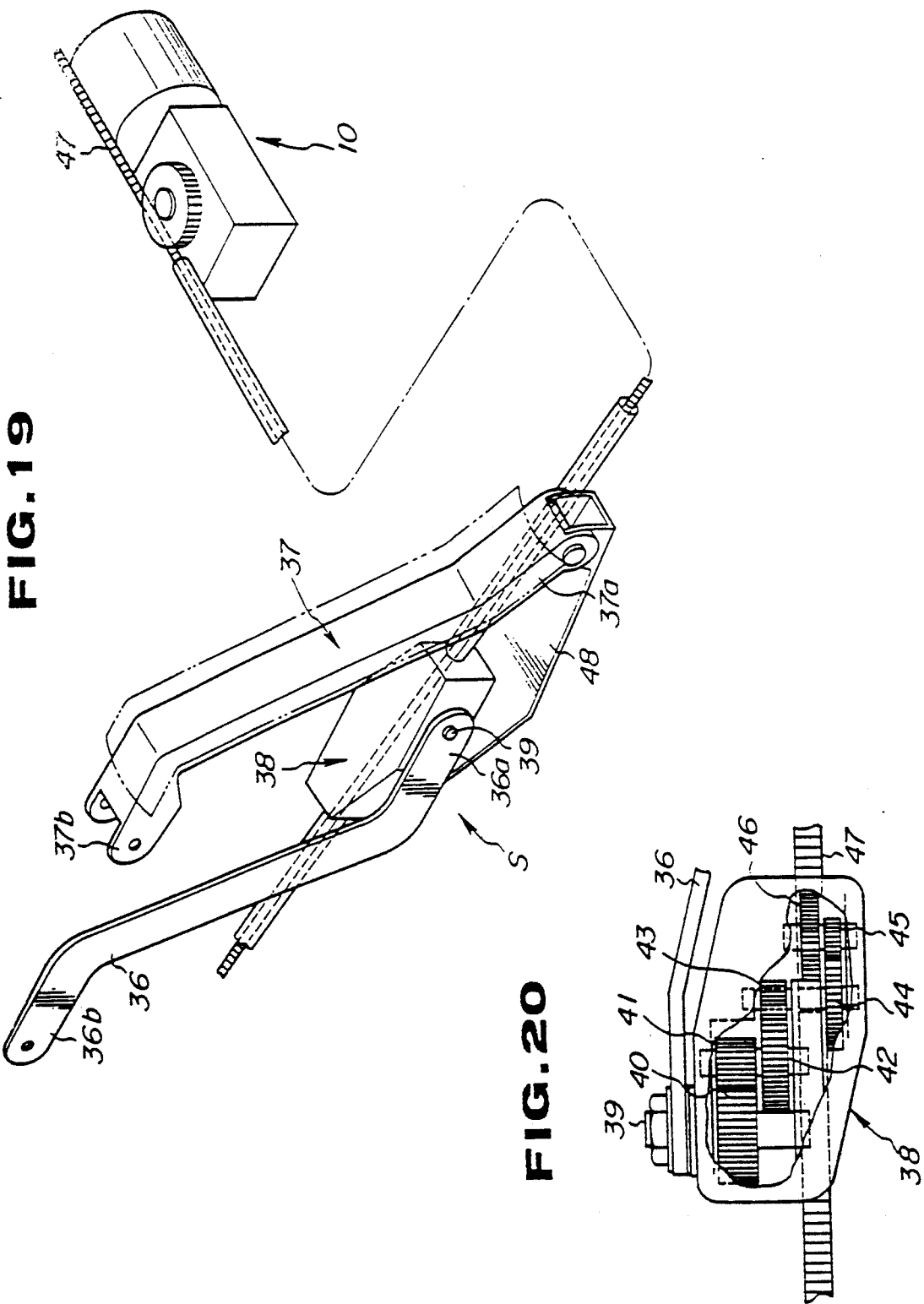

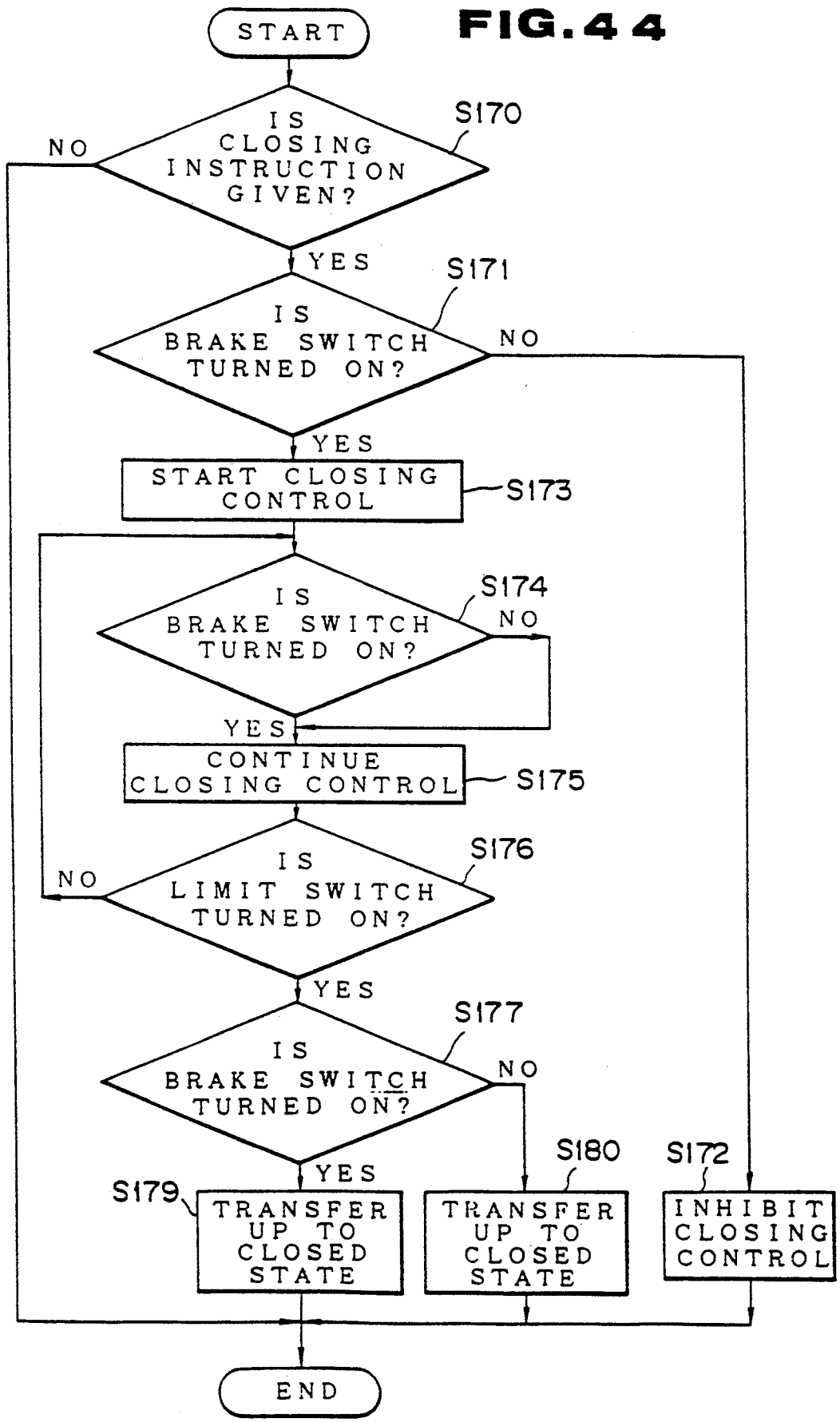

CONTROL APPARATUS FOR OPENING OR CLOSING ROOF OF A VEHICLE

This application is a continuation of U.S. application Ser. No. 07/601,104, filed Oct. 22, 1990, now abandoned, which is a CIP of U.S. application Ser. No. 07/497,656, filed Mar. 23, 1990, now abandoned.

BACKGROUND OF THE INVENTION

1. Field of the Invention

The present invention relates to a control apparatus for opening or closing the roof of a vehicle, as an automobile.

2. Description of Related Art

There is an automobile in which an upper portion of the vehicle chamber is open to thereby enjoy open air. The automobile of the open air type requires a member for covering its vehicle chamber to be used when required or needed as when it rains. As such a member may be used an expandable and contractible, flexible sheet, or a flexible top.

Representative of such an automobile is one of full open type, which may be called a Cabriole type. An automobile of full open type as disclosed in U.S. Pat. No. 4,572,570 is basically of a type designed to allow an upper portion and a rearward upper portion of its vehicle chamber are fully open. More specifically, the automobile is provided with a front window glass panel, but no rear pillar is provided which is otherwise required in order to support the roof panel and a rearward end portion of the roof panel. Although the automobile of fully open type presents the advantage that its vehicle chamber can be widely open, it poses various difficulties at the same time that a rigidity of the vehicle body is hardly ensured because neither roof panel nor rear pillar are mounted, that the flexible top should be constructed in such a shape as covering the rearward upper portion of the vehicle chamber as well as the upper portion thereof when it is brought into a closed state, thus complicating its structure, and that sealing performance of the flexible top is poor when it closes the vehicle chamber.

There is accordingly the increasing tendency that an automobile of a flexible top type which may be called of a canvas top type, as shown in U.K. Patent Specification No. 1,315,364. The automobile of flexible top type or canvas top type is such that only an aperture formed on a roof panel—such an aperture being referred to herein as "roof aperture"—is covered (closed) or uncovered (opened) with a flexible sheet so that this type may called a flexible top or a so-called flexible roof. The automobile of this flexible top type is provided with a roof panel having a wide aperture, or roof aperture, connected to the vehicle body at least through front and rear pillars in such a manner that the roof panel opening is closed or opened with the flexible top. More specifically, the roof panel is of the type such that its whole middle portion is wide open as a roof aperture except for its front header, a pair of its left-hand and right-hand side rails, and its rear header. In other words, the front and rear headers and the side rails constitute a four-sided periphery of the roof aperture and a front window glass panel is fixed with a pair of the left-hand and right-hand front pillars and the front header while a rear window glass panel is fixed with a pair of the left-hand and right-hand rear pillars and the rear header.

As the flexible top is in a closed state in which it fully closes the roof panel opening, the flexible top is designed such that its forward end is brought into abutment with the front header of the roof panel, its left-hand and right-hand side end portions are in abutment with the left-hand and right-hand roof side rails, and its rearward end is abutted with the rear header. This arrangement ensures a rigidity of the vehicle body to a sufficient extent because a framework of an upper circumference of the vehicle chamber is constituted by the left-hand and right-hand front pillars, front header, left-hand and right-hand roof side rails as well rear header, such members being connected to each other. This structure further provides the advantage that it is simple because the flexible top is designed simply to open or close the roof panel opening. Furthermore, it presents the advantage that most common automobiles with a roof panel supported with front and rear pillars can be converted to those of flexible top type by small modifications. For the above reasons, recently, there is the tendency that automobiles of flexible top type have proliferated.

The automobile of flexible top type is designed so as to take a closed posture, or to become in a closed state, in which the roof panel opening is closed by fixing a rearward end portion of the flexible top to the rear header while abutting a forward end portion of the top with the front header, on the one hand, and so as to take an open posture, or to become in an open state, in which the roof panel opening is wide open by transferring the forward end portion of the top rearwards to a great extent from the closed posture toward the rear header. At this open posture, the flexible top is housed or accommodated in a contracted state.

For the automobiles of conventionally flexible top type, however, the flexible top in a housed state is still extended wide in a longitudinal direction so that it covers over a considerably large portion of the roof panel opening, thus impairing a sufficiently open feeling. It is further to be noted that, as the roof panel opening is open while the flexible top is housed, the flexible top is in a state that it projects upwardly to a considerable extent, thus resisting air during running so that it increases a resistance to air and it causes running noises derived from wind blowing.

U.S. Pat. No. 3,357,738 discloses a flexible top of an automobile, which is housed in a position rearward and downward of its rear window. U.S. Pat. No. 2,985,483 discloses a flexible top of an automobile, which can be driven by an electrically-driven motor as a driving source and housed in a position downward of its rear window. Furthermore, U.S. Pat. No. 3,823,977 discloses the structure which involves connecting a flexible top to the vehicle body with a link member and placing the flexible top on the trunk lid.

SUMMARY OF THE INVENTION

The present invention has the object to provide a control apparatus for opening or closing the roof of a vehicle, which can solve problems arising during running in transferring the flexible top between its position at the rear header and its position nearby the rear window glass.

In order to achieve the object, the present invention consists of a flexible top apparatus of a vehicle, comprising:

a roof panel connected to a vehicle body through at least a pair of left-hand and right-hand front pillars and a pair of left-hand and right-hand rear pillars;

a roof opening formed in said roof panel leaving a front header, a pair of left-hand and right-hand roof side rails, and a rear header and surrounded by said front header, said left-hand and right-hand roof side rails, and said rear header;

a rear window glass panel fixed to said rear pillars and said rear header;

a flexible top having a size as substantially large as the roof opening in a state in which said flexible top is unfolded and expanded in a longitudinal direction of a vehicle body and being disposed to selectively take a first posture in which the roof opening is closed and a second posture in which said flexible top is contracted in a longitudinal direction of the body and placed at a position in a vicinity of said rear header to open the roof opening, a guide means disposed between said flexible top and the vehicle body for guiding said flexible top in a contracted state between said second posture and a third posture which is located in a vicinity of a lower end portion of said rear window glass panel at a spaced relationship away from said rear window glass panel, rear header, and rear pillars;

a driving means for transferring said flexible top between the second posture and the third posture;

a switch for selectively giving an instruction of starting transfer of said flexible top between the second posture and the third posture;

a state detecting means for detecting whether the vehicle is in a state of halting or in a state of running;

a first control means for controlling the transfer of the flexible top when the vehicle is in a state of halting; and a second control means for continuing control of transferring the transfer of the flexible top when the vehicle is shifted from a state of halting to a state of running after the flexible top starts transferring between the second posture and the third posture.

With the above arrangement, the flexible top can continuously be transferred to its second position nearby the rear header or to its third position nearby a lower end portion of the rear window glass even if the vehicle would have started running from a standing state in the course of a vertical movement of the flexible top between the second and third positions. In other words, when the vertical movement of the flexible top is suspended due to a change of the vehicle from its halt state to its running state, the flexible top is brought into a state in which it is in a suspended or floating state in the position rearward of the rear window glass panel. This suspended state of the flexible top imposes excessive load upon a connecting mechanism connecting the flexible top to the vehicle body because the top itself has a considerable heavy weight. Hence, the control apparatus according to the present invention can solve the problems arising from the load imposed upon the connecting mechanism.

Other objects, features and advantages of the present invention will become apparent in the course of the description of the preferred embodiments, which follows, in conjunction with the accompanying drawings.

BRIEF DESCRIPTION OF THE DRAWINGS

FIG. 3(a) is a flow chart showing an embodiment of control for removing the flexible top from the trunk lid.

FIG. 3(c) is a flow chart showing an embodiment of control for closing the roof aperture with the flexible top.

FIG. 6 is a side view showing the position-regulating unit in a state in which the flexible top is locked.

FIG. 7 is a side view showing the position-regulating unit in a state in which the flexible top is unlocked.

FIG. 11 is a perspective view taken along line XI—XI of FIG. 10.

FIGS. 12 to 14 are side views showing a variation in states of the forward and rearward transfer units.

FIG. 19 is a perspective view showing an overall outline of a mechanism for swinging the board member between the rearward end roof portion and the trunk lid.

FIG. 20 is a partially sectional view showing the structure of a drive gear unit shown in FIG. 19.

FIGS. 43 and 44 are flow charts showing a variation in control in accordance with the second embodiment of the present invention.

DETAILED DESCRIPTION OF THE PREFERRED EMBODIMENTS

The flexible top control apparatus for the flexible top vehicle according to the present invention adopts a canvas top system in which a top member of the basic structure so disposed as to be accommodated within a rearward portion of the roof is further transferred to a trunk lid at the rearward end portion of the vehicle body and accommodated on the trunk lid. The top member is so disposed as to be located in a position that does not interfere with the trunk lid when the trunk lid is unlocked and opened, thereby improving safety and preventing the vehicle body from being damaged or injured by the top member.

The preferred embodiments will now be described in more detail with reference to FIGS. 1 to 29.

Figure 28:
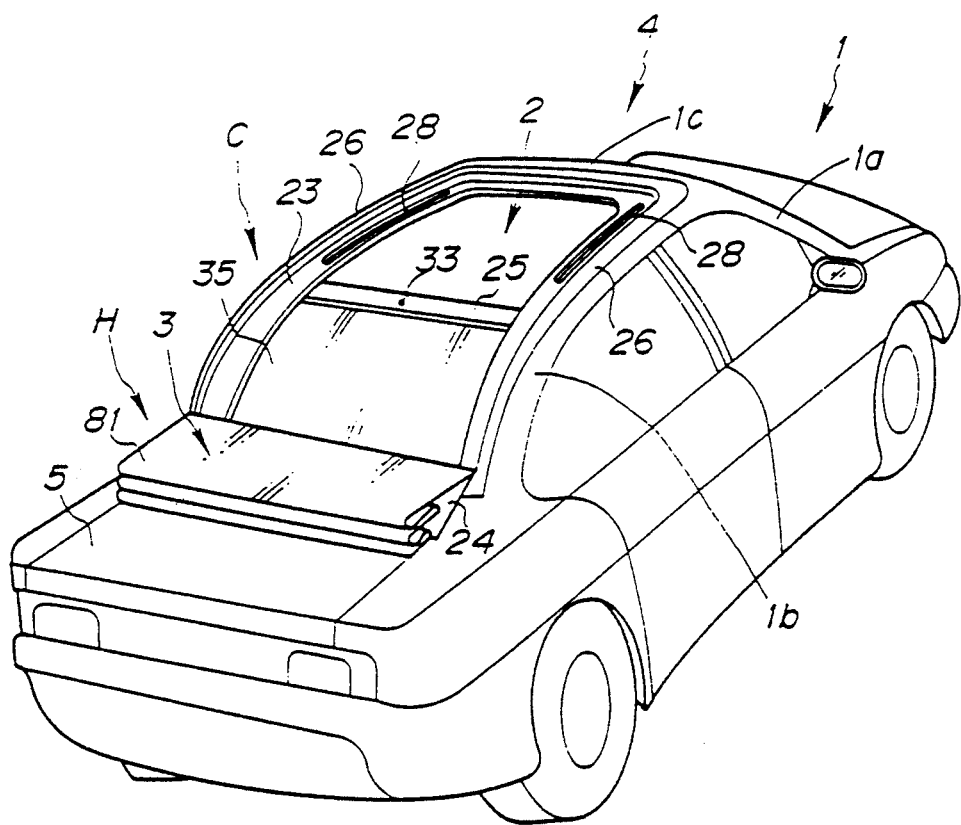
FIG. 28 is an exploded, perspective view showing a state in which the flexible top in a folded state is housed over the trunk lid.
Figure 29:
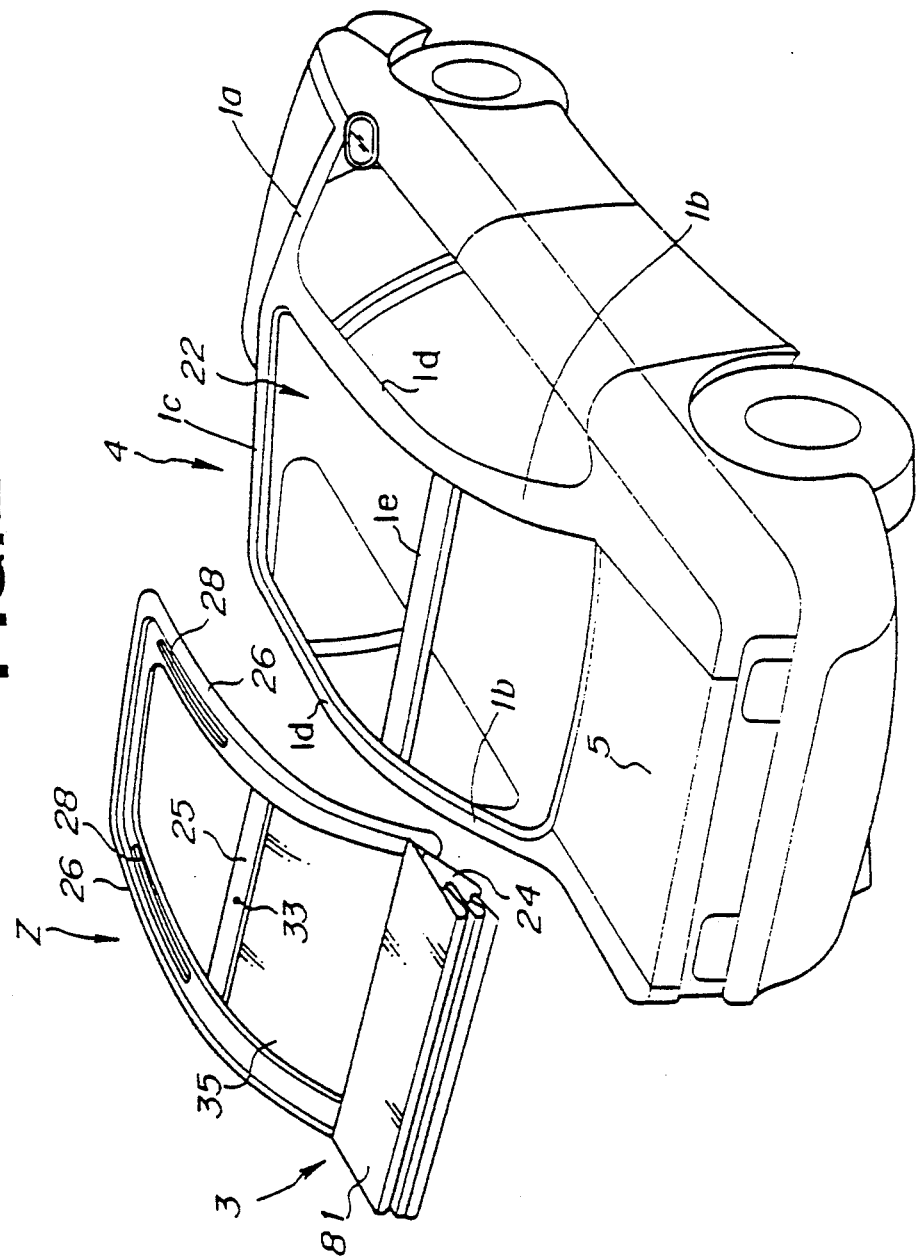
FIG. 29 is a perspective view showing a state in which the flexible top is housed in a folded state over the trunk lid.

As shown in FIG. 28, the canvas top vehicle is provided on its roof 4 with an aperture 22 of a square shape with its longitudinal sides longer than its transverse sides, and the aperture 22 is openably covered with a top member 3. More specifically, as shown in FIG. 29, the roof 4 is connected to the vehicle body 1 through a front pillar 1a and a rear pillar 1b, and the roof 4 forms the roof aperture 22 surrounded by a roof panel comprising a front header 1c, a rear header 1e and side rails 1d. To the aperture 2 is mounted a canvas top assembly Z which comprises a base frame 23, a board member 24 to be slidably mounted on the base frame 23, and the top member 3.

Figure 27:
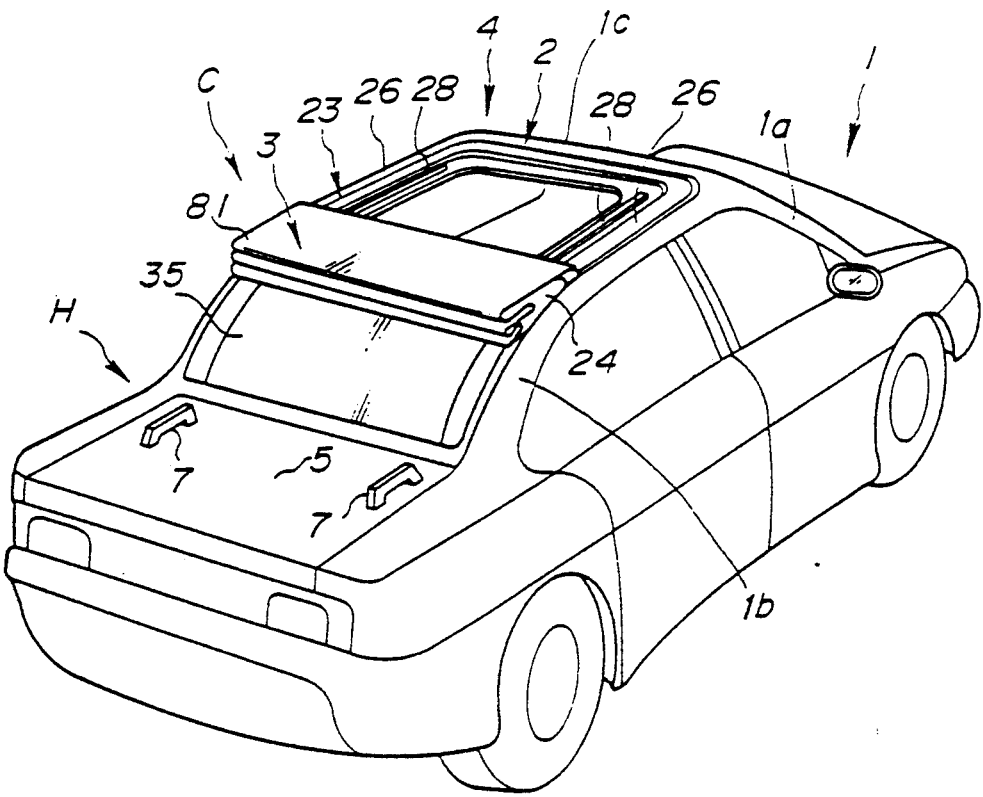
FIG. 27 is a perspective view showing a state in which the flexible top is folded.

Referring to FIGS. 27 and 29, for example, the base frame 23 comprises a rear header portion 25 and a pair of side rail portions 26. A first rail section 28 for guiding the top member 3 is mounted to the side rail portions 26 of the base frame 23. The rear header portion 25 is provided on its upper face with a fourth limit switch 33 so disposed as to protrude upwards (see FIG. 29), thereby permitting a contactor of the fourth limit switch 33 to abut with a rearward back face of the board member 24 when the board member 24 is transferred to the accommodating position C (the second position) and as a consequence generating a signal for indicating the state in which the board member 24 has reached the position C (see FIGS. 16 and 22). As shown specifically in FIG. 29, the base frame 23 of the canvas top assembly Z is attached and bolted through a bracket (not shown) to a periphery of the aperture 22 of the vehicle body 1 and all the periphery of the aperture 22 is sealed between the vehicle body 1 and the base frame 23.

Figure 5:
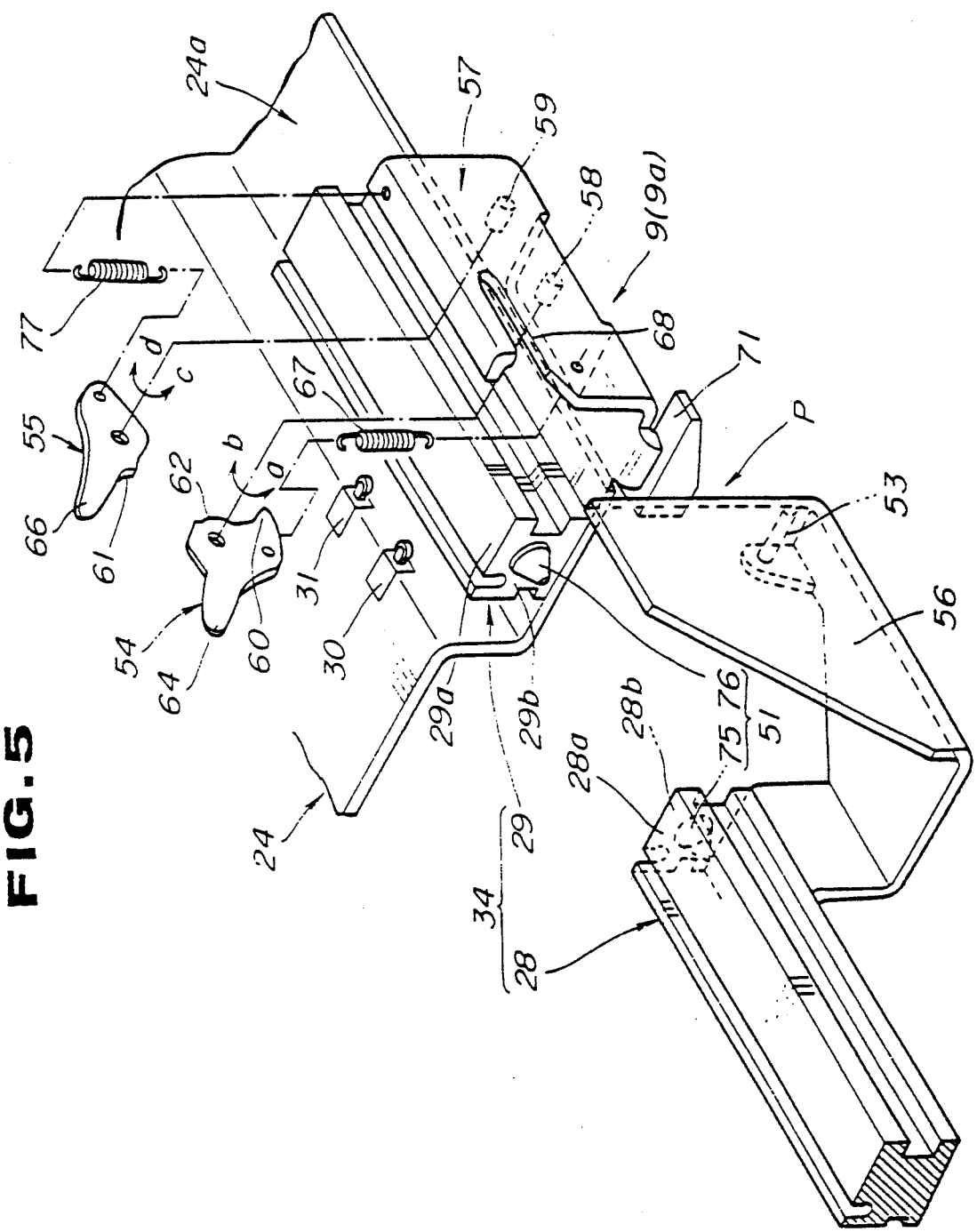
FIG. 5 is a perspective view showing a position-regulating unit mounted to the flexible top.
Figure 15:
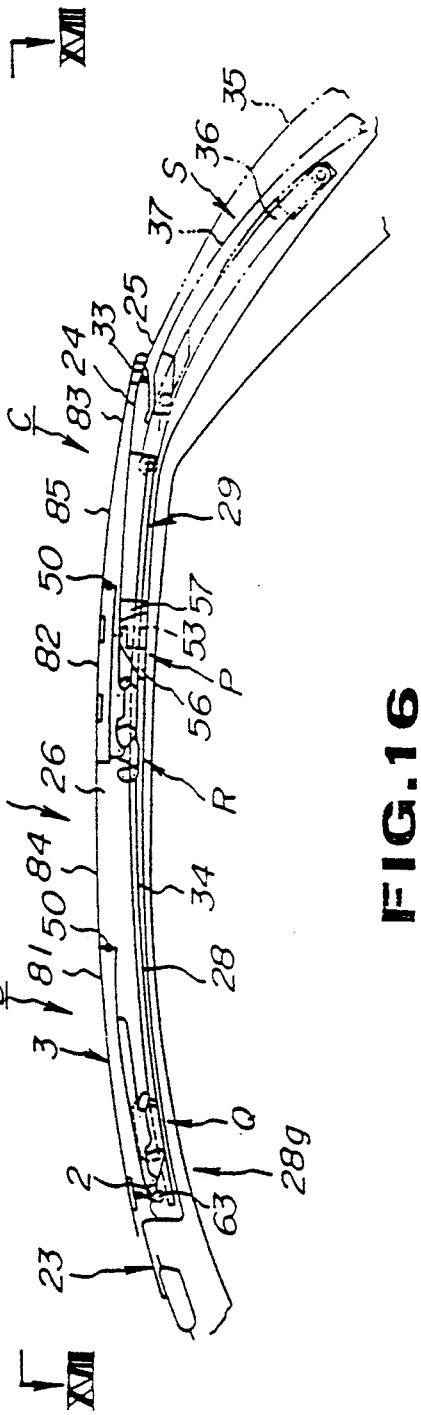
FIG. 15 is a longitudinal view in section showing an essential portion of an upper vehicle body with the flexible top.
Figure 16:
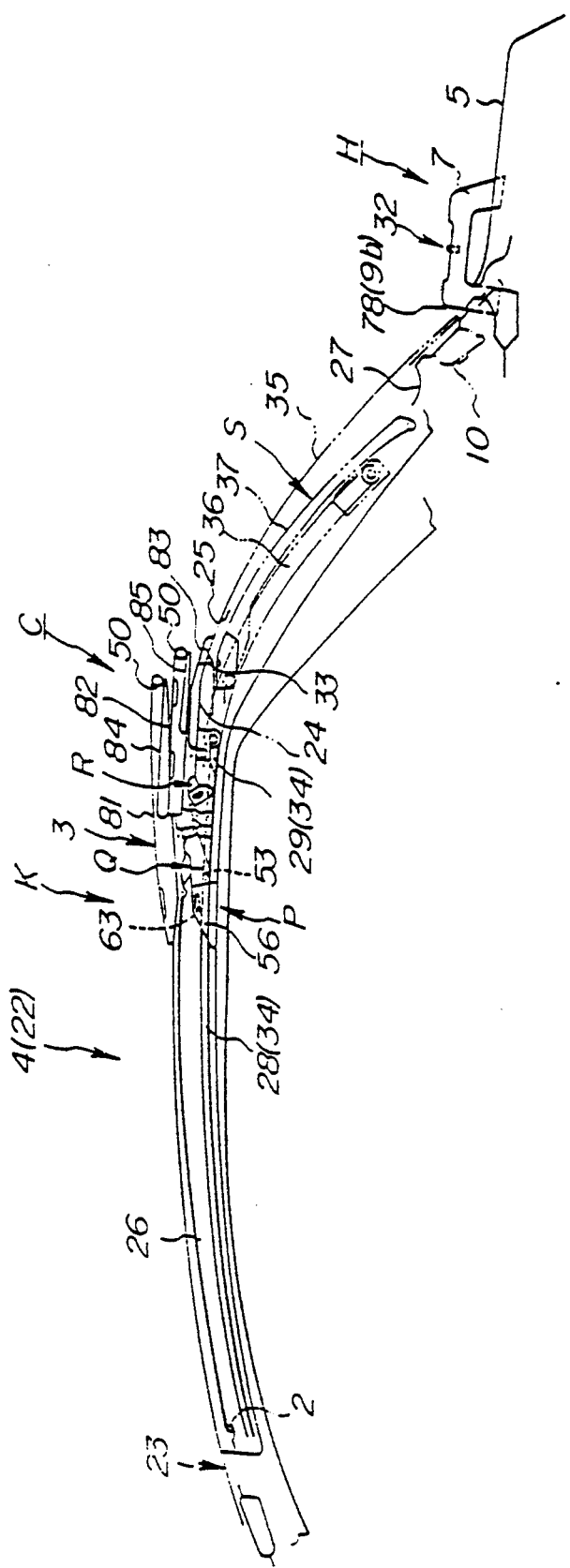
FIGS. 16 and 17 are views showing a variation of the state of FIG. 15.
Figure 17:
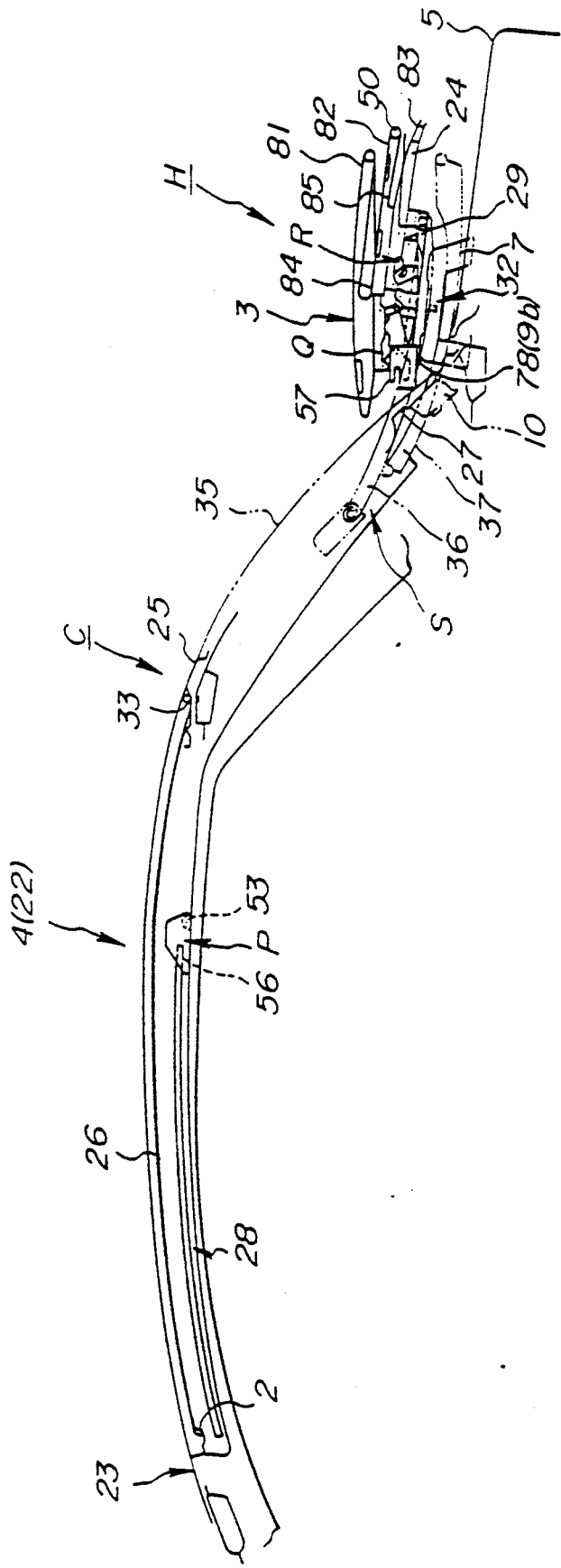
Figure 21:
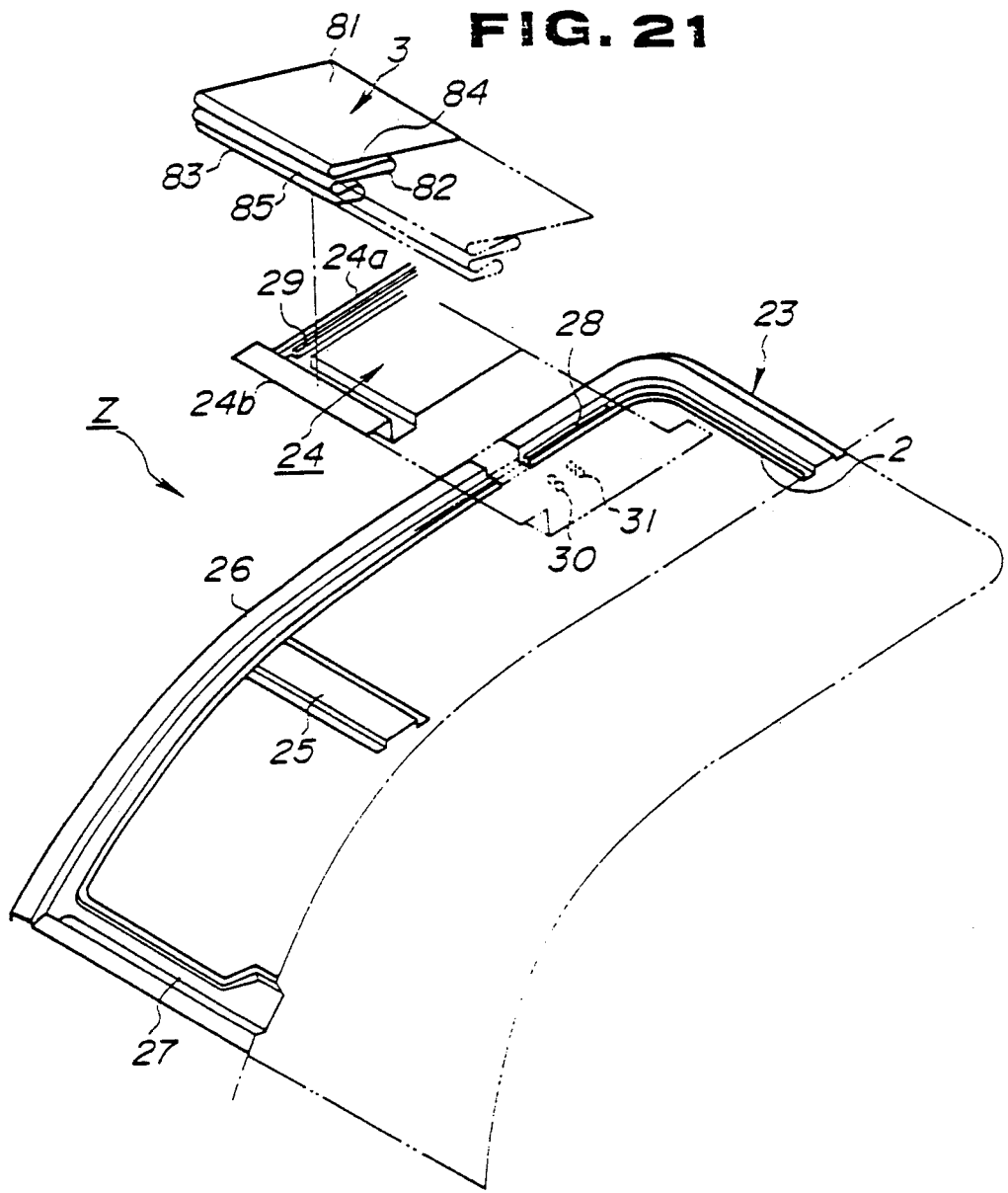
FIG. 21 is an exploded view showing the flexible top and the roof.
Figure 22:
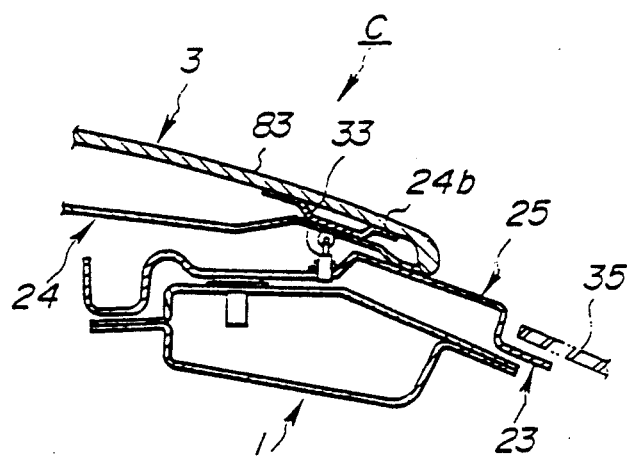
FIG. 22 is a view in cross section taken along the line XXII—XXII of FIG. 18.

As shown in FIG. 21 the board member 24 is in the form of an approximately flat plate so as to allow the top member 3 to be folded thereon. The top member 3 in such a state as being folded on the board member 24 can be transferred between the accommodating position C (the second position) located at the rearward end portion of the aperture 22 and the accommodating position H located on the trunk lid 5 (the third position), as shown in FIGS. 16 and 17. On both of side portions of the board member 24 are mounted second rail sections 29 and 29 each of which has substantially the same shape in cross section as the first rail sections 28 mounted on the side rail portions 26 of the base frame 23. Further, as shown in FIG. 5, a first limit switch 30 and a second limit switch 31 are embedded in a predetermined spaced relationship at a step portion on one side 24a of the board member 24, and the respective contactors are so disposed as to protrude toward the second rail 29. Each of the first limit switch 30 and the second limit switch 31 is so disposed as to become into abutment with a projection 103 protruded on the inner side of a sliding body 98 of the forward transfer unit Q which in turn is so disposed as to be transferable along the guide rail 34 consisting of the first guide rail 28 and the second guide rail 29 in a manner as will be described in more detail with reference to FIGS. 10 and 11. These limit switches 30 and 31 can detect the state in which the board member 24 is locked in an open position K and the state in which it is unlocked in a position backward in a predetermined distance from the open position K. As shown in FIG. 22, to a rearward end portion 24 of the board member 24 is secured a third panel 83 of the top member 3 as will be described hereinafter. Furthermore, as will be described in more detail hereinafter, to each of the side portions of the board member 24 is connected the swinging mechanism S as shown in FIGS. 15 to 18.

Figure 18:
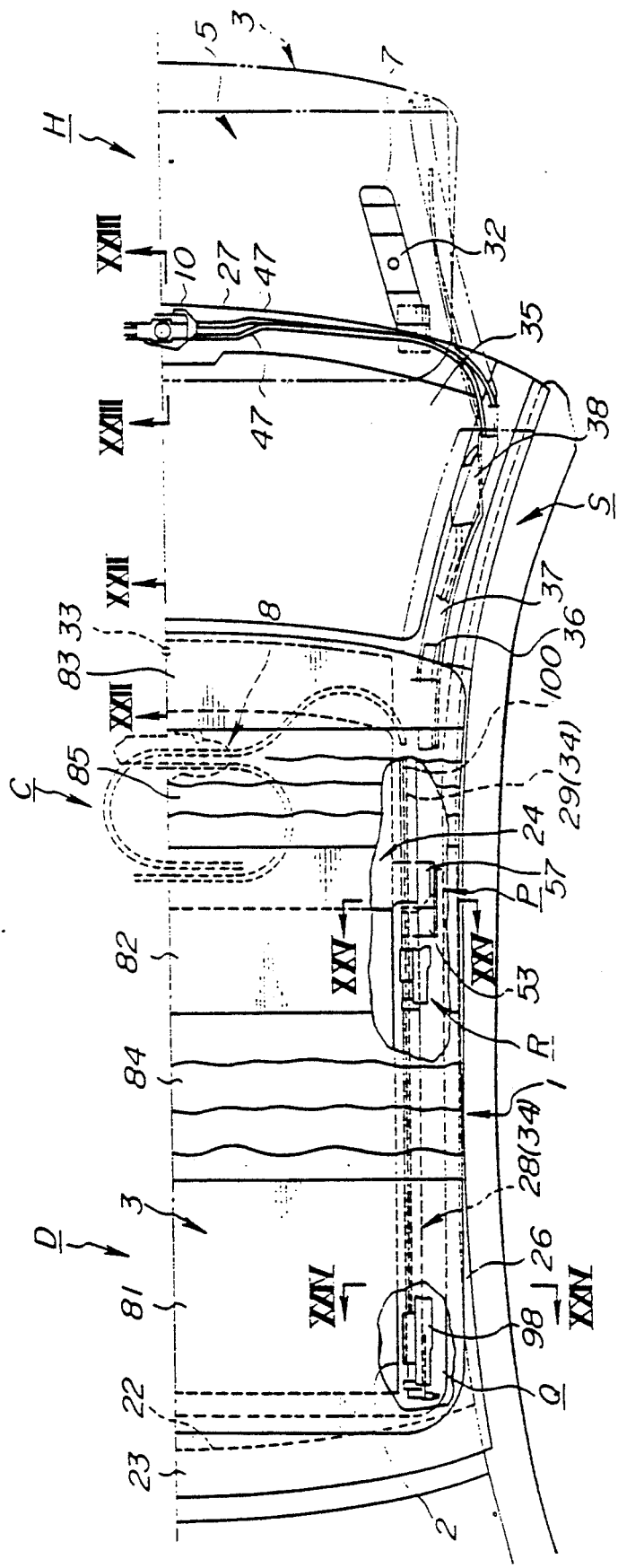
FIG. 18 is a perspective view taken along line XVIII—XVIII of FIG. 15.
Figure 23:
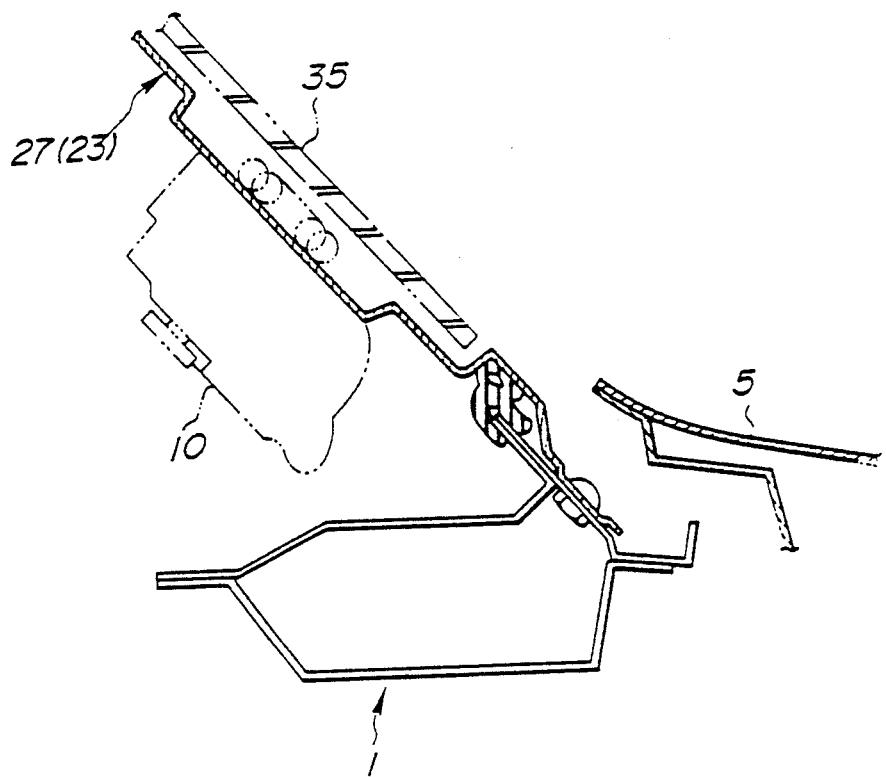
FIG. 23 is a view in cross section taken along the line XXIII—XXIII of FIG. 18.

As shown in FIGS. 19 and 20, the swinging mechanism S comprises a pair of main links 36 disposed at its forward position and a pair of sub-links 37 disposed at its rearward position. The swinging mechanism S is driven by a motor unit 10 which in turn is disposed at a rear deck portion 27 of the base frame 23 as shown in FIGS. 18 and 23. As shown specifically in FIG. 19, a base end portion 36a of the main link 36 is secured to an output shaft 39 of a drive gear unit 38 and a top end portion 36b thereof is mounted to the board member 24 although not shown in the drawings. A base end portion 37a of sub-link 37 is secured to a base 48 and a top end portion 37b thereof to the board member 24. The drive gear unit 38 comprises six decelerating gears 40 to 45 and a cable-driving gear 46, thereby converting a displacement force of the cable 47 to be pushed or pulled by means of the motor unit 10 into a rotary shaft of the output force 39 of the drive gear unit 38 (FIG. 20) and transmitting the rotary force to the main link 36.

Figure 2:
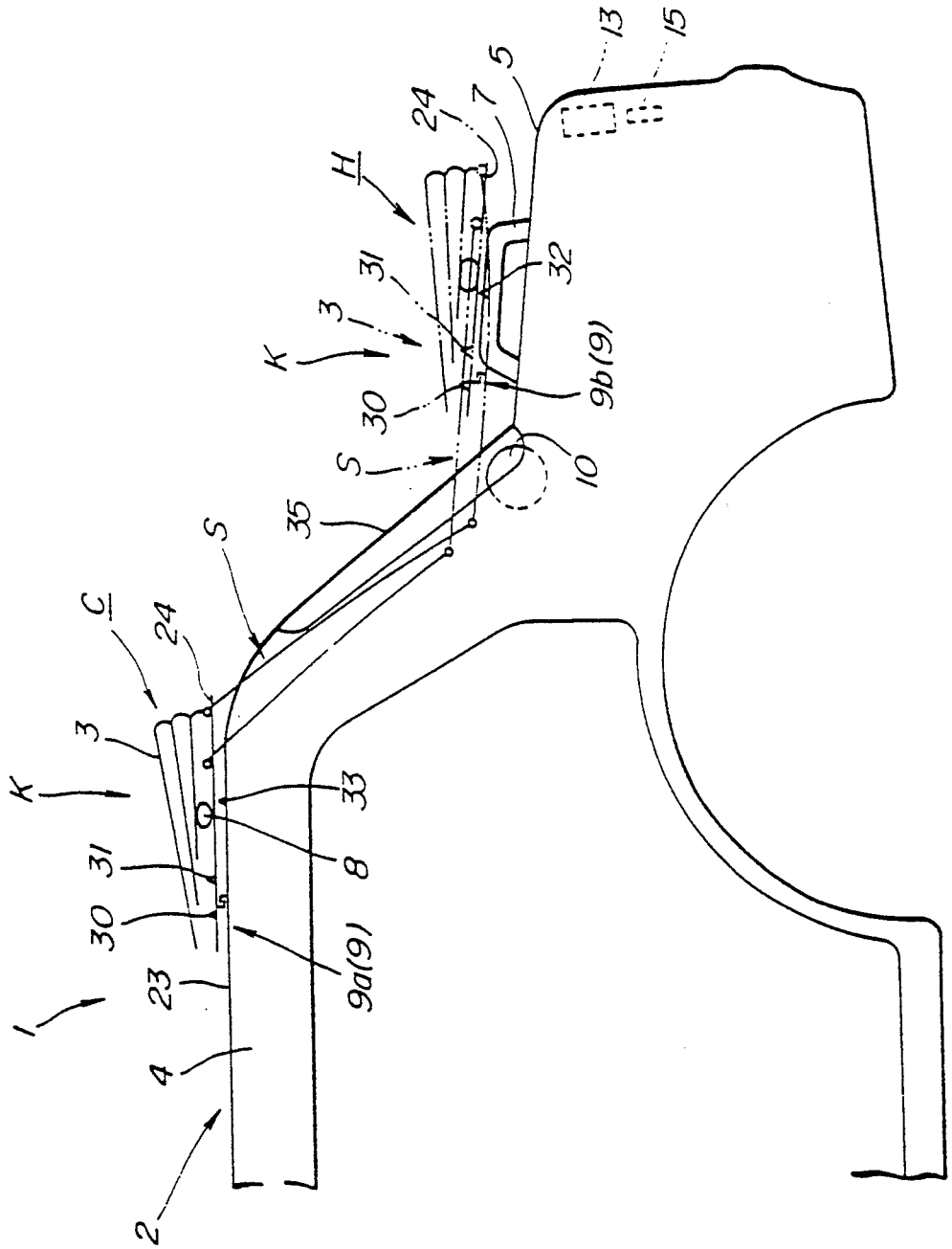
FIG. 2 represents an outline of the flexible top apparatus according to the first embodiment of the present invention.

This arrangement allows the main link 36 to be swung forwards and rearwards in the longitudinal direction of the vehicle body by pushing or pulling the cable 47 by means of the motor unit 10, thereby transferring the board member 24 between the accommodating position C (the second position) located at the rearward end portion of the roof aperture 2 as shown in FIGS. 2 and 16 and the position H (the third position) located on the trunk lid 5 as shown in FIGS. 2 and 17. As shown in FIG. 17, when it is transferred to the second accommodating position H (the third position), the board member 24 is placed on the support base 7 disposed on the trunk lid 5 and locked by a locking means 9b as will be described hereinafter.

When the board member 24 is located at the accommodating position C located at the rearward portion of the roof aperture 2, the second rail section 29 mounted on the upper face of the board member 24, as shown in FIG. 6, is arranged so as to be continuous in a straight line with the first rail section 28 mounted on the side rail portion 26 of the base frame 23, whereby the first and second rail sections 28 and 29 constitute a series of a guide rail 34 extending over between the forward end portion and the rearward end portion of the roof aperture 2. At a mating portion between the first and second rail sections 28 and 29 is mounted a position regulating unit P in order to make the mating portions thereof agree with each other and to ensure a series of operations including opening, closing and accommodating the top member 3 with ease.

As shown specifically in FIGS. 6 and 7, the position regulating unit P comprises an engaging mechanism 51 and the locking mechanism 9a. The engaging mechanism 51 can accurately align the first rail section 28 with the second rail section 29 when the board member 24 is transferred through the swinging mechanism S by means of the motor unit 10 from the second accommodating position H to the first accommodating position C in the manner as has been described hereinabove. The locking mechanism 9a is to position the board member 24 in transverse, longitudinal and vertical directions.

As shown in FIGS. 5, 6 and 7, the engaging mechanism 51 comprises a concave portion 75 in a conical form so disposed inward on a rearward end face 28b of the first rail section 28 and a convex portion 76 in a conical form disposed outward on a forward end face 29b of the second rail section 29 corresponding to the first rail section 28 so as to be tightly engaged with the concave portion 75. As shown specifically in FIG. 6, as the board member 24 is transferred from the second accommodating position H to the first accommodating position C, the concave portion 75 of the first rail section 28 is engaged with the conical projection 76 of the second rail section 29 so as to permit an accurate alignment between the first and second rail sections 28 and 29. When the engaging mechanism 51 is then swung by means of the swinging mechanism S in the backward direction as indicated by the arrow m in FIG. 7 to transfer the board member 24 to the second accommodating position H as will be described hereinafter, the conical concave portion 75 is so formed as to be disengaged from the conical convex portion 76. In this embodiment, as shown in FIG. 5, in order to implement the preliminary positioning of the rail sections in the transverse direction, an engaging piece 71 is provided on a forward end portion of a lock bracket 57, thereby abutting the engaging piece 71 with an inner face of a striker bracket 56 when the second rail section 29 has corresponded to the first rail section 28, as shown in FIGS. 6 and 7.

As described hereinabove, the locking mechanism 9a is to position the second rail section 29 in its longitudinal and vertical directions with respect to the first rail section 28 and lock the abutment of the former with the latter, in association with the engaging mechanism 51, as shown in FIG. 6, when the board member 24 has been transferred from the second accommodating position H to the first accommodating position C as shown in FIG. 5. Referring again to FIG. 5, the engaging mechanism 9a is provided with a striker 53 on the side of the first rail section 28 as well as a first lever 54 and a second lever 55 on the side of the second rail section 29. The striker 53 is mounted at a rearward end portion 28a of the first rail section 28 through the striker bracket 56 in such a manner that it projects inwards in the transverse direction of the first rail section 28 and that it is located outside the second rail section 29 and in the position as high as the lower face of the second rail section 29 when the first rail section 28 is connected to the second rail section 29.

The first lever 54 and the second lever 55 are mounted through the second lock bracket 57 to the forward end portion 29a of the second rail portion 29. More specifically, the first pin 58 and the second pin 59 are disposed in a spaced relationship with each other in a direction of extension, and the first lever 54 and the second lever 55 are so mounted swingably through the first pin 58 and the second pin 59, respectively.

As shown in FIG. 5, the first lever 54 is provided with a first convex portion 60, a second convex portion 62, and a third convex portion 64, the first convex portion 60 being engageable with the striker 53, the second convex portion 62 being for regulating a pivotal movement of the first convex portion 60 in the direction as indicated by the arrow b in which the second convex portion 62 is disengaged, upon engagement with the first convex portion 61 of the second lever 55, and the third convex portion 64 being for pivoting the first lever 54 in engagement with an engaging pin 63 in the direction as indicated by the arrow a. The engaging pin 63 is disposed in the forward transfer unit Q for locking operation, as will be described hereinafter. The first lever 54 is urged by a spring 67 suspended from the lock bracket 57 so as to be pivotable in the direction as indicated by the arrow b.

The second lever 55 is provided with the first convex portion 61, which is engageable with the second convex portion 62 of the first lever 54, and with a second convex portion 66 which is engaged with the engaging pin for locking operation. The second lever 55 is urged by means of a spring 77 suspended from the lock bracket 57 so as to be pivotable in the direction as indicated by the arrow c.

The lock bracket 57 is formed in a shape having a dimension so as to be inserted into the inside of the striker bracket 56 and it is provided with a guiding groove 68 extending in the longitudinal direction, into which the engaging pin 63 for locking operation can be slidably engaged.

Figure 8:
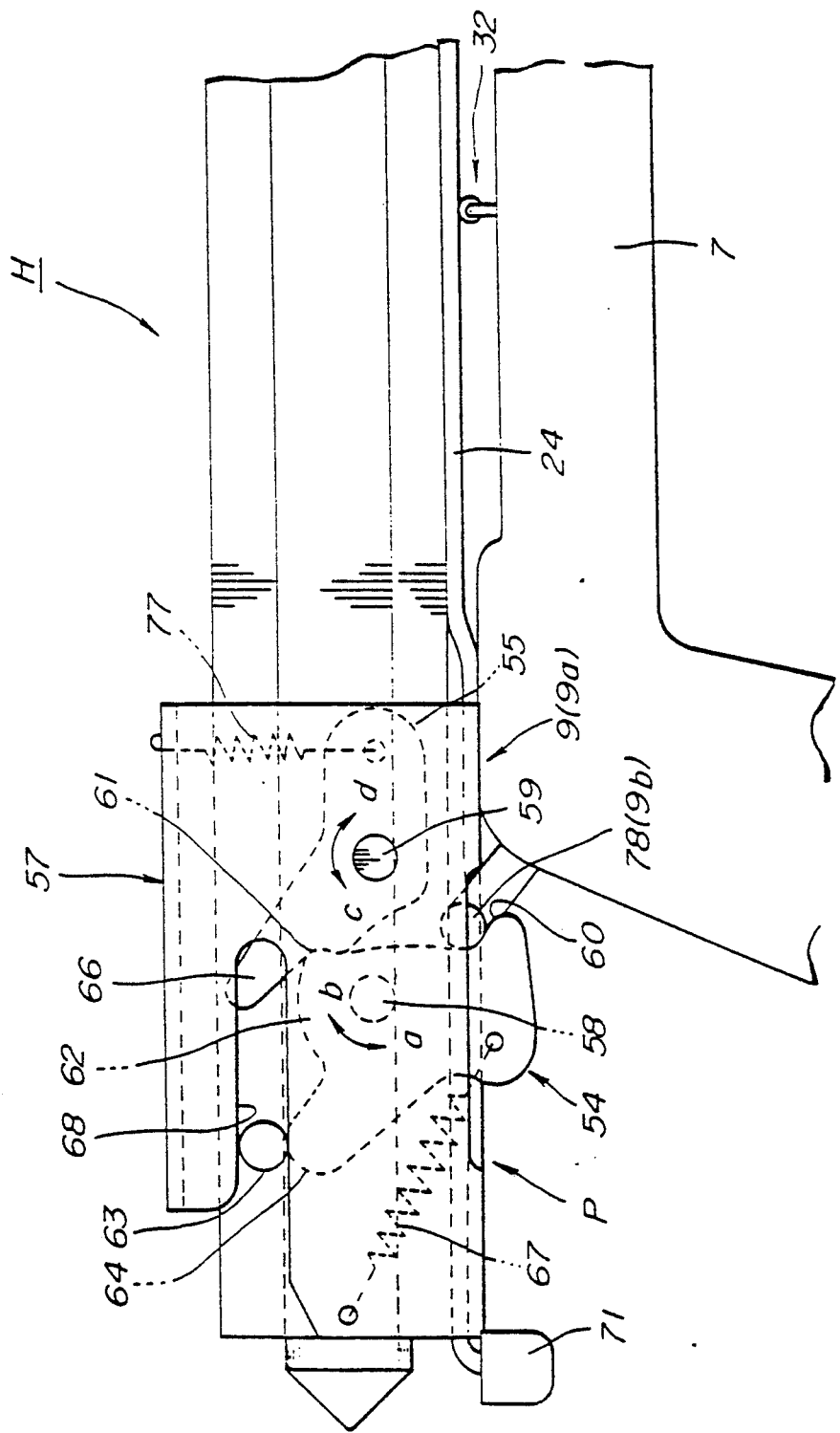
FIG. 8 is a side view showing a state in which the board member is locked on a support base mounted on the trunk lid.

As shown further in FIG. 6, the first lever 54 has a top portion of its third convex portion 64 disposed approximately at a lower face of the guiding groove 68 when it is located in the position in which the first convex portion 60 is engaged with the striker 53. As shown in FIG. 8, on the one hand, the third convex portion 64 of the first lever 54 is so disposed as to be projected upwards from the upper face of the guiding groove 68 when it is located in the position in which the striker 53 is disengaged from the first convex portion 60 by pivoting the first lever 54 in the direction as indicated by the arrow b by means or the spring 67. As shown in FIG. 6, on the other hand, the second lever 55 has its second convex portion 66 disposed so as to be projected upwards, thereby closing the guiding groove 68, when it is located in the position where its first convex portion 61 is engaged with the second convex portion 62 of the first lever 54 which is disposed in its engaged position. Further, as shown also in FIG. 7, the first convex portion 61 of the second lever 55 is so arranged as to be disengaged from the second convex portion 62 of the first lever 54 when they are located in the unlocking position in which the second convex portion 66 of the second lever 55 is located at the rearward end portion of the guiding groove 68.

The engaging pin 63 for locking operation is located at the forward end portion of the top member 3 and so disposed as to be slidable in a forward or backward direction along the guide rails 34 to be driven by means of the motor unit 8 (as shown in FIG. 18) disposed on the board member 24, as will be described hereinafter. More specifically, as shown in FIG. 15, the engaging pin 63 for locking operation is located in a position in the vicinity of a forward end of the roof aperture 2, i.e., the position being referred to sometimes as "forward end position", when the top member 3 is located at the closing position D to close the aperture 2 (the first position). Further, as shown in FIG. 6, the engaging pin 63 is located in a position (hereinafter referred to sometimes as "intermediate position") in the vicinity of the forward end of the second guide rail 29 mounted to the board member 24, when the top member 3 is located in the position in which the roof aperture 2 becomes the roof opening 2. At this time, the top member 3 is located in the opening position K as described hereinabove. When the engaging pin 63 for locking operation is transferred to this intermediate position, a projection 103 (FIG. 11) disposed to the sliding body 98 of the forward transfer unit Q is brought into abutment with the first limit switch 30 mounted on the board member 24 (FIG. 5) in a manner as will be described hereinafter, thereby detecting the position in which the top member 3 is currently located in the opening position K. It is thus confirmed that the board member 24 is locked by the locking mechanism 9a in the first accommodating position C in association with the action of engaging the second rail 29 with the first rail 28 by means of the engaging mechanism 51, thereby positioning the second rail section 29 in the longitudinal, transverse and vertical directions. In other words, when the top member 3 is located in the opening position K, the engaging pin 63 for locking operation is located in the intermediate position at the groove opening of the guide groove 68 of the locking mechanism 9a, while the third convex portion 64 of the first lever 54 in the engaging position is located in a position in which the guide groove 68 becomes open. The pivotal movement of the first lever 54 is regulated in the direction as indicated by the arrow b due to the engagement of the second convex portion 62 of the first lever 54 with the first convex portion 61 of the second lever 55. While the engagement of the first convex portion 60 with the striker 53 is retained, the board member 24 is locked in the accommodating position C in association with the engaging action of the engaging mechanism 51, thereby locking and positioning the longitudinal, transverse and vertical directions of the second guide rail 29 with respect to the first guide rail 28.

In transferring the board member 24 from the first accommodating position C to the second accommodating position H, the engaging pin 63 for locking operation is slid further backwards from the intermediate position up to a rearward end portion of the guiding groove 68 (hereinafter referred to sometimes as "rearward end position"), as shown in FIG. 7. At this time, the projection 103 (FIGS. 11 and 12) of the forward transfer unit Q is brought into contact with the second limit switch 31 (FIG. 5) disposed on the board member 24 in the position far backwards from the first limit switch 30, thereby detecting the position in which the engaging pin 63 for locking operation is located in the rearward end position and confirming that the board member 24 is unlocked. More specifically, as shown in FIG. 6, as the engaging pin 63 for locking operation is transferred from the intermediate position farther backwards to the rearward end position as shown in FIG. 7, the engaging pin 63 comes into abutment with the second convex portion 66 of the second lever 55, thereby pivoting the second convex portion 66 thereof in the direction as indicated by the arrow d.

This above arrangement allows the first convex portion 61 of the second lever 55 to be disengaged from the second convex portion 62 of the first lever 54, thereby pivoting the first lever 54 from the engaged position to the disengaged position. This operation unlocks the board member 24 and permits its backward movement in the direction as indicated by the arrow m in the drawing by means of the swinging mechanism S for transferring the board member 24 to the second accommodating position H (the third position).

The locking and unlocking operation of the locking mechanism 9a is implemented by sliding the forward transfer unit Q forwards or backwards along the second rail section 29 under control of the control unit 11, as have been described hereinabove.

The motor unit 8 is used as a driving source for unlocking the locking mechanism 9a. It is thus unnecessary to provide another member for locking operation. Further, a frequency of occurrence of troubles can be reduced and the locking and unlocking operation of the top member 3 can be automatically implemented by operating the main switches 12a, 12b and 12c while the operator is seated. In order to smoothly implement the operation of a forward or backward movement of the forward transfer unit Q on the second rail sections 29 as will be described hereinafter, the operation of locking and unlocking the board member 24 can be carried out in a smooth, stable and favorable manner. It is further possible to transfer the unlocked board member 24 together with the top member 3 in the second accommodating position H with high safety and certainty, thereby further improving safety and comfort.

In such a state that the board member 24 is transferred from the second accommodating position H (the third position) to the first accommodating position C (the first position), each of the members is disposed in a positional relationship as shown in FIG. 7. In this state, the engaging pin 63 for locking operation is located in the rearward end position of the guide groove 68. When the engaging pin 63 is transferred forwards to the intermediate position—in other words, when the top member 3 is slid to the opening position K—the pin 63 is caused to be abutted again with the third convex portion 64 of the first lever 54, thereby pivoting the first lever 54 in the direction as indicated by the arrow a, locking the board member 24 by re-positioning the first lever 54 to the engaged position, and aligning the second rail section 29 with the first rail section 28. Hence, when the board member 24 is returned to the first accommodating position C, the locking mechanism 9a is operated in the manner as has been described hereinabove at the time at which it is transferred to the opening position K, when the top member 3 advances even if the alignment of the first rail section 28 with the second rail section 29 would not have been finished. Thus, relative positions of the first rail section 28 with respect to the second rail section 29 in longitudinal, transverse and vertical directions are adjusted with certainty and the locking of the two rail sections 28 and 29 is implemented. Therefore, the operation of closing the top member 3 can always be carried out in a smooth manner and the top member 3 can be kept accommodated and locked on the board member 24 even if the vehicle would run with the top member 3 accommodated in the first accommodating position C.

Figure 9:
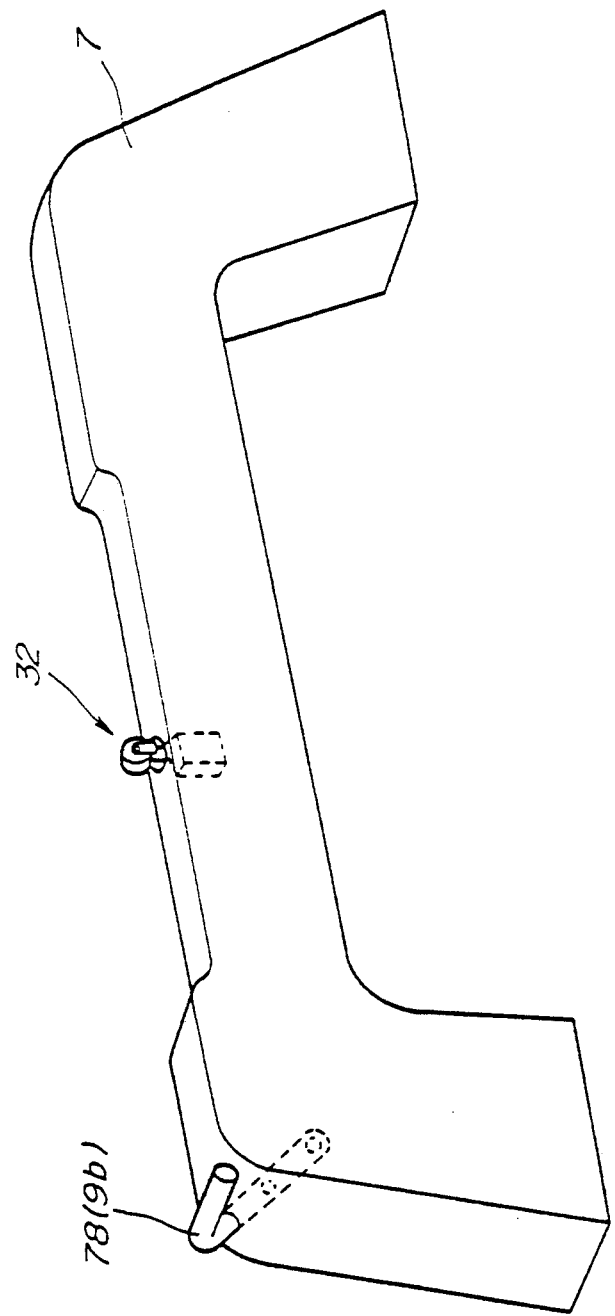
FIG. 9 is a perspective view showing the support base mounted on the trunk lid.

When the board member 24 is transferred to the second accommodating position H disposed on the support base 7 of the trunk lid 5, i.e., during accommodation of the top member 3, the locking mechanism 9a allows the engaging pin 63 for locking operation to be slid from the rearward end position to the intermediate position by means of the motor unit 8 and the first convex portion 60 of the first lever 54 is allowed to be engaged with a striker 78 mounted on the side of the support base 7 as shown in FIGS. 8, 9 and 17. In other words, the locking mechanism 9a is used as a locking mechanism 9b for the top member 3 located in the second accommodating position H. The locked state at this time can be detected by means of the first limit switch 30 while the unlocked state can be detected by the second limit switch 31, as shown in FIG. 5. The third limit switch 32 for detecting the location of the board member 24 on the support base 7 is disposed in an approximately middle portion of one of the support bases 7 as shown in FIG. 9 in such a manner that its contactor comes into abutment with a bottom surface of the board member 24 as shown in FIG. 8, thereby generating an ON signal.

The operation of locking and unlocking the locking mechanism 9b positioned in the second accommodating position H can be carried out by the operation of the forward and backward movement of the forward transfer unit Q by means of the control unit 11 in the manner as has been described hereinabove. The motor unit 8 is controlled by the control unit 11. Therefore, the operation locking and unlocking the top member 3 in the accommodating position H can be carried out in an automatic and smooth way by operating the main switch 12b or 12c while the operator is seated. Hence, this operation serves as improving safety and comfort.

Referring now to FIG. 15 to 18, the top member 3 to be slid to open or close the roof aperture 2 of the vehicle body comprises a hard top section member and a soft top section member, namely, a first panel 81, a second panel 82, and a third panel 83 with two pieces of canvases 84 and 85 disposed alternatively to connect the first and second panels 81, 82 and the second and third panel 82, 83, respectively. The first panel 81 has the broadest area and is disposed on the front side of the body, while the third panel 83 has the smallest area and is disposed on the rear side of the body. The second panel 82 has an intermediate area and is disposed in an intermediate position between the first and third panels 81 and 83. The third panel 83 is further secured to the rearward end portion 24b of the board member 24 as shown in FIG. 22. The first panel 81 and the second panel 82 are slidably connected to the guide rail 34 through the forward transfer unit Q and the rearward transfer unit R (FIGS. 12, 14 and 15). Thus, the transfer operation of the forward transfer unit Q and the rearward transfer unit R allows the top member 3 to selectively assume the position H and the position K. In other words, the top member 3 takes the position that is a position to close the roof aperture 2 by stretching and expanding the first, second and third panel as shown in FIGS. 15 and 18. While it takes the position that is a position to open the roof aperture 2 with the top member 3 placed on the board member 24 and accommodated in a folded state.

Figure 10:
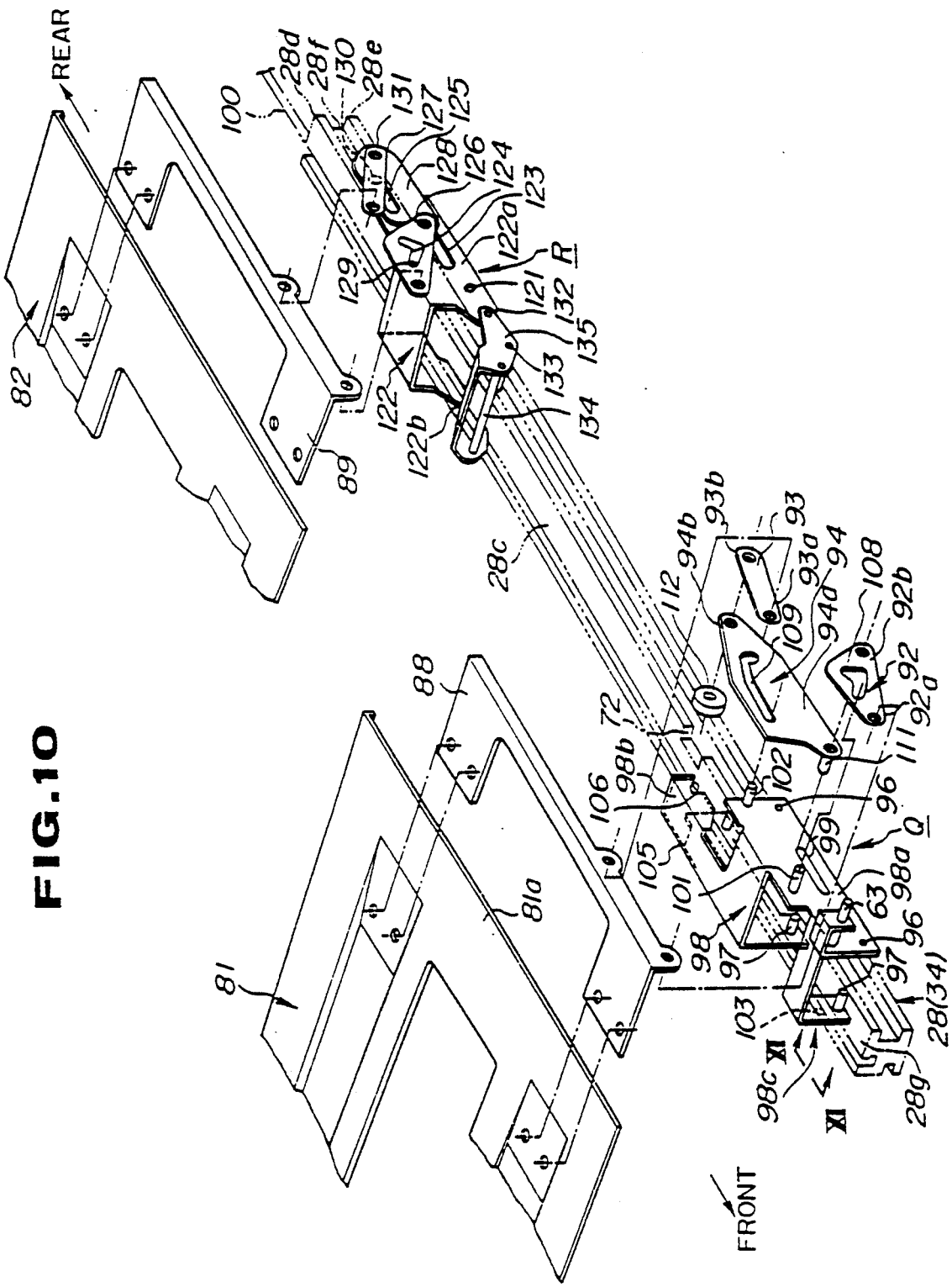
FIG. 10 is an exploded, perspective view showing forward and rearward transfer units.

As shown in FIG. 10, the forward transfer unit Q has the same basic construction as the rearward transfer unit R. The forward transfer unit Q is mounted to the first panel 81 of the top member 3 and the rearward transfer unit R is mounted to the second panel 82 thereof. As the forward transfer unit Q is slid backward along the guide rail 34, the first panel 81 is lifted at the starting time of sliding, thereby unsealing the state of abutting the first panel 81 with a sealing member disposed around the corresponding periphery of the aperture of the base frame 23. Likewise, the second panel 82 is lifted to unseal the abutment of the second panel 82 with the sealing member disposed along the corresponding periphery thereof as the rearward transfer unit R.

The forward transfer unit Q and the rearward transfer unit R will then be described with reference to FIGS. 10, 12 to 14.

As shown specifically in FIG. 10, the forward transfer unit Q comprises a sliding body 98 mounted slidably to the guide rail 34 through guide pins 96 and 97. The sliding body 98 is shown as in FIG. 18 to be driven through a cable 100 by means of the motor unit 8. More specifically, the motor unit 8 is mounted in an approximately middle portion of the board member 24 in its transverse direction, and the cable 100 to be reciprocatorily moved by the motor unit 8 is connected at its end to the sliding body 98. The clockwise or counterclockwise movement of the motor unit 8 allows the sliding body 98 to slide on the guide rail 34 in the longitudinal direction of the body 1. On an outer side face 98a of the sliding body 98 is provided a first guide groove 99 extending in the longitudinal direction of the body, and mounted three engaging pins, namely, the engaging pin 63 for locking operation, which is mounted to control operation of the position-regulating unit P as have been described hereinabove, a first engaging pin 101 for link operation, and a second engaging pin 102.

As shown in FIG. 11, the forward transfer unit Q is provided on its inner side face 98c with the projection 103 which is so designed as to come into contact with the first or second limit switch 30 or 31 (as shown in FIG. 5) mounted on the board member 24. The limit switches 30 and 31 are disposed in such a positional relationship with respect to the projection 103 as will be described hereinafter. As shown in FIG. 10, a rearward end portion 98b of the sliding body 98 comprises an engaging portion 107 consisting of a first engaging face 105 and a second engaging face 106, and the engaging portion 107 is arranged so as to be engaged with a slide pin 134 of the rearward transfer unit R to cause the roof aperture 2 to be open by transferring the top member 3 to the position K on the board member 24 when the engaging pin 63 for locking operation comes to the intermediate position (as shown in FIG. 6). At this time, the limit switch 30 is caused to allow its contactor to come in touch with the projection 103, thereby generating an ON signal to the control unit 11. In the second accommodating position H, the top member 3 accommodated in the position K on the board member 24 is locked together on the support base 7.

When the engaging pin 63 for locking operation comes to the rearward end position, as shown in FIG. 7, by transferring the sliding body 98 further backward from its locked position, as has been discussed immediately hereinabove, by means of the motor unit 8, the board member 24 located in the first accommodating position C or in the second accommodating position H is unlocked. This state can be detected by bringing the second limit switch 31 into contact with the projection 103, thereby allowing the second limit switch 31 to generate an ON signal to the control unit 11.

As shown further in FIG. 10, the sliding body 98 is "link-connected" with a bracket 88 of the first panel 81 of the top member 3 through three links, namely, a first link 92 with a second guide groove 108 in a shape of an approximately "smaller-than" ('<') symbol formed inside, a second link 93 in a band-like form, and a third link 94 with a third guide groove 109 formed inside as in a shape of an approximately "greater than" ('<') symbol with its sharp angle turned to face down. The bracket 88 is mounted to a peripheral side portion 81a of the first panel 81.

As shown specifically in FIGS. 10 and 12, the first link 92 is pivotably or swingably supported at its one end 92a on a forward end portion of the bracket 88 through a connecting pin 110 in such a state that the first engaging pin 101 is inserted into the second guide groove 108 of the first link 92. Furthermore, the first link 92 is engaged at its other end 92b with the first guide groove 99 through the third engaging pin 111, together with one end 94a of the third link 94. The second link 93 is pivotably or swingably supported at its one end 93a on a middle portion of the bracket 88 through a connecting pin 113 and it is connected at its other end 93b to an other end 94b of the third link 94 through a connecting pin 114 having a guide roller 112 so as to be relatively pivotable. The second engaging pin 102 is engaged in the third guide groove 109 of the third link 94. As has been described hereinabove, the three links 92 to 94 constitutes a four-section link together with the bracket 88.

Referring now to FIG. 12, when the sliding body 98 is moved by means of the cable 100 so as to be located at the end of the guide rail 34, namely, in such a state that it is located at the forward end portion 28g of the first rail section 28, i.e., that the roof aperture is closed with the top member 3, the guide roller 112 is engaged in a first cut-out portion 72 formed in the first rail section 28, thereby regulating a longitudinally sliding movement of the forward transfer unit Q. In this state, the third engaging pin 111 is located on the rearward end side of the first guide groove 99 and the first engaging pin 101 is located on the forward end side of the second guide groove 108 while the second engaging pin 102 is located on the forward end side of the third guide groove 109. The second guide groove 108 in this state is disposed so as to extend in a vertical direction while the third guide groove 109 is disposed such that its forward half portion extends in an approximately horizontal direction and its rearward half portion extend in an obliquely downward direction.

As shown in FIGS. 10, 13 and 14, the rearward transfer unit R has substantially the same structure as the forward transfer unit Q as has been described hereinabove. The rearward transfer unit R has likewise a sliding body 122 which is slidably mounted to the guide rail 34 through a guide pin 121. The sliding body 122 has a first guide groove 123 on its outer side face 122a and is pivotably or swingably connected to a bracket 89 through a first link 126 having a second guide groove 124, a second link 127, and a third link 128 having a third guide groove 125. The bracket 89 is mounted to the second panel 82 of the top member 3.

When a first engaging pin 129 mounted on the side of the sliding body 122 is inserted into the second guide groove 124 of the first link 126 and when a second engaging pin 130 mounted on the side of the sliding body 122 is inserted into the third guide groove 125 of the third link 128, the rearward transfer unit R is disposed of in substantially the same manner as the forward transfer unit Q.

A structure which is peculiar to the rearward transfer unit R involves, firstly, an inclination portion of the third link 128 shorter than that of the third guide groove 109 of the forward transfer unit Q; secondly, an insertion of an engaging pin 131 connecting the second link 127 to the third link 128 into a third cut-out portion 74 formed in an upper flange 28d of the first rail section 28, as shown in FIG. 13, when the flexible top member 3 is located in the position D; and, thirdly, mounting of an arm 135 having an engaging pin 133 and a slide pin 134 to the forward end portion 122b of the sliding body 122 through a fulcrum pin 132. The engaging pin 133 of the arm 135 is inserted into a second cut-out portion 73 formed in a lower flange 28e of the first rail section 28 when the top member 3 is in the position D. In the positions other than the position D, it is inserted into a concave groove 28f of the first rail section 28 as shown in FIG. 14. The slide pin 134 is disposed always over an upper face 28c of the first rail section 28 astride the first rail section 28 in the transverse direction of the body. When the engaging pin 133 is in the concave groove 28f of the first rail section 28, it is arranged so as to be engageable into the engaging portion 107 of the forward transfer unit Q. When the top member 3 is in the closing position, the rearward transfer unit R is such that a sliding movement of the top member 3 in the longitudinal direction is regulated by engaging the engaging pin 131 into the second cut-out portion 73. It is further to be noted herein that the rearward transfer unit R is blocked from sliding in the longitudinal direction and that it is provided with no driving means, unlike the forward transfer unit Q.

The top member 3 connected to the guide rail 34 will be operated to open or close the roof aperture by means of the forward and rearward transfer units Q and R in such a manner as will be described hereinafter.

Figure 24:
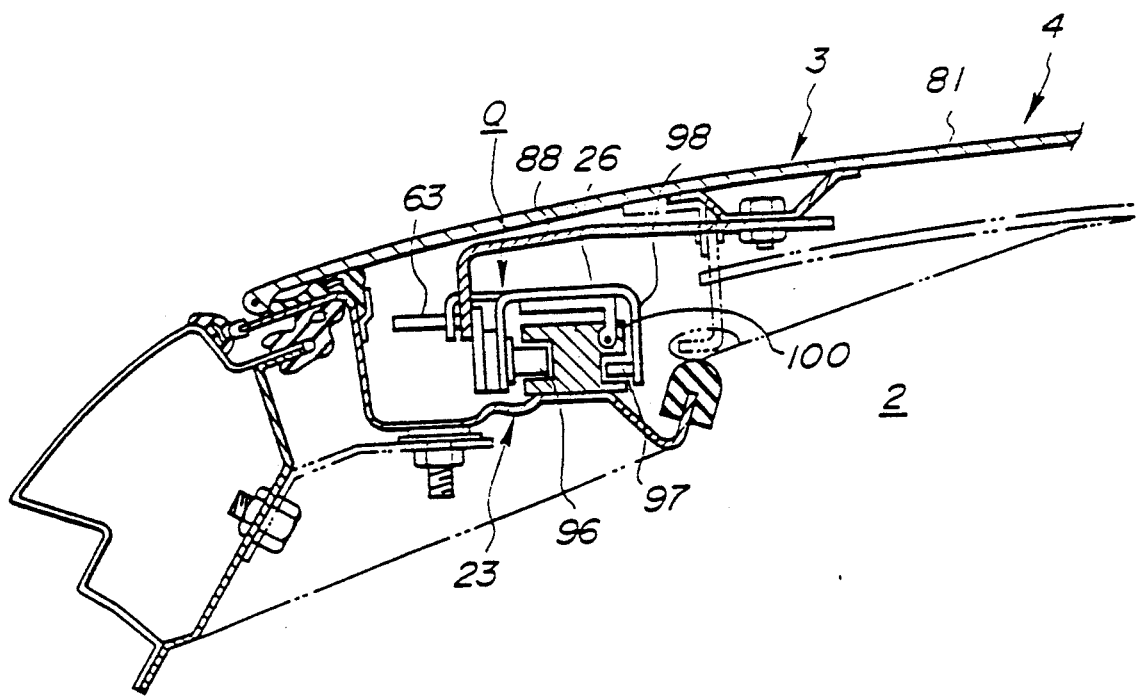
FIG. 24 is a view in cross section taken along the line XXIV—XXIV of FIG. 18.
Figure 25:
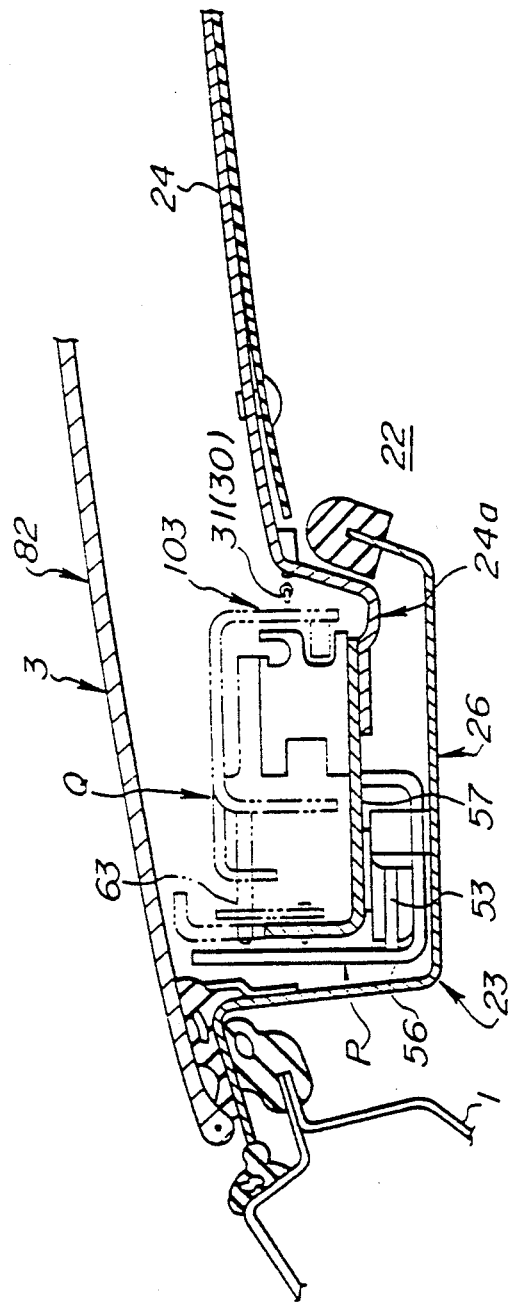
FIG. 25 is a view in cross section taken along the line XXV—XXV of FIG. 18.

First, when the top member 3 is in the closing position, i.e., first position (as shown in FIGS. 15 and 18), the forward transfer unit Q is located at the forward end portion 28g of the first rail section 28, as shown in FIG. 12, in such a state that the first panel 81 is disposed substantially in parallel to and close to the first rail section 28 and that it is sealed at its outer periphery with the base frame 23 (FIG. 24). As shown in FIGS. 13 and 18, the rearward transfer unit R is located in a vicinity of the rearward end portion 28a of the first rail section 28, while the second panel 82 is disposed substantially in parallel to and close to the first rail section 28, like the first panel 81. In the position D in which the top member 3 is closed, the forward and rearward transfer units Q and R are engaged with the guide rail 34 in a vertical relationship so that, even if a sucking action would work upon the top member 3, the top member 3 can be effectively prevented from fluttering, thereby improving durability of the top member 3.

When the top member 3 is operated to be released from this state, namely, the cable 100 is pulled backwards by means of the motor unit 8, so that the sliding body 98 of the forward transfer unit Q is slid toward the rear of the body 1 relative to the bracket 88, thus transferring the third engaging pin 111 within the first guide groove 99 from the forward end side toward the rearward end side. During a first half period of this transfer, the second engaging pin 102 is allowed to transfer on the inclination portion of the third guide groove 109 toward its rearward end side, and this allows the third link 94 to be pivoted upward about the third engaging pin 111, while the guide roller 112 is caused to be released from the first cut-out portion 72 (FIG. 10) of the first rail section 28, thereby transferring it onto the upper face 28c of the first rail section 28. This is the state as shown in FIG. 13. In this state, the first panel 81 is lifted up as a whole and the state in which it is abutted with the peripheral edge portion of the base frame 23 is disengaged. It is to be noted in this embodiment that the difference between vertical positions of the first link 92 when it is pivoted in the second guide groove 108 is set to be larger than the difference between vertical positions of the third link 94 when it is pivoted within the third guide groove 109, thereby allowing the bracket 88 to be inclined forwards.

When the cable 100 is further pulled backward, the forward transfer unit Q is slid toward the rear of the body in such a posture as shown in FIG. 13, while the first canvas 84 is being folded. As the forward transfer unit Q comes in front of the rearward transfer unit R, the sliding pin 134 mounted on the arm 135 of the rearward transfer unit R is inserted into the engaging portion 107 of the forward transfer unit Q. The arm 135 is then pivoted upwardly while being guided on the first engaging face 105 as the forward transfer unit Q slides. As a result, the engaging pin 133 is removed from the second cut-out portion 73 of the first rail section 28 and transferred into the concave groove 28f, thereby integrally connecting the forward transfer unit Q to the rearward transfer unit R.

As the forward transfer unit Q is transferred further in the rearward direction, the sliding body 122 of the rearward transfer unit R is slid further toward the rear of the body, too, relative to the bracket 89 as shown in FIG. 14, thereby lifting the second panel 82 and allowing it to be released and separated from the sealed face of the base frame 23, like the forward transfer unit Q. At this time, in the forward transfer device Q, the second panel 82 becomes approximately parallel to the first rail section 28 by appropriately setting a relative relationship between a difference of positional heights of the first engaging pin 129 of the first link 126 prior to and subsequent to its pivot with that of the third guide groove 125 of the third link 128. Accordingly, in such a state in which the forward transfer unit Q is connected to the rearward transfer unit R, the first panel 81 is inclined at an angle different from the second panel 82 so that the first second panel 81 and 82 are allowed to be folded and superposed while ensuring a sufficient space between the two panels for accommodating the first canvas 34 of the top member 3.

When the cable 100 is pulled further backwards, the forward transfer unit Q and the rearward transfer unit R are integrally slid backwards from the first rail section 28 to the second rail section 29 while folding the second canvas 85. The forward and rearward transfer units Q and R are then accommodated on the board member 24 located in the position C. In this state, the first, second and third panels 81, 82, 83 are folded in order in a superposed state with the first canvas 84 folded between the first and second panels 81 and 82 and with the second canvas 85 folded between the second and third panels 82 and 83. As shown in FIGS. 15 to 17, it is to be noted that a guide member 50 is provided at the rearward end portions of the first and second panels 81 and 82 in order to prevent the first and second canvases 84 and 85, respectively, from being folded at sharp angles.

When the top member 3 is operated from its open state to close the roof aperture, the forward transfer unit Q and the rearward transfer unit R are transferred together in a joined state until the rearward transfer unit R reaches a given position in the position D in which the aperture is full closed with the top member 3, namely, until the engaging pin 133 of the rearward transfer unit R reaches the position of the second cut-out portion 73 of the first rail section 28 (FIG. 13). When the engaging pin 133 is inserted into the second cut-out portion 73 of the first rail section 28, then the arm 135 is caused to be pivoted downward, thereby removing or disengaging the slide pin 134 from the engaging portion 107 of the forward transfer unit Q and disconnecting a connection of the forward transfer unit Q to the arm 135 of the rearward transfer unit R. Thus, thereafter, only the forward transfer unit Q advances forward up to its original position while leaving the rearward transfer unit R behind, and the top member 3 is aligned in the position D. In other words, the top member 3 is operated to close the aperture while its parts to be stretched or expanded on the rear side of the body 1 are developed in order earlier than the other to be expanded next.

As have been described hereinabove, a series of operations of the mechanical system of the flexible top according to the present invention include operation to open or close the top member 3, operation to lock or unlock the board member 24 with the top member 3 accommodated thereon in the first accommodating position C (the second disposed on the roof 4 or in the second accommodating position H (the third position) disposed on the trunk lid 5, and operation to transfer the board member 24 between the first and second accommodating positions C and H. In accordance with the present invention, this series of operations can be implemented by the motor unit 8 or 10 driven by means of the main switch 12 in response to an instruction of the control unit 11. Accordingly, as has been described hereinabove, the operator does not need to implement locking or unlocking operation of the top member 3, unlike conventional ones, by taking the trouble to get out from the vehicle, thereby improving comfortableness and safety. In particular, the unlocking operation can be implemented with readiness, certainty and smoothness by transferring the top member 3 backward in a given distance from the position K in which it is accommodated. Therefore, no additional member is required for unlocking and an easy control can be made so that troubles are unlikely to occur an operability of the canvas top system can be remarkably improved.

Furthermore, the top member 3 can be evacuated from the position in which it interferes with or blocks the opening of the trunk lid 5 when the trunk locking means 13 is unlocked by the top-evacuating system disposed in the canvas top system in the manner as have been described hereinabove, so that damages and injuries of the top member 3, the board member 24, and the trunk lid 5 can be avoided with certainty while improving safety. This certainly serves as enhancing a commercial value as a vehicle.

In this embodiment, it is to be noted that the trunk opener switch 6 may be used as a trunk lid-unlocking detection means, in place of the trunk-unlocking limit switch 15.

Figure 26:
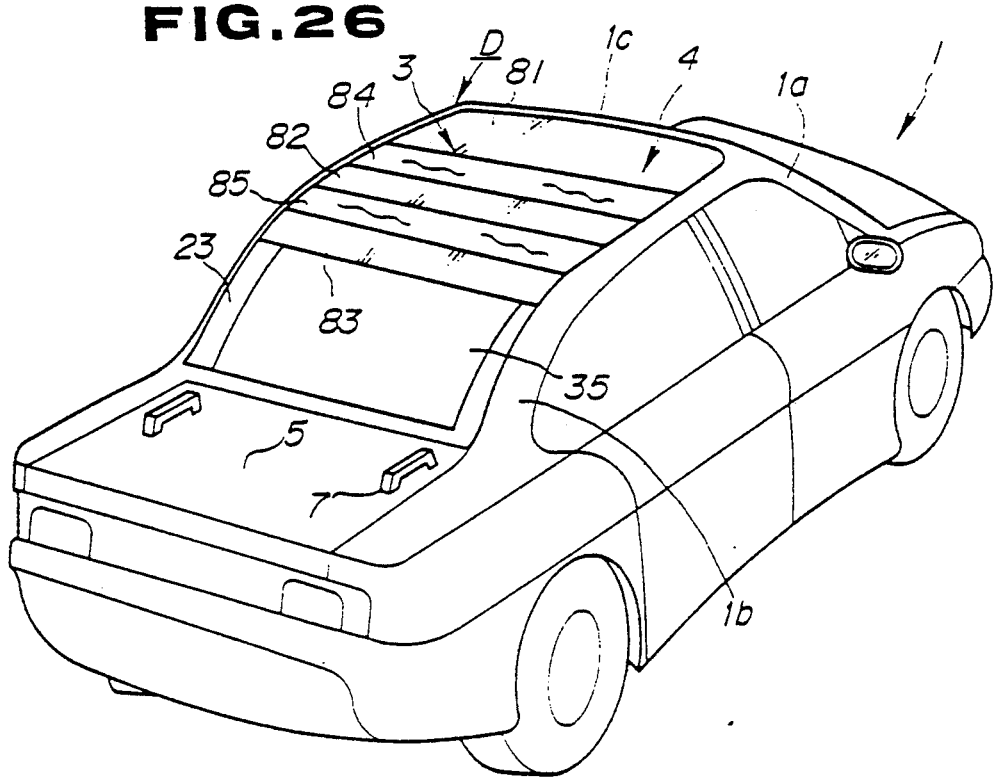
FIG. 26 is a perspective view showing an overall state in which the roof aperture is closed with the flexible top.

Referring to FIGS. 26 and 27, it is shown that the vehicle body 1 is provided with a roof aperture 2 and its roof is covered or uncovered with an extendable or foldable top member 3. The roof aperture 2 is covered with the top member 3 in a closed position (first position) as shown in FIG. 26 and it is uncovered by sliding backwards along first rails 28 disposed on the roof panel 4 and accommodated on a board member 24 disposed on the roof panel 4, thereby allowing the top member 3 to fully open the roof aperture 2 and to assume an opening position (second position). The top member 3 is then moved or transferred backwards while being folded on the board member 24 and accommodated on a support base 7 disposed on a trunk lid 5 at a position (third position) backward of a rear window 35. The top member 3 is then locked on the support base 7 as shown in FIG. 28.

When the trunk lid 5 is unlocked, the top member 3 is evacuated to a position where it does not interfere with the trunk lid 5 and the trunk lid 5 is not brought into abutment with the top member 3 or does not interfere therewith when the trunk lid 5 is opened upward.

A control system for various operations, such as opening and closing, accommodating, locking and unlocking, as well as transferring the top member 3 will be described more in detail with reference to FIGS. 1 and 2.

As shown in FIG. 2, for example, the top member 3 is covered or uncovered by the motor unit 8 mounted on the board member 24. The top member 3 is slidably transferred or moved backwards on the roof panel 4 up to the board member 24 disposed at an accommodating position C and folded at a position K on the board member 24, thereby opening the roof aperture 2. As the top member 3 is slid backwards in a given distance from the position K on the board member 24 by means of the motor unit 8, a first locking mechanism 9a of locking means 9 is unlocked. Thus, the board member 24 is allowed to be transferred or moved to an accommodating position H on the trunk by means of a swinging member S operated by a motor unit 10 mounted on the side of the vehicle body 1 while the top member 3 is folded thereon. The top member 3 placed on the board member 24 is then transferred or moved forwards in a given distance from the accommodating position H to a position K by means of the motor unit 8 and the board member 24 is locked on a support base 7 by means of a second locking mechanism 9b. This locked state can be unlocked by sliding the top member 3 backward in the same given distance as above from the accommodating position K by means of the motor unit 8, thereby allowing the board member 24 to be moved forward or return to the accommodating position C on the roof panel 4 and locking the board member 24 by the first locking mechanism 9a. Thus the top member 3 is allowed to close the roof aperture 2.

The trunk lid 5 is provided with a trunk locking means 13 for locking the trunk lid 5. Further, a trunk-unlock detecting means 15 is provided so as to correspond to the trunk locking means 13. When the trunk locking means 13 is unlocked, a signal detecting this trunk unlocking is sensed by the trunk-unlock detecting means 15 and the top member 3 is evacuated in a given distance from the rearward accommodating position H to the upward accommodating position C by means of the top-evacuating control means 11d while being in a folded state on the board member 24 by rotating the motor unit 10 in a counterclockwise way. This evacuation of the board member 24 on which the top member 3 is being placed prevents the trunk lid 5 from bumping against or coming into contact with the top member 3 and the board member 24 when the trunk lid 5 is opened.

The positions of the top member 3 on the board member 24 are sensed by means of the first, second, third and fourth limit switches 30, 31, 32 and 33, respectively. The board member 24 is provided with the first and second limit switches 30 and 31. The first limit switch 30 is to sense a location of the top member 3 in the position K, and the second limit switch 31 is to sense the unlocking of the board member 24 by sliding it backwards in the given distance from the position K while the top member 3 is in a folded state on the board member 24. The third limit switch 32 is mounted on the support base 7 to sense a location of the board member 24 in the second accommodating position H. The fourth limit switch 33 mounted on the base frame 23 on the roof side of the body 1 is to sense the location of the board member 24 in the accommodating position C transferred from the accommodating position H.

In the rearward accommodating position H, when the top member 3 is returned to the position K from the state in which it has been slid backward in the given distance from the position K on the board member 24, the board member 24 is locked on the support base 7 by the locking means 9b. This state is sensed by the limit switch 30. As the top member 3 has been transferred on the board member 24 backward in the given distance from the distance K, the locking mechanism 9b is unlocked. This state is detected by the limit switch 31. The unlocking of this second locking mechanism 9b allows the board member 24 to be ready to be transferred to the accommodating position C, namely, to the rearward portion of the roof panel 4, or the roof.

Figure 1:
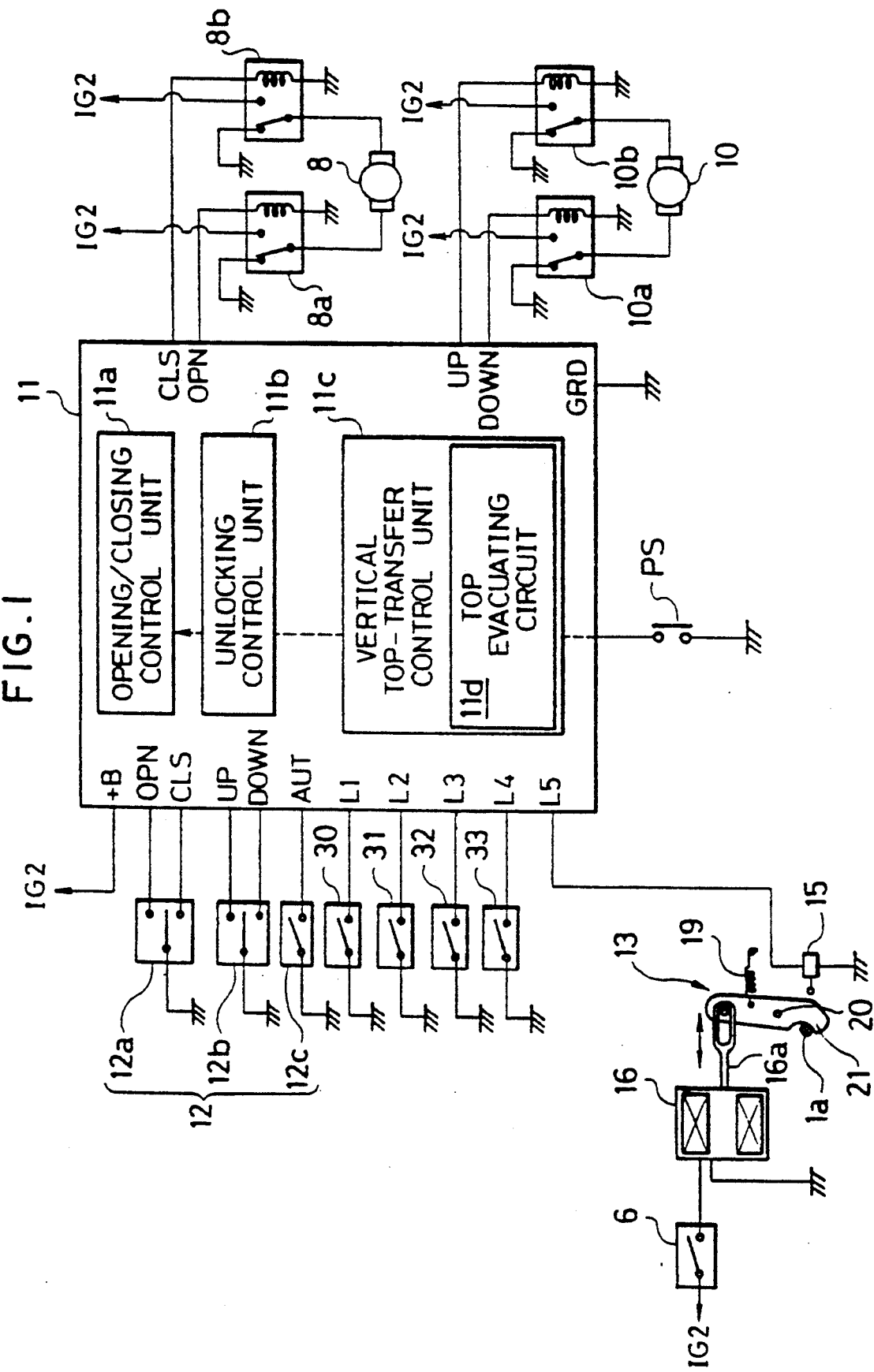
FIG. 1 is a control system representation showing a flexible top apparatus according to a first embodiment of the present invention.

As shown in FIG. 1, an instrument panel (not shown) is provided with a trunk opener switch 6 to be selectively operated by the driver, and main switches 12a, 12b, and 12c for operating the opening, closing or vertical transferring the top member 3. The main switch 12a has the OPN joint for implementing the opening operation of an top member 3 and a CLS joint for implementing the closing operation of the top member 3. The main switch 12b has a DOWN joint for transferring the top member 3 from the first accommodating position C to the second accommodating position H and an UP joint for transferring it from the second position H to the first position C. The main switch 12c is provided with an AUT joint for accommodating the top member 3 from the closed state and continuously transferring it to the second, backward accommodating position H.

As shown in FIG. 1, a control unit 11 comprises a microcomputer which is arranged so as to control an overall operation of a flexible top system by driving the first and second motor units 8 and 10 in a controlled manner in accordance with a pre-memorized program upon an instruction from the driver. To the input side of the control unit 11 are connected an ignition contact IG2 for receiving a supply of electricity from an electric source, a trunk-unlocking limit switch 15 as a trunk-unlocking detecting means, first to third main switches 12a, 12b and 12c, first to fourth limit switches 30, 31, 32 and 33, as well as an input terminal for ON signal of a brake switch PS for detecting the state of operation of the foot brake (the state of the vehicle being suspended). To the output side of the control unit 11 are connected the motor unit 8 through relays 8a and 8b and the motor unit 10 through relays 10a and 10b, respectively, for a supply of electricity from the ignition contacts IG2.

The control unit 11 comprises an opening-closing control unit 11a, an unlocking control unit 11b, and a vertical top-transfer control unit 11c. The opening-closing control unit 11a generates an operating signal to the motor unit 8 in response to a signal from the first main switch 12a for an instruction to open, or uncover, or close, or cover, the roof aperture with the flexible, foldable top member 3, thereby controlling the roof aperture portion 2 to be opened or closed by folding or expanding the top member 3. The unlocking control unit 11b generates an operating signal to the motor unit 8 in response to a signal from the second main switch 12b for unlocking the board member 24 disposed in a locked state by sliding the board member 24 backward in a given distance from the roof position K in such a manner as have been described hereinabove. The vertical top-transfer control unit 11c is designed to generate an operating signal to the motor unit 10 in response to a signal for having unlocked the board member 24, thereby permitting a vertical transfer, i.e., a transfer between the roof and the trunk lid, of the top member 3 placed on the board member 24 from the position C, at which the board member 24 is accommodated on the roof, to the position H, at which it is accommodated on the trunk lid, or from the position H to the position C. The vertical top-transfer control unit 11c is provided with a top-evacuating circuit 11d. The top-evacuating circuit 11d is devised so as to allow the board member 24 with the top member 3 placed thereon to be evacuated up to the accommodating position C where the top member 3 does not interfere with or block the trunk lid 5 when opened. This evacuation is made on condition that the trunkunlocking limit switch 15 is turned on and the trunk locking means 13 is unlocked.

The ON/OFF signals from the brake switch PS are inputted to the opening-closing control section 11a and the vertical top-transfer control section 11c. The opening-closing control section 11a is so arranged as to inhibit the output of signals for controlling the opening or closing of the top member 3, for example, when the ON signal is not inputted from the brake switch PS (when the OFF signal of level L is inputted during running of the vehicle), thereby inhibiting the top member 3 from opening or closing. On the other hand, the vertical top-transfer control section 11c allows the top member 2 to be transferred upwards or downwards as usual when the ON signal has been inputted from the brake switch PS. When the OFF signal is inputted from the brake switch PS, the top member 3 is allowed to be transferred to a predetermined rest position where it can be suspended or rested in a stable manner, such as the accommodating position C or the accommodating position H, and then the upward and/or downward transfer of the top member is automatically suspended.

A trunk-unlock limit switch 15 is so provided as to correspond to the trunk locking means 13 in a manner as will be described hereinafter. The top evacuating circuit 11d is disposed within the vertical top-transfer control section 11c as a top evacuating control means for evacuating the top member 3 in an upper position where it does not interfere with the trunk lid 5, when the trunk-unlock limit switch 15 is turned on and the trunk locking means 13 is unlocked.

Figure 4:
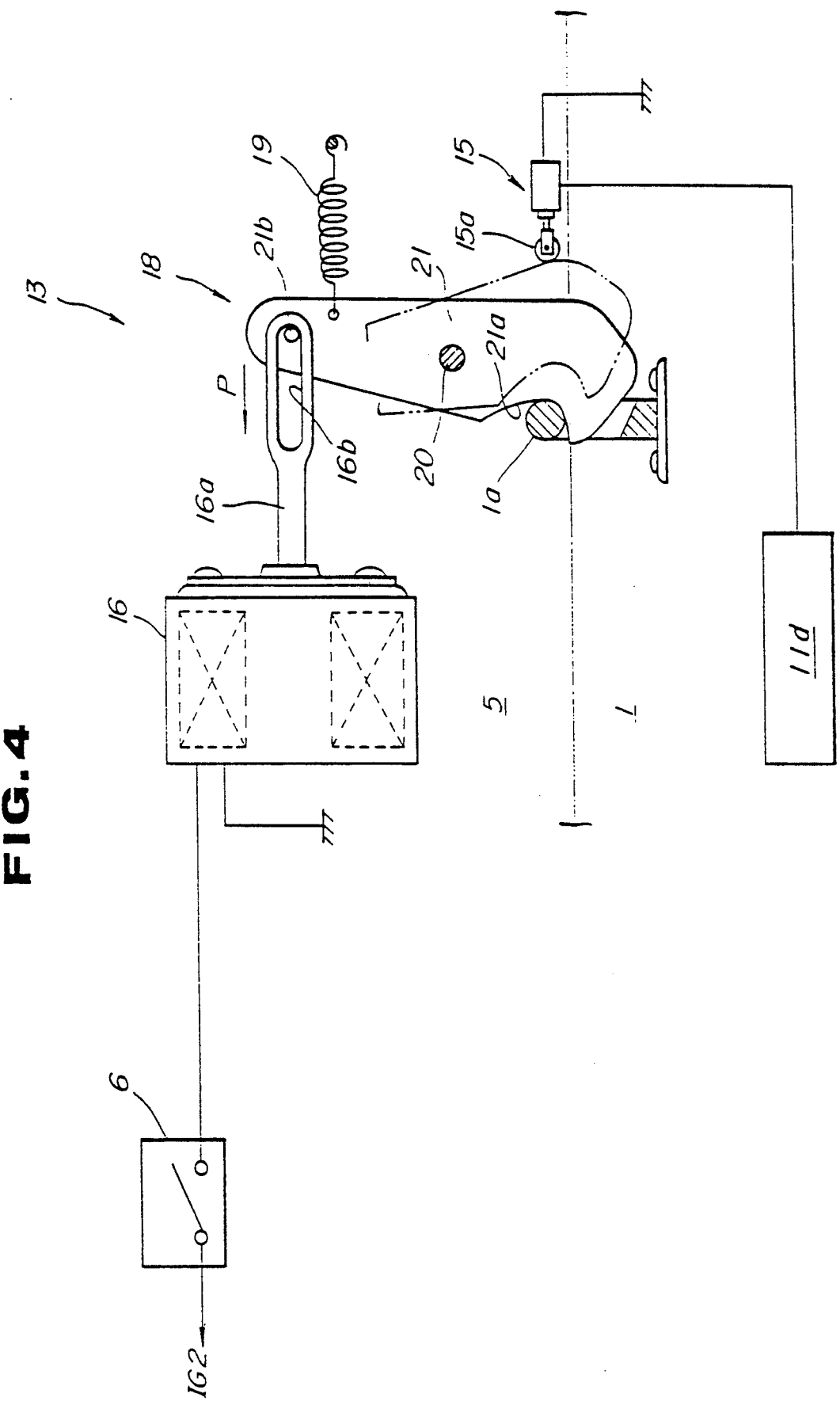
FIG. 4 represents the construction of a trunk locking means for locking the trunk lid in a closed state.

The trunk locking means 13 comprises an electromagnetic solenoid 16 and a trunk locking mechanism 18, the electromagnetic solenoid being excited when a trunk opening switch 6 is turned on, as shown in FIG. 4. The trunk locking means 13 is operated so as to be locked when the trunk lid 5 is closed and to be unlocked when the trunk opening switch 6 is turned on or when a key of the trunk is opened.

As shown specifically in FIG. 4, the trunk locking mechanism 18 comprises roughly a lock lever 21 disposed on the trunk lid 5, and an engaging rod 1a. The lock lever 21 is urged in a clockwise direction in the drawing by a spring 19 disposed under tension to the trunk lid 5 so as to be pivotable about a support shaft 20. The lock lever 21 is formed with a concave portion 21a opening toward the engaging rod 1a, and an engagement of the concave portion 21a with the engaging rod 1a locks the trunk lid 5, thereby inhibiting the opening of the trunk lid 5.

As the lock lever 21 is pivoted in a counterclockwise direction in the drawing, the concave portion 21a is to be released from the engaging rod 1a to thereby unlock the trunk lid 5. More specifically, the unlocking is implemented by freely engaging a projection 21b disposed on an upper portion of the lock lever 21 with a long hole 16b of a plunger 16a mounted to the solenoid 16 and exciting the solenoid 16 with the trunk opening switch 6 turned on, thereby moving the plunger 16a toward the arrow P as indicated in the drawing and forcing the lock lever 21 to pivot in the counterclockwise direction about the shaft 20. Although not shown in the drawing, the unlocking may be also implemented by inserting a key into a trunk key cylinder disposed perpendicularly toward the face of this drawing and opening the lock directly by pivoting the lock lever 21 counterclockwise to unlock the trunk lid 5.

The trunk-unlock limit switch 15 is disposed at a position rearward of the lock lever 21 so as to allow its contactor 15a to be abutted with the lock lever 21 when the trunk lid 5 is unlocked, as indicated by the virtual two-dot-and-dash line in the drawing, thereby detecting that the trunk locking means 13 is unlocked. The detected signal from the trunk-unlocking limit switch 15 is fed to the top-evacuating circuit 11d (FIG. 1) and, when the trunk locking means 13 is unlocked, the top-evacuating circuit 11d is operated in the manner as have been described hereinabove.

An example of control by means of the top-evacuating circuit 11d will be described with reference to the flow chart as shown in FIG. 3(a).

First at step S1, after the flow has been started, it is judged whether or not the trunk-unlocking limit switch 15 is turned on and the trunk lid 5 is unlocked. If YES, the flow goes to step S2 and it is judged there whether or not the motor unit 10 is rotating in the clockwise direction. If it is judged that the clockwise rotation of the motor unit 10 is executed and the top member 3 is moving downward, then the top-evacuating circuit 11d is operated at step S3, thereby permitting the motor unit 10 to start being rotated counterclockwise at step S9. This counterclockwise rotation of the motor unit 10 permits an upward evacuation of the top member 3 toward the accommodating position C. Then at step S10, it is detected by the limit switch 33 that the top member 3 is evacuated on the accommodating position C on the roof 4 and, at step S11, the motor unit 10 is suspended.

Then the flow proceeds to step S12, and the motor unit 8 is rotated counterclockwise, thereby allowing the top member 3 placed on the board member 24 to move in a forward direction in a given distance. As it is detected that the top member 3 has been advanced in the given distance, the flow proceeds to step S13 where it is judged there whether the limit switch 30 is operated or not. If the limit switch 30 is turned on, then at step S14, the motor unit 8 is suspended. This operation allows the top member 3 to be accommodated in a folded state on the board member 14 and locked at the position C.

Turning back to step S2, when it is judged there that the motor unit 10 is not rotating counterclockwise, then it is judged at step S4 whether or not the limit switch 32 is turned on. When it is judged that the limit switch 32 is turned on, namely, when the top member 3 is accommodated at the position H located on the trunk lid 5, the top-evacuating circuit 11d starts operating at step S5. Then at step S6, the motor unit 8 is rotated clockwise to slide the top member 3 on the board member 24 backward from the position K until the limit switch 31 turns on. At step S7, the limit switch 31 turns on, then the flow proceeds to step S8 where the motor unit 8 is suspended. Thereafter a series of the operation from step S9 to step S14 is repeated to allow the top member 3 to transfer upward to the accommodating position C on the roof and to be locked there.

When it is judged at step S4 that the limit switch 32 is not turned on, the flow ends. Furthermore, at step S1, when it is judged that the limit switch 15 is not turned on, then the flow is returned.

Figure 3B:
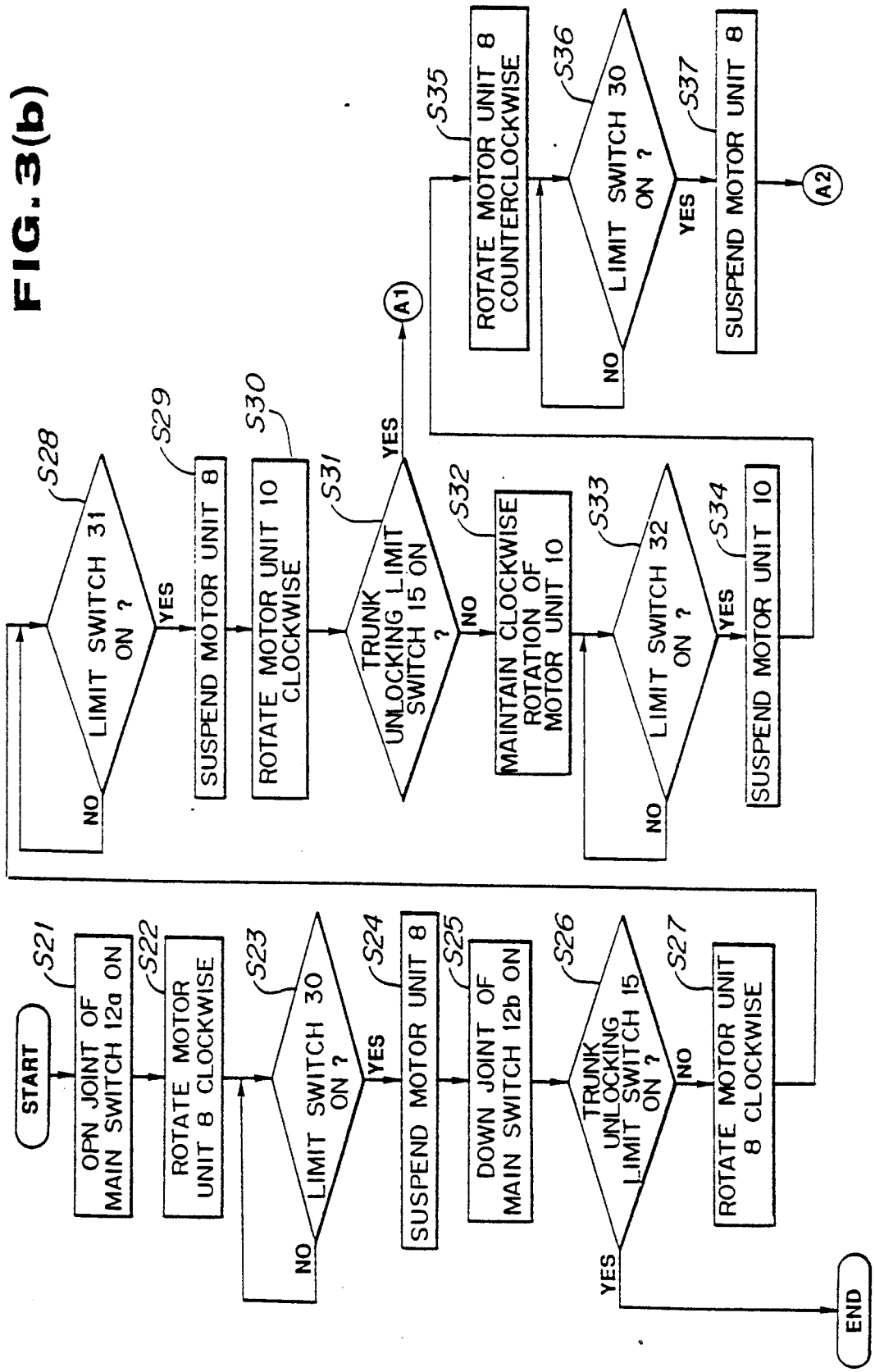
FIG. 3(b) is a flow chart showing an embodiment of control for accommodating the flexible top in a folded state.

The following is description on an example of the contents of a basic control over a canvas top control system in which such a top-evacuating system as have been described hereinabove is incorporated, with reference to the flow charts as shown in FIGS. 3(b) and 3(c).

(1) Uncovering the top member 3 in a closed state and accommodating it:

As shown in FIG. 3(b), at step S21, the OPN joint of the main switch 12a is brought into contact, thereby allowing the opening-closing control unit 11a to generate a signal for rotating the motor unit 8 clockwise and, at step S22, the motor unit 8 is rotated clockwise to slide the top member 3 in the backward direction until the limit switch 30 is turned on at step S23. Then at step S24, the motor unit 8 is suspended and the top member 3 is folded at the position K on the board member 24 disposed at the accommodating position C and uncovering the roof aperture 2 with the top member 3.

Then the flow proceeds to step S25 and the DOWN joint of the main switch 12b is turned on. Thereafter, at step S26, it is judged whether or not the trunk-unlocking limit switch 15 is turned on. As it is judged there that the limit switch 15 is turned off, a signal for rotating the motor unit 8 clockwise is generated from the unlocking control unit 11b and the motor unit 8 is rotated in the clockwise direction at step S27, thereby allowing the top member 3 to be moved or slid further backward in a given distance up to the position at which the limit switch 31 is turned on. As the limit switch 31 is turned on at step S28, then the top member 3 is suspended at step S29 and the board member 24 is unlocked by means of the locking mechanism 9a. Thereafter, a signal for rotating the motor unit 10 clockwise is generated from the vertical top-transfer control unit 11c and the motor unit 10 is rotated in the clockwise direction to swing the board member 24 downward with the top member 3 accommodated thereon in a folded state by means of a swinging mechanism S at step S30. When it is judged at step S31 that the trunk-unlocking limit switch 15 is not yet turned on, the clockwise rotation of the motor unit 10 is maintained at step S32 and the motor unit 10 is suspended at step S34 as the board member 24 is transferred and placed on the support base 7 of the trunk lid 5 and the limit switch 32 is turned on at step S33. Then, the unlocking control unit 11b generates a signal for a reverse rotation to the motor unit 8, and the motor unit 8 is rotated counterclockwise at step S35. This reverse rotation of the motor unit 8 allows the top member 3 to advance up to the releasing position K on the board member 24 at which the board member 24 is released. As the limit switch 30 is turned on at step S36, the motor unit 8 is suspended at step S37 as the board member 24 has been accommodated and locked on the support base 7 by means of the locking mechanism 9b. Then the flow proceeds to step S1 of FIG. 3(a).

Turning back to step S26, when it is judged that the trunk-unlocking limit switch 15 is turned on, the top member 3 is not transferred to the accommodating position H, and the flow ends. Further, as it is judged at step S31 that the trunk-unlocking limit switch 15 is turned on, the flow goes to step S3 of FIG. 3a and the corresponding operation is repeated.

(2) Continuous operation of opening top member 3 in a closed state and accommodating it:

Referring to FIG. 3(c), when the AUT joint of the main switch 12c is contacted at step S41, the motor unit 8 starts rotating in the clockwise direction at step S42, thereby transferring the top member 3 in a full closed state in the backward direction from the position K to uncover the roof aperture and folding it onto the board member 24 disposed on the accommodating position C on the roof. The folding is continued until the limit switch 31 is turned on at step S43, whereby the top member 3 is folded on the board member 24 and accommodated thereon. The motor unit 8 is then suspended at step S44 as the limit switch 31 is turned on. In this state, the locking of the board member 24 by means of the locking mechanism 9a is released. Immediately thereafter it has been judged that the limit switch 31 was turned on, it is further judged at step S45 whether the trunk-unlocking limit switch 15 is turned on or not. If it is judged there that the limit switch 15 is turned off, the motor unit 10 starts rotating clockwise at step S46, thereby allowing the board member 24 with the top member 3 folded and accommodated thereon to be transferred downward. During this step, a judgment on the state of the trunk-unlocking limit switch 15 has been continued and the clockwise rotation of the motor unit 10 has also been maintained at step S48 until the limit switch 15 is turned on at step S49. When it has been confirmed by the limit switch 32 at step S49 that the board member 24 was transferred to the support base 7, the motor unit 10 is suspended at step S50 and then the motor unit 8 starts rotating counterclockwise at step S51, thereby allowing the top member 3 to advance to the position K while it has been placed on the board member 24. As the top member 3 is allowed to advance up to the position at which the limit switch 30 is turned on, it is then judged at step S52 that the limit switch 30 is turned on or not, then the flow proceeds to step S53 where the motor unit 8 is suspended to have the top member 3 on the board member 24 accommodated and locked on the support base 7. Then the flow proceeds to step 1 of FIG. 3(a).

At step S45, when it is judged that the trunk-unlocking limit switch 15 is turned on, in other words, that the trunk lid 5 can be opened, the flow proceeds to step S12 of FIG. 3a and the top member 3 is locked at the accommodating position C on the roof 4 together with the board member 24. Further, when it is judged at step S47 that the trunk-unlocking limit switch 15 is turned on, the flow advance to step S3 of FIG. 3(a) to evacuate the top member 3 together with the board member 24 by transferring it upward to the accommodating position C in order to avoid an interference or contact with the trunk lid 5 when it is opened.

While the AUT joint of the main switch 12c is on, either of the CLS joint of the main switch 12a or the UP joint of the main switch 12b is turned on, whereby the motor unit 8 or the motor unit 10 starts rotating in the reverse direction so as to close the top member 3 or to transfer it upward.

It is provided herein that, in order to have the trunk lid 5 opened directly by means of the key or to have the top-evacuating system operated, a circuit may be arranged so as to connect the control unit 11 as well as the motor unit 8 and 10 directly to an electric source consisting of a battery, when the trunk-unlocking limit switch 15 is turned on. As have been described hereinabove, when the top-evacuating system is incorporated into the flexible top control system and the trunk locking means 13 is unlocked, the top member 3 is transferred to the position C where it does not interfere to contact with the trunk lid 5 when the lid 5 has been opened so that the trunk lid 5 can be opened without any interference or abutment with the top member 3. This arrangement improves safety in handling the trunk lid 3 and prevents damages and injuries of the top member 3 and the trunk lid 5 as well.

The opening-closing control and the vertical-transfer control of the top member 3 will be described specifically in conjunction with flow charts as shown in FIGS. 30 to 33.

Figure 30:
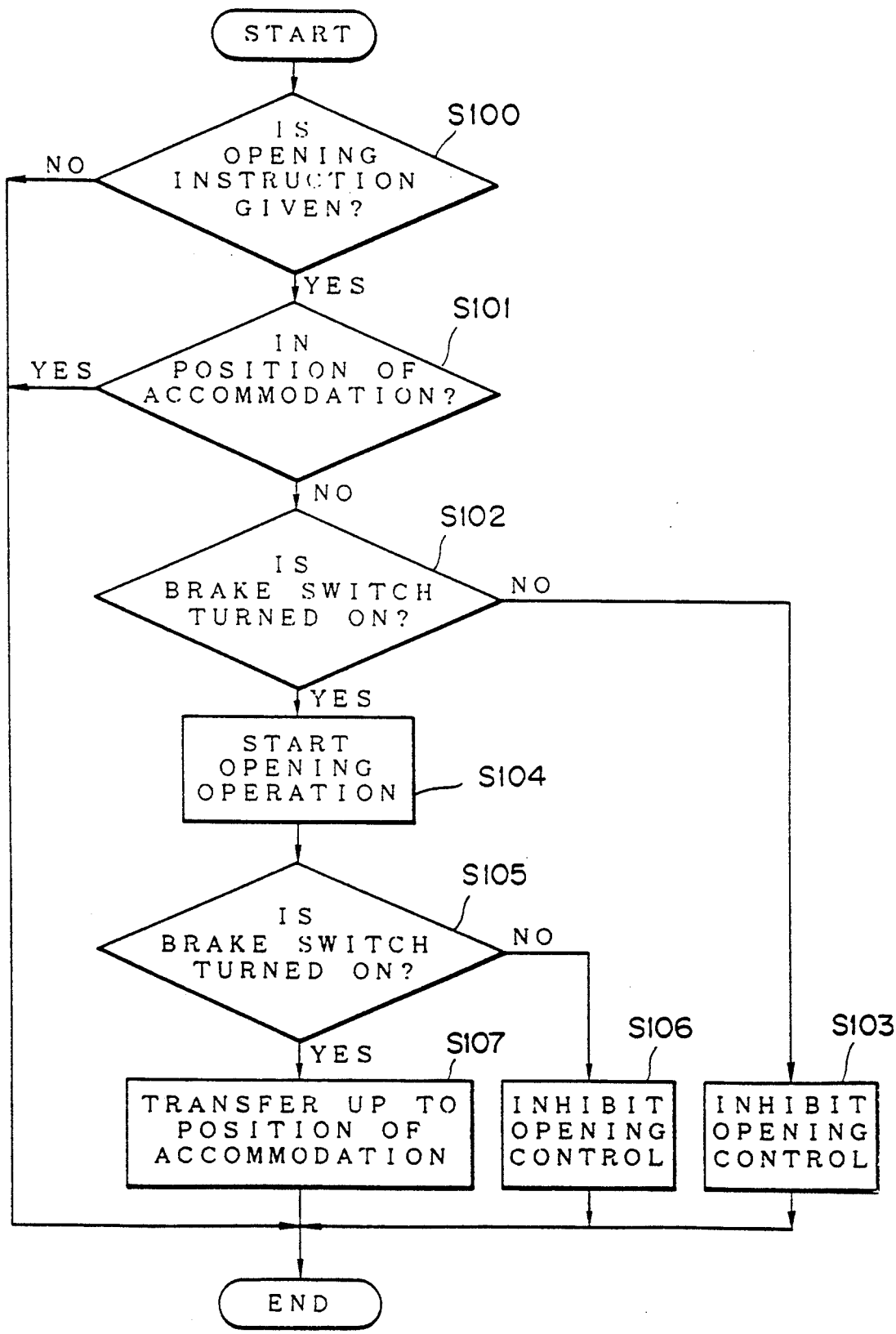
FIGS. 30 to 33 are flow charts showing an embodiment of opening and closing control and vertical-transfer control of the flexible top.

FIG. 30 represents an embodiment of the opening control of the top member 3 in which it is transferred from the closed state or the "semi-open" state to the accommodating position C.

First, at step S100, it is judged whether an opening instruction is given. When it is decided that the opening instruction is given, it is then confirmed at step S101 that the top member 3 is not located in the position of accommodation C. Then at step S102, whether the brake switch PS is turned on is judged. When it is decided that the brake switch PS is not turned on, on the one hand, it is then judged that the vehicle is in a running state and the flow proceeds to step S103 where control by the OPN/CLS control unit 11a is inhibited. In other words, the top member 3 is not moved to open even if the first main switch 12a would be operated in a state in which the vehicle is running.

When it is decided at step S102 that the brake switch is turned on, on the other hand, it is judged that the vehicle halts and the flow proceeds to step S104 where the control by the OPN/CLS control unit 11a will start. In other words, the second motor unit 8 starts to open the top member 3. If the brake switch PS is turned off in the course of operation for opening the top member 3 (step S105), on the one hand, it is decided that the vehicle is turned to a running state and control by the OPN/CLS control unit 11a is inhibited at step S106, thereby suspending the opening operation of the top member 3 in the position as it was. If it is decided at step S105 that the brake switch PS is turned on, on the other hand, the top member 3 is transferred up to the position of accommodation C (the second position), thereby opening the roof aperture 2.

Figure 31:
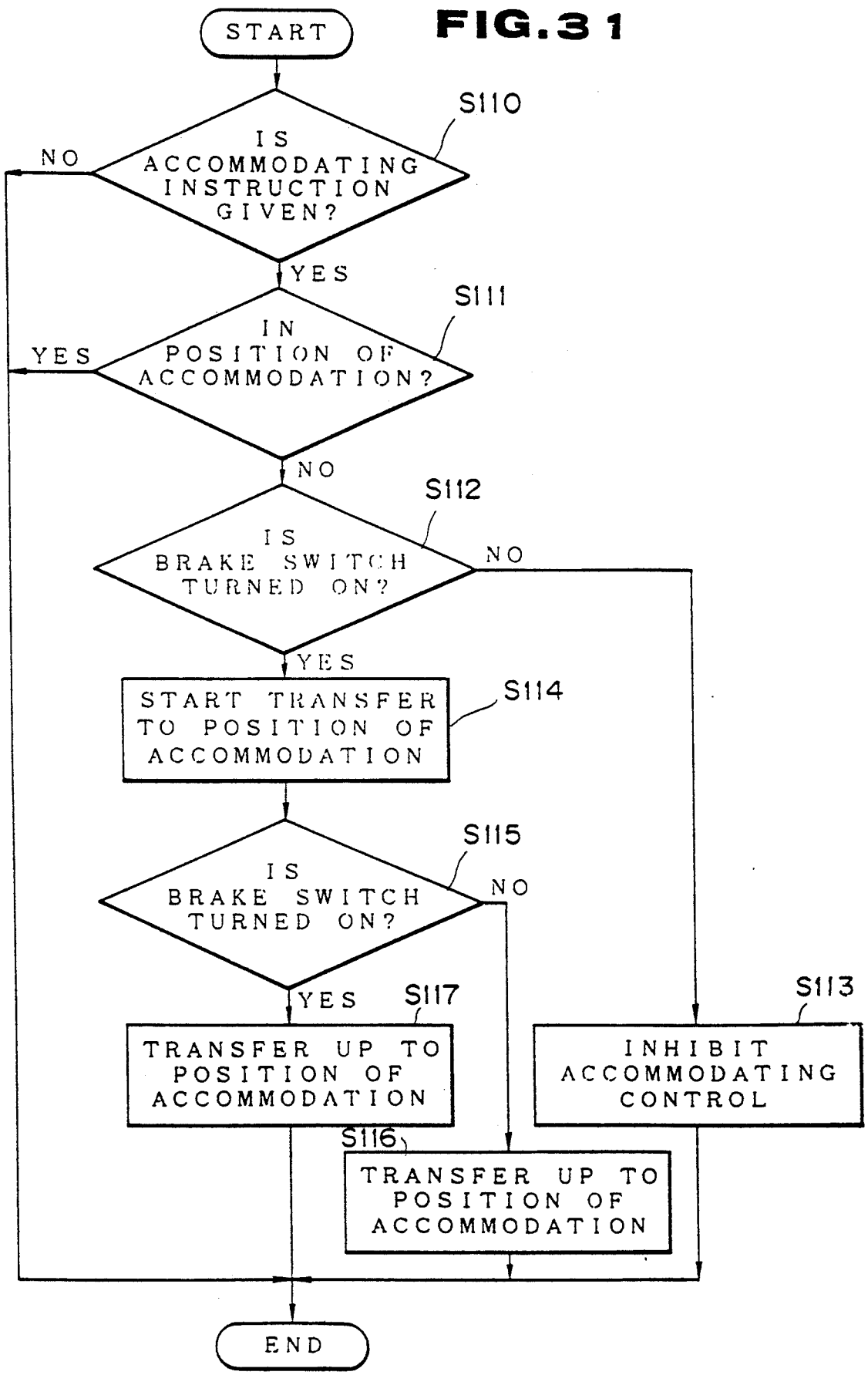

FIG. 31 represents an embodiment of control in which the top member 3 is transferred downwards from the position of accommodation C (the second position) to the position of accommodation H (the third position).

As shown in FIG. 31, it is first judged at step S110 whether a downward transferring instruction is given from the second main switch 12b. When YES, it is then confirmed at step S111 that the top member 3 is not located in the position of accommodation H. Then at step S112, it is judged whether the brake switch PS is turned on. If NO at step S112, it is decided that the vehicle is in a running state so that the control by the vertical-transfer control unit 11c is inhibited at step S113. Therefore, even if the second main switch 12b would be operated in a running state of the vehicle, the vertical movement of the top member 3 is not implemented.

When YES at step S112, it is decided that the vehicle halts and the flow advances to step S114. At step S114, the control by the vertical-transfer control unit 11c starts. More specifically, the second motor unit 8 starts and the top member 3 in the accommodating position C is unlocked. Thereafter, the first motor unit 10 starts to begin a downward movement of the top member 3. This downward movement of the top member 3 is then continued regardless of whether the brake switch PS is kept being turned on or turned off in the course of the downward operation of the top member 3, and the top member 3 is accommodated in the position of accommodation H (steps S115 to S117). In other words, this downward movement of the top member 3 is designed so as to continue after the top member 3 starts its downward movement again even if the vehicle would have turned to a running state from its halt state.

Figure 32:
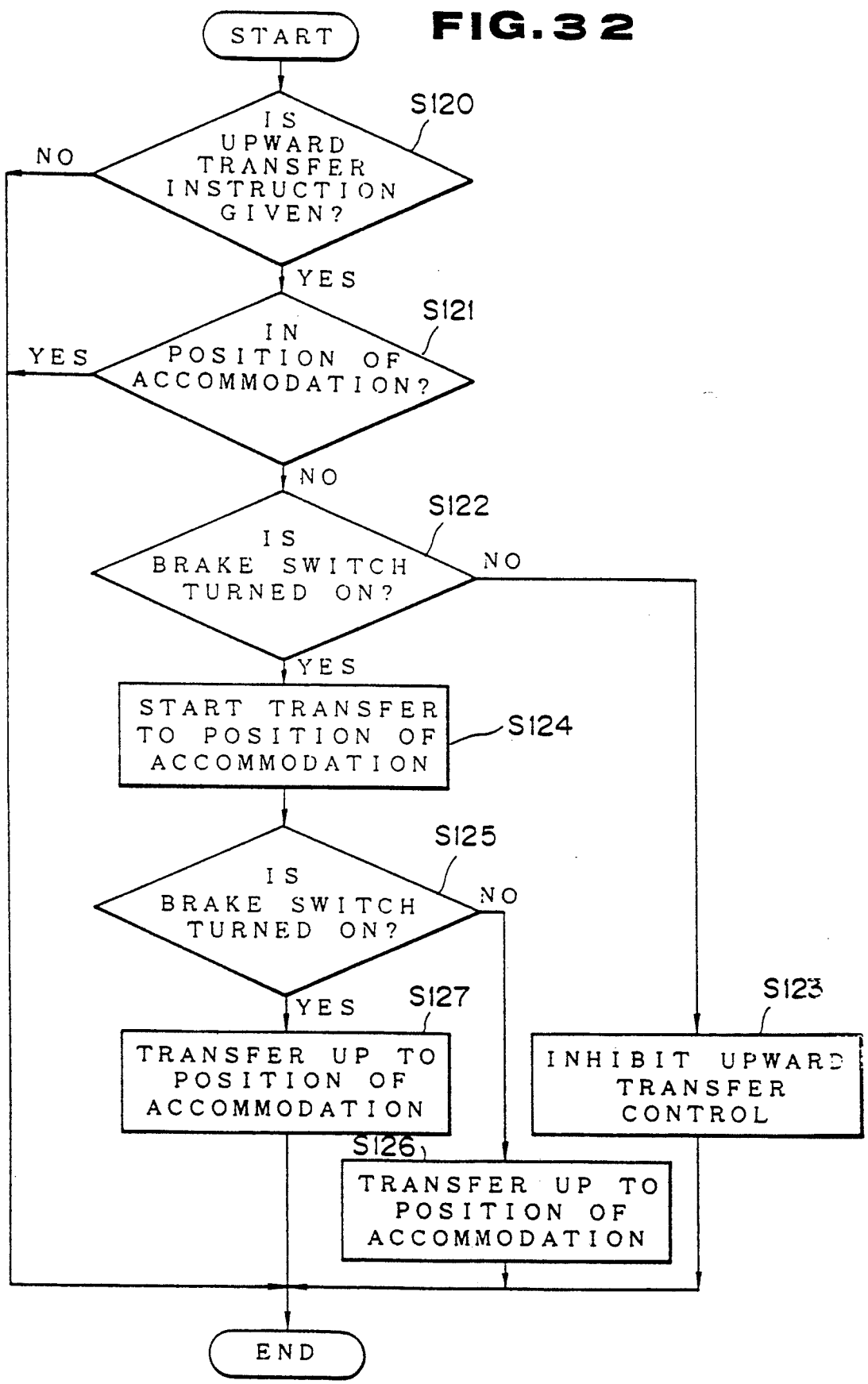

FIG. 32 indicates an embodiment of control for transferring the top member 3 from the position of accommodation H (the third position) to the position of accommodation C (the second position).

In FIG. 32, it is first judged at step S120 whether the second main switch 12b gives the upward-transfer instruction. If YES, it then is judged at step S121 whether or not the top member 3 is located in the accommodating position C. After it is decided that the top member 3 is not located in the position C, it is further judged at step S122 whether the brake switch PS is turned on. IF NO, it is decided that the vehicle is in a running state and the flow advances to step S123 where control for the upward transfer by the vertical-transfer control unit 11c is inhibited. This inhibits the upward transfer of the top member 3 even if the second main switch 12b would be operated in a state that the vehicle is running.

If it is decided at step S122 that the brake switch is turned on, in other words, that the vehicle halts, the flow then proceeds to step S124 and the control starts by the vertical-transfer control unit 11c. In this case, the second motor unit 8 starts and the top member 3 in the accommodating position H is unlocked. Thereafter, the first motor unit 10 starts, thereby starting the upward movement of the top member 3. This allows a continuation of the upward movement of the top member 3 and a movement thereof to the position C regardless of whether the brake switch PS is kept turned on or whether it is turned off in the course of the upward operation thereof (steps S125 to S127). Once the top member 3 starts upward operation, this upward operation of the top member 3 is continued even if the vehicle would turned to a running state from its halt state.

Figure 33:
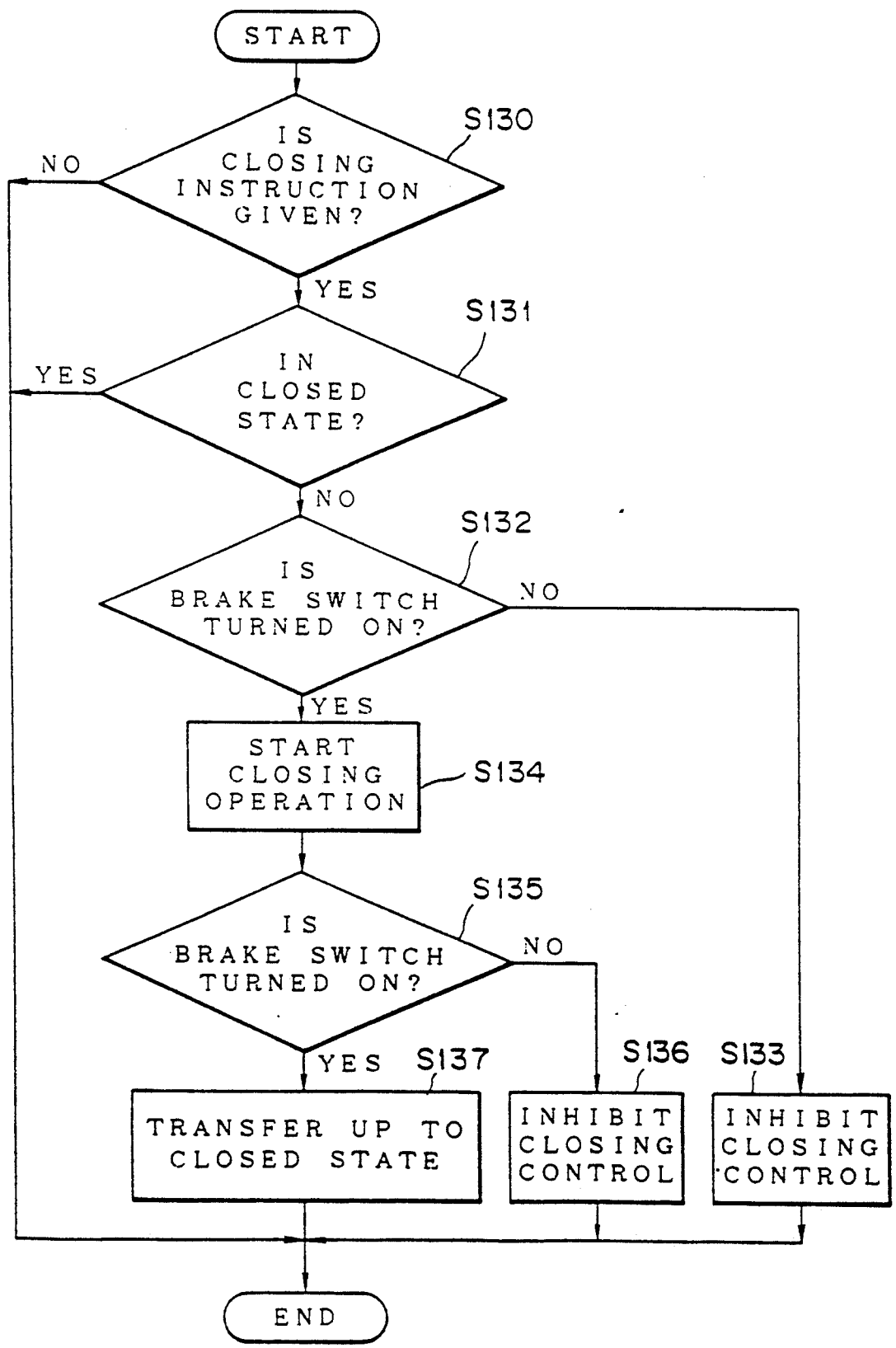

FIG. 33 illustrates an embodiment of control for transferring the top member 3 to its closed state (the first position) from the accommodating position C (the second position) or from the "semi-open" state.

As shown in FIG. 33, it is first judged at step S130 whether a closing instruction is given from the first main switch 12a. When the closing instruction is given, it is confirmed at step S131 that the top member 3 is not in a closed state. Thereafter, at step S132, it is judged whether the brake switch PS is turned on. If NO, on the one hand, it is decided that the vehicle is in a running state and control by the OPN/CLS control unit 11a is inhibited at step S133. In this case, the closing operation of the top member 3 is not implemented even if the first main switch 12a would be operated during running. If YES at step S132, on the other hand, it is decided that the vehicle halts so that control by the OPN/CLS control unit 11a starts at step S134. In this case, the second motor unit 8 starts to close the flexible top member 3 starts. In the course of the closing operation of the top member 3, even if the brake switch PS is turned off (step S135) or the vehicle is turned to a running state, on the one hand, the control by the OPN/CLS control unit 11a is inhibited at step S136, thereby suspending the closing operation of the top member 3 in the position as it was. If the brake switch PS is kept on being turned on in the course of the closing operation of the top member 3, on the other hand, the top member 3 is transferred up to its closed state at step S137, thereby bringing the roof aperture 2 into its full closed state.

Figure 34:
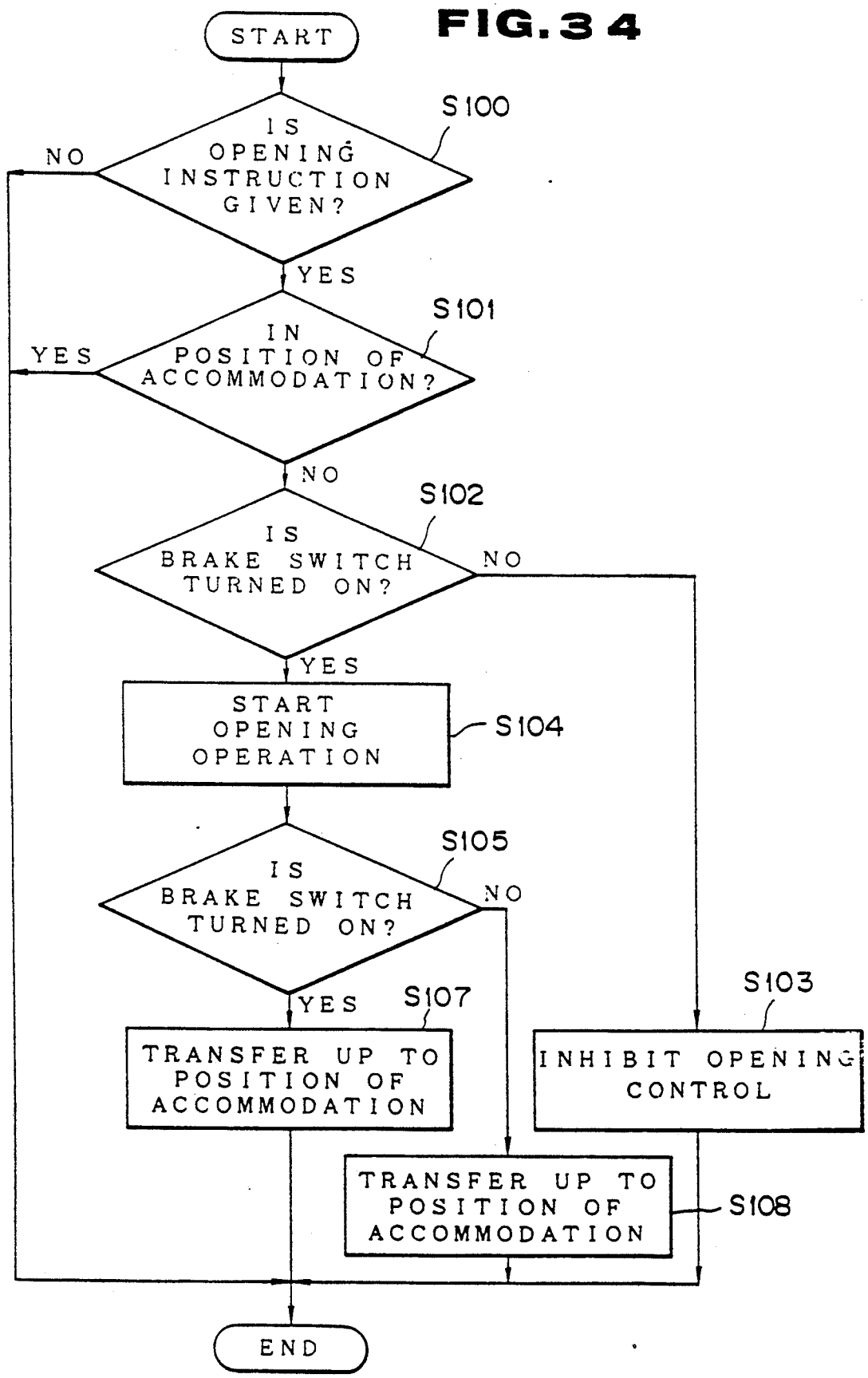
FIGS. 34 and 35 are flow charts showing a variation in control of opening and closing the flexible top.
Figure 35:
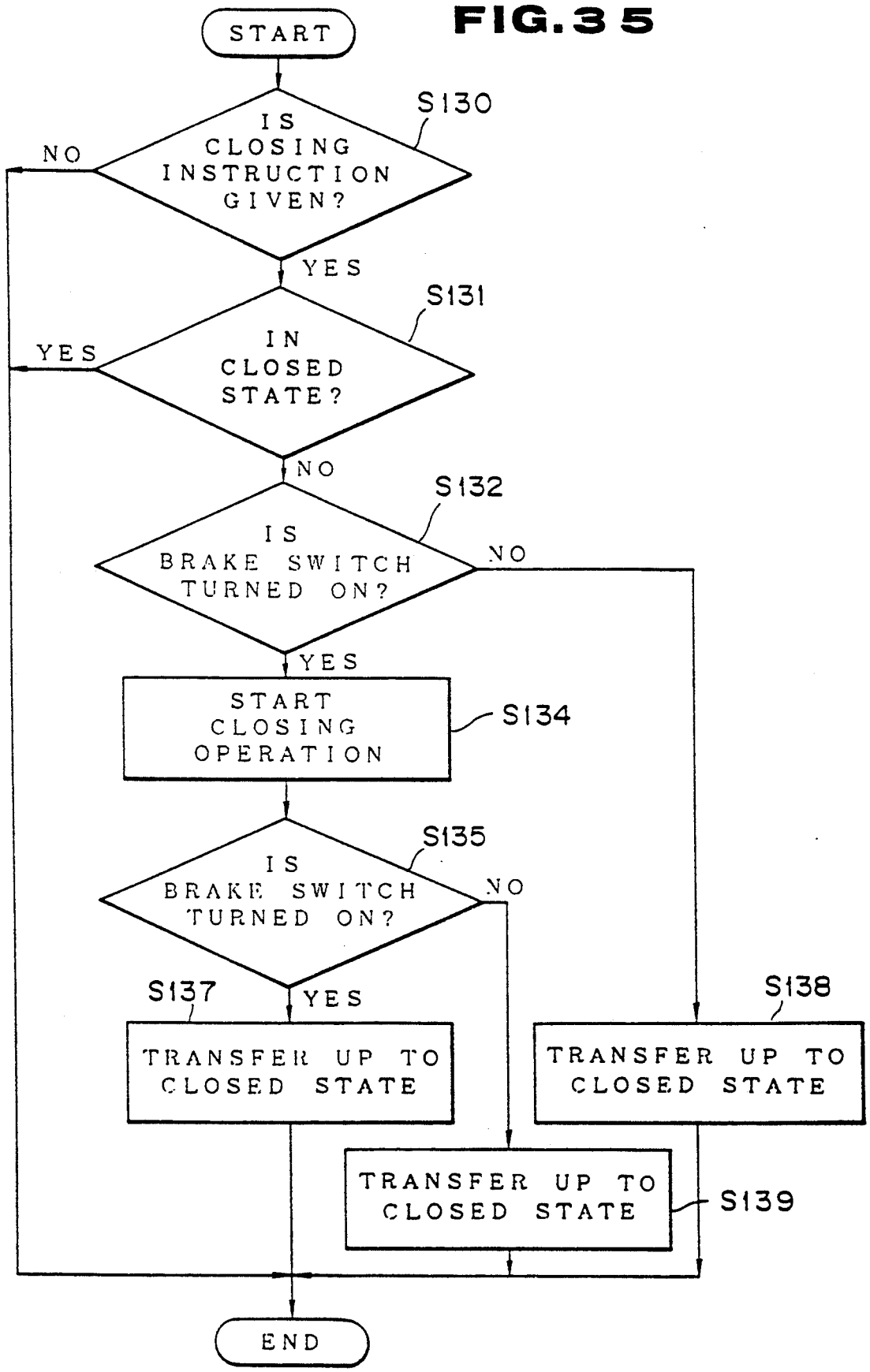

FIG. 34 illustrates a variation in the opening control as shown in FIG. 30, and FIG. 35 illustrates a variation in the closing control as shown in FIG. 33. In the description on these variations, the same steps are provided with the same reference alphanumerals as those used in FIGS. 30 and 35, respectively, and description in duplicate is omitted for brevity of explanation. The following is description on characteristic portions of the variations.

In the opening control as shown in FIG. 34, when the brake switch PS is turned off in the course of the opening operation of the top member 3 (step S105), the flow proceeds to step S108 and the opening operation of the top member 5 is continued to transfer it up to the accommodating position C. In other words, even if the vehicle is turned to a running state in the course of the opening operation of the top member 3, the control by the OPN/CLS control unit 11a is continued. It is to be noted herein that the control by the OPN/CLS control unit 11a may be performed at step S103.

In the closing control as shown in FIG. 35, the closing control of the top member 3 is implemented regardless of whether the vehicle is in its halt state or in its running state (steps S138 and S139).

It is further to be noted that the running state or the halt state of the vehicle may be detected in the opening-closing control or the upward-transfer control of the top member 3, for example, by the presence or absence of revolutions of the wheels, although it is detected by the brake switch PS in this embodiment.

Second Embodiment

In this second embodiment, the same reference numerals and symbols are provided for the identical elements as in the first embodiment, and duplicate description of these elements will be omitted from the following description for brevity of explanation.

Figure 36:
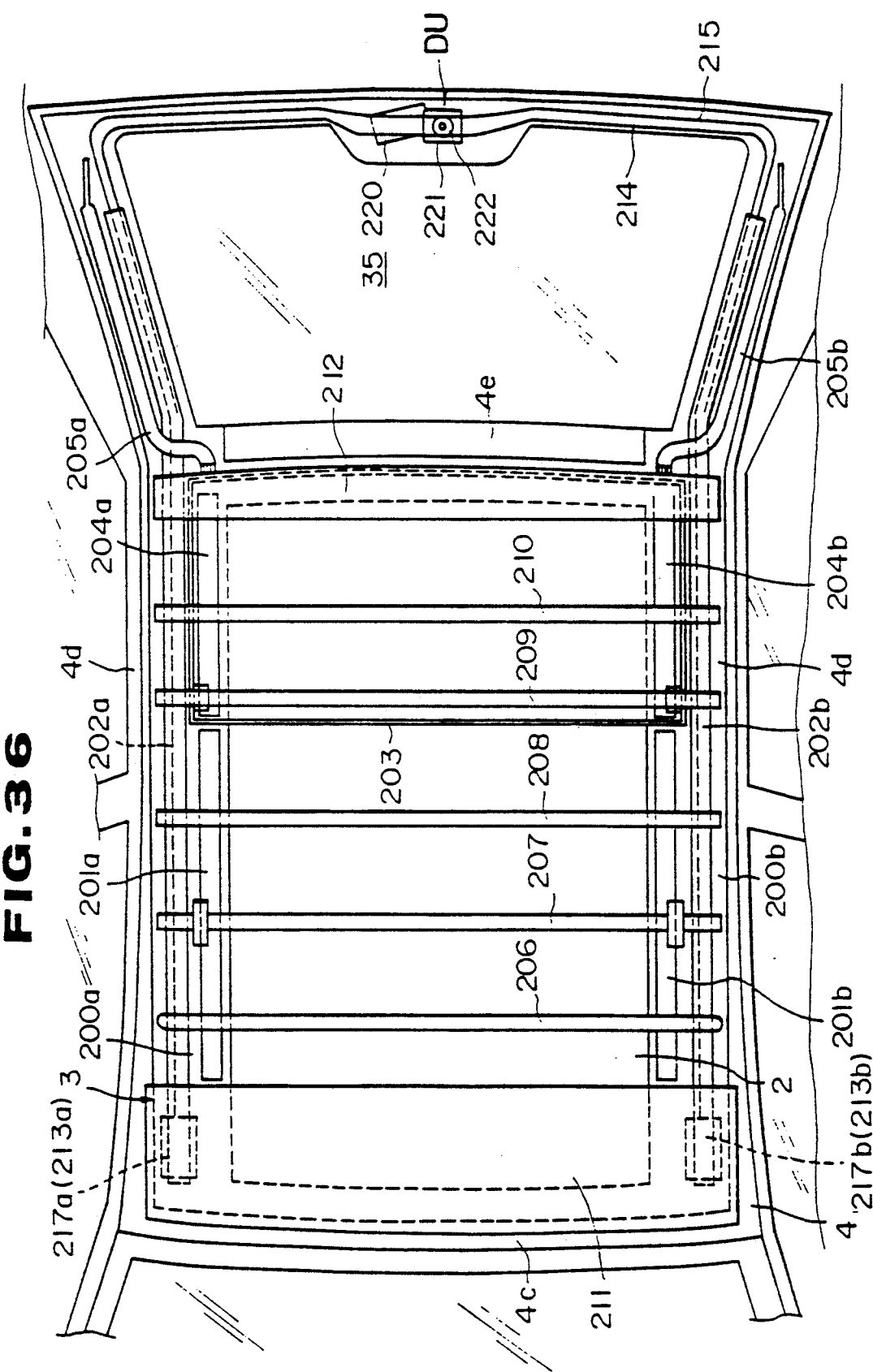
FIG. 36 is a plan view showing a canvas top vehicle according to a second embodiment of the present invention.

As shown in FIG. 36, the roof panel 4 is provided with flange portion 200a and 200b on a circumferential side portion of the opening 2. The flange portions 200a and 200b disposed on the both sides in the transverse direction of the vehicle body extend from the front header 4c over the rear header 4e toward the rear window glass panel 35. On the side of the rear window glass panel 35, the flange portions 200a and 200b expanded outward in the transverse direction as they extend downward along the peripheral side edge portions of the rear window glass panel 35.

The flange portions 200a and 200b are mounted with guide rails 201a and 201b, respectively, as shown in FIG. 36. The guide rails 201a and 201b extend in parallel to each other from the forward end portion of the opening 2 until halfway to a rearward end thereof, and they are provided with 12 of the first guide rails 201a and 201b, respectively, opening inward in the transverse direction of the vehicle body.

Furthermore, as shown in FIG. 36, the flange portions 200a and 200b are mounted with second guide rails 202a and 202b disposed outward of the first guide rails 201a and 201b in the transverse direction of the body. The second guide rails 202a and 202b are disposed extending from the forward end of the opening 2 across the rear header 4e toward a lower position of the rear window glass panel 35. On the side of the rear window glass panel 35 rearward of the rear header 4e are disposed the guide rails 202a and 202b so as to part from each other farther away at substantially the same angles as they extend downward along the side circumferential portions of the rear window glass panel 35. Each of the second guide rails 202a and 202b is provided over its entire length with upper and lower guide grooves. Each of the upper and lower guide grooves has an opening facing outward in the transverse direction of the body.

Referring back to FIG. 37, a board member 203 is mounted on the roof panel 4 so as to bridge the flange portions 200a and 200b on the inner side of the guide rails 202a and 202b. The board member 203 is disposed between the rearward ends of the first guide rails 201a, 201b and the rearward end portions of the roof opening 2 and is provided thereon with a pair of guide rails 204a and 204b. The guide rail 204a is disposed so as to become continuous toward the first guide rail 201a while the guide rail 204b is disposed so as to become continuous toward the first guide rail 201b. The guide rails 204a and 204b have guide grooves opening facing inward in the transverse direction of the body, like the first guide rails 201a and 201b. The board member 203 is connected to a pair of link members (second link members) 205a and 205b as will be described hereinafter and is mounted so as not to be displaceable on the roof 4.

As have been described hereinabove, the guide rails 204a (204b) and 201a (201b) are composed separately, thus constituting an inner guide rail, and the guide rail 202a (202b) constituting an outer guide rail.

The flexible top 3 is disposed on the roof 4 when the roof opening 2 is closed. In this embodiment, the flexible top 3 comprises a leather top, a sealing leather mounted on the inner of the leather top, plural skeletons 206 to 210 mounted on the sealing leather, a front hard board 211 mounted on the forward end side of the leather top, and a rear hard board 212 mounted on the rearward end side of the leather top. The leather top and sealing leather are not shown in FIG. 37. It is noted that they are composed of a flexible sheet.

Figure 38:
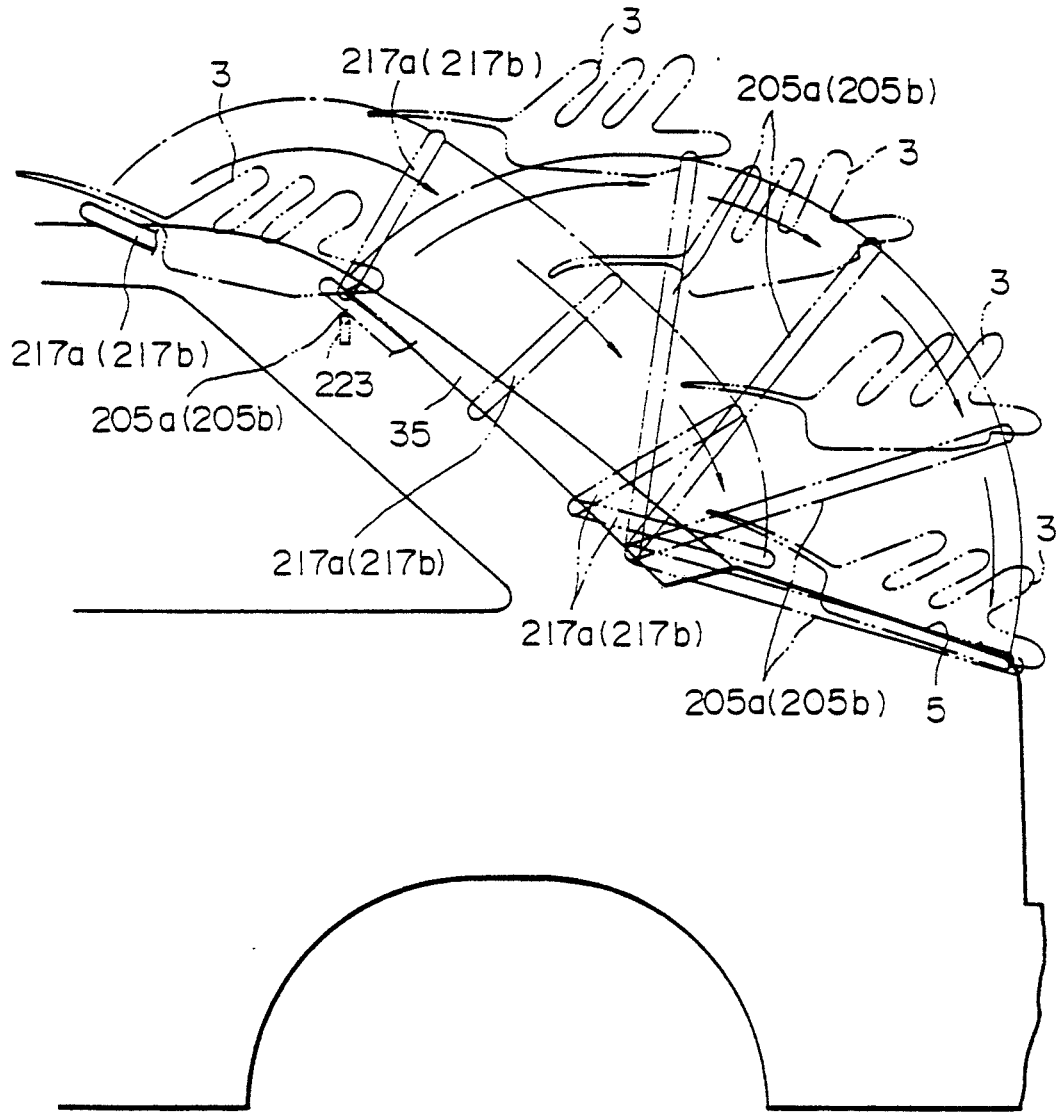
FIG. 38 represents the locus of the canvas member and the board member between the roof position and the position downward of the rear window glass panel according to the second embodiment.

The flexible top 3 is such that the rear hard board 212 is fixed to the rearward end portion of the board member 203 and the front hard board 211 is mounted astride over the upper surfaces of the guide rails 202a and 202b. Both end portions of the skeletons 207 and 209 of the flexible top 3 are slidably supported by the guide grooves of the respective guide rails 201a, 201b and 204a, 204b, and the both end portions of the skeletons 206, 208, 210 are disposed astride over the guide rails 201a, 201b and 204a, 204b, while an upward displacement of the flexible top is regulated in each case. This arrangement enables the front hard board 211 to be displaced or transferred toward the rear of the body and the flexible top 3 to be folded or contracted in a wavy form and placed onto the board member 203 (located at a second posture) as shown in FIG. 38, thus opening the roof opening 2 in such a manner as in the first embodiment shown in FIG. 27. On the contrary, a displacement of the front hard board 211 toward the front of the body folds and expands the flexible top 3 and closes the roof opening 2 (located at a first posture) as shown in FIG. 26.

Each of the second guide rails 202a and 202b supports detachably a moving member 213 having a square C-shaped section. To the moving member 213 is connected a cable (wire) 214 or 215 drivable by a drive unit DU as will be described hereinafter. The moving member 213 slides the guide rail 202a or 202b by means of the cable 214 or 215 and a driving force applied by the drive unit DU.

Each of link members 217a and 217b (first link members) is supported pivotably at its one end portion by each of the moving members 213, respectively. Between the link members 217a, 217b and the moving member 213 is interposed a spring (not shown) which urges the link members 217a and 217b toward the moving member 213. Each of the link members 217a and 217b is supported at its other end portion by the front hard board 211 which, in turn, is disposed so as to be displaceable in its transverse direction.

Figure 37:
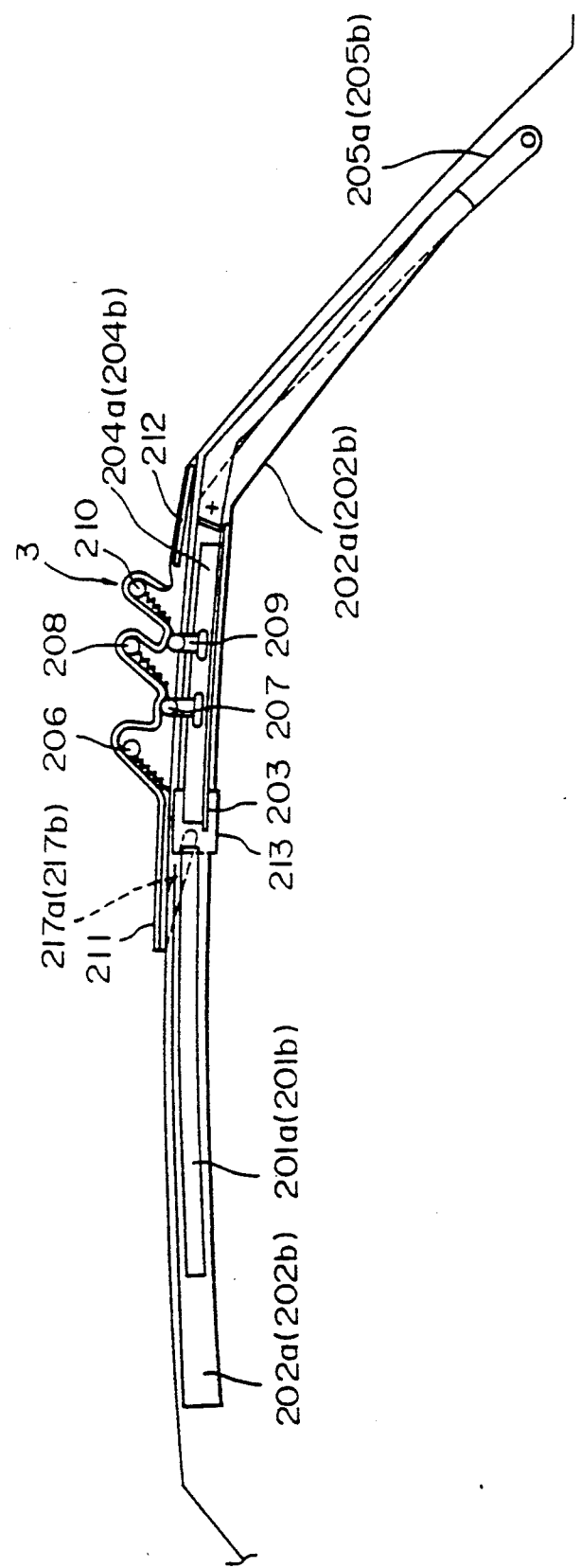
FIG. 37 is an abbreviated, longitudinal sectional view showing the canvas top vehicle of FIG. 36.

Turning then to FIG. 37, the board member 203 is connected to the vehicle body 51 through a pair of the link members 205a and 205b. The link members 205a and 205b are longer in length than the respective link members 217a and 217b and extend along the respective second guide rails 202a and 202b on the side rearward of the body from the near header 4e. Each of the link members 205a and 205b are pivotably supported at its one end portion, on the one hand, by the body 51 on the rearward end side of the respective guide rails 202a and 202b in such a manner that the direction of the center of the pivotal axis coincides substantially with the transverse direction of the body.

Figure 39:
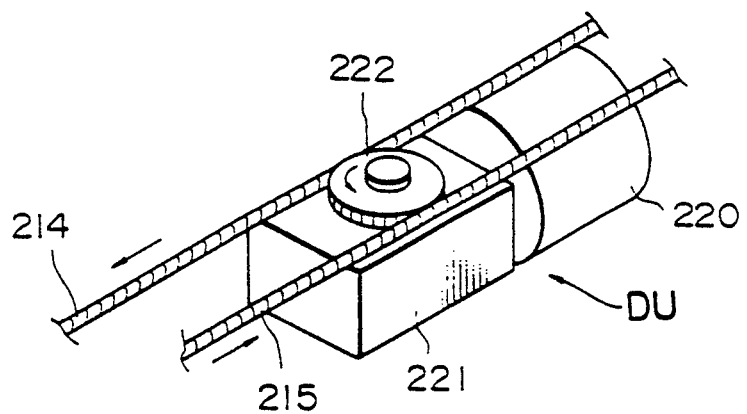
FIG. 39 is a perspective view showing detail of the drive unit portion according to the second embodiment.

Referring back to FIG. 36, the drive unit DU is located at a position somewhat rearward of the lower end portion of the rear window glass panel 35 and at an approximately middle position in the transverse direction of the body. As shown in FIG. 39, the drive unit DU comprises a motor 220, and a pinion 222 drivable by the motor 220 through a decelerator 221. Each of the cables (wires) 214 and 215 is provided at their outer periphery with teeth or grooves so as to be in mesh with the pinion 222. The cable 214 is disposed such that its one end may be fixed, for example, to the left-hand moving member 213 and the other end portion is slidable along the right-hand second guide rail 202a as a free end portion. Likewise, the cable 215 is mounted at its one end to the right-hand moving member 213, and its other end portion is arranged so as to be slidable as a free end portion along the left-hand guide rail 202b.

The flexible top apparatus according to the present invention has been described with respect to its structure. An action of the structure thereof will now be described hereinbelow. A movement of the moving member 213 toward the rear of the vehicle body from the posture (first posture), as shown in FIGS. 36 and 37, by means of the cables 214 and 215 driven by the drive unit DU permits a movement of the link members 217a and 217b while being guided by the guide rails 202a and 202b, respectively, in the direction toward the rear of the body, followed by a rearward displacement of the front hard board 211. This movement gradually contracts the flexible top 3 and both of the end portions of the skeletons 208 and 209 are engaged with the guide grooves of the guide rails 204a and 204b on the guide member 203, respectively, while the skeletons 206, 208, and 210 are displaced upwardly over the guide rails 204a and 204b (second posture in FIG. 31). This permits a partial opening of the roof opening.

A further rearward movement of the moving member 213 from this posture toward the rear of the body allows the respective link members 217a and 217b to stand upright by means of urging force of the spring and the like, whereby the flexible top member 3 is raised by the link members 217a and 217b through the front hard board 211 as shown in FIG. 33. As a consequence, the board member 203 is lifted up through the skeletons 207 and 209 of the flexible top member 3, thereby erecting the link members 217a and 217b in association with the movement of the board member 203. This series of the movement allows the flexible top member 3 to be located in a position higher than the rear header 4e and on the side forward of the rear header 4e.

When the moving member 213 is further moved toward the rear of the body along the guide rails 202a and 202b from the above posture, the link members 217a and 217b are further moved downwards below the rear window glass panel 35 along the guide rails 202a and 202b and the link members 217a and 217b are pivoted in a clockwise direction in FIG. 37 and then lies down gradually. As a consequence, the flexible top member 3 and the board members 203 are transferred in a position downward of the rear window glass panel 35 and eventually placed in a folded state on a trunk lid 5 (third posture). During the movement, as is shown schematically in FIG. 39, the flexible top member 3 is retained and maintained at a spaced relationship away from the vehicle body in an approximately horizontal state. This arrangement allows the roof aperture 2 to be opened to a full extent in such a manner as in the first embodiment as shown in FIG. 29.

In the second embodiment as described hereinabove, in transferring the flexible top member 3 toward the lower end portion of the rear window glass panel 35, the flexible top member 3 is arranged so as to be away from the vehicle body 51 so that the flexible top member 3 (sealing leather) can be prevented from rubbing the vehicle body. At the same time, the flexible top 3 can climb over or pass over the rear header 4e without difficulty so that it is not required to provide the rear header 4e toward the inside of the vehicle chamber in order to avoid an interference with the flexible top member 3, whereby it is not required to lower a clearance for heads of passengers seated on the rear seats.

Figure 40:
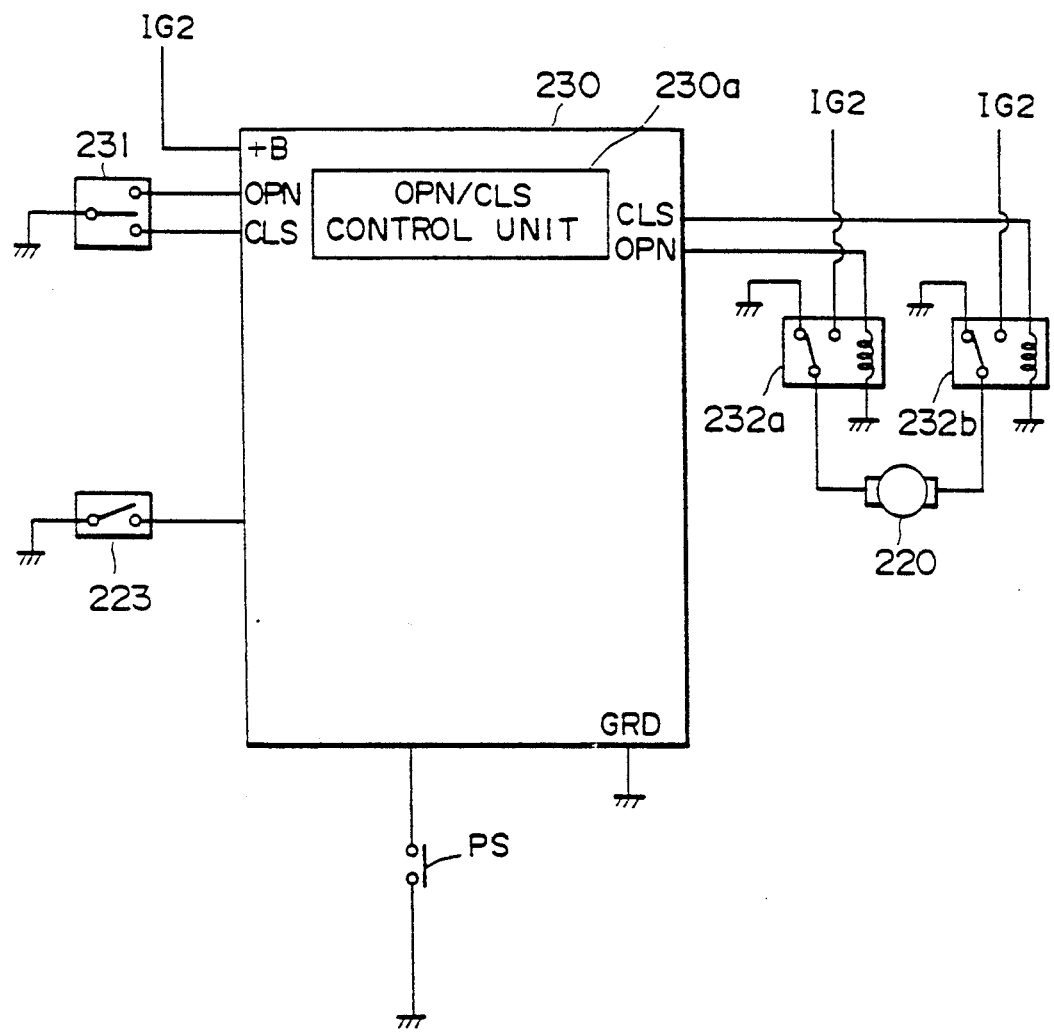
FIG. 40 is a view showing a control system of the flexible top apparatus according to the second embodiment.

As shown in FIG. 40, the flexible top member 3 is opened or closed by means of the control unit 230 which is connected on the input side to an ignition joint IG2 for receiving a supply of electricity, a main switch 231 a limit switch 223 and an input terminal for ON signal from a brake switch PS for sensing a state of operation (a state of a halt of the vehicle) of a foot brake. To the output side of the control unit 230 is connected the motor unit 220 for receiving a supply of electricity from the ignition joints IG2 through relays 232a and 232b.

The control unit 230 is provided with the OPN/CLS control subunit 230a which control the opening-closing operation of the flexible top member 3 by generating an operational signal to the motor unit 220 in response to a signal for instructing the opening-closing operation from the main switch 231.

The OPN/CLS control subunit 230a performs the opening-closing control of the roof aperture 2 and the vertical-transfer control between the rear header 4e and the trunk lid 5 under a series of operations of the flexible top member 3. The opening control of the flexible top member 3 involves a downward transfer of the top member 3 in its closed state (first posture) to the position at the rear header 4e (second posture) and then from the second posture to the third posture in the position over the trunk lid 5. On the contrary, the closing control thereof involves an upward transfer of the flexible top member 3 located in the third posture to the second posture and then from the second posture to the first posture.

Figure 41:
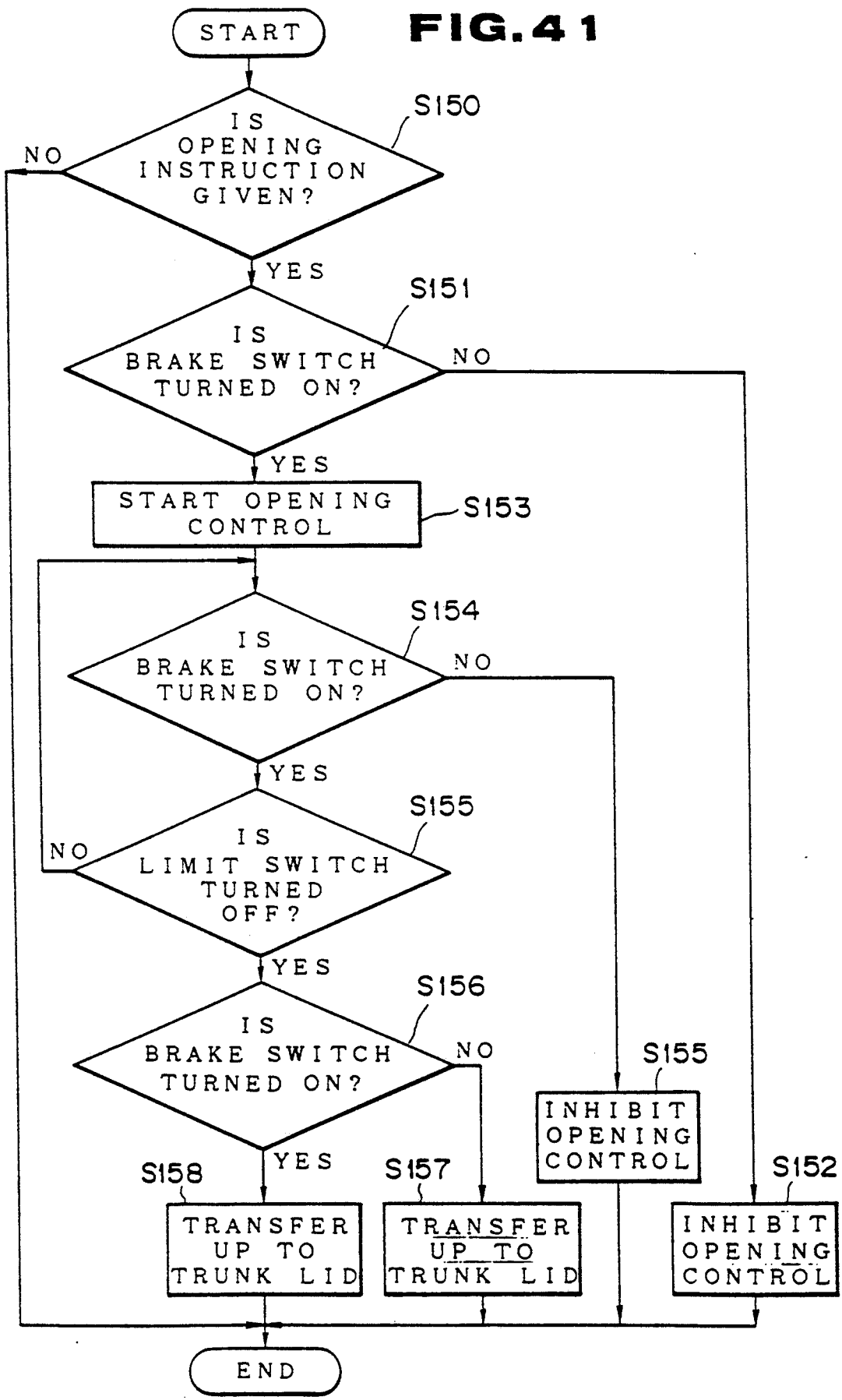
FIGS. 41 and 42 are flow charts showing an example of control according to the second embodiment.
Figure 42:
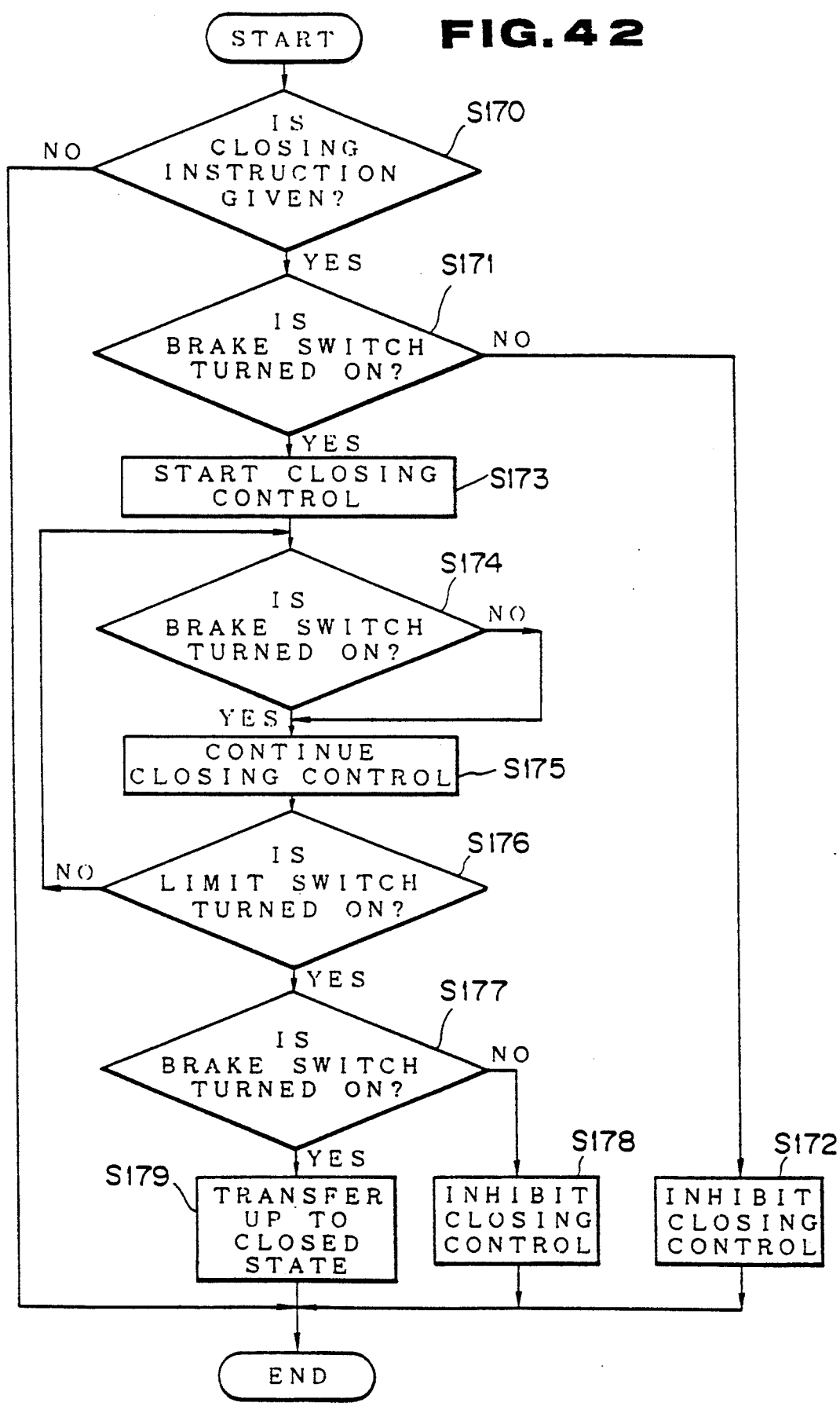

In the course of the transfer of the flexible top member 3 as briefly described hereinabove, when an OFF signal comes from the brake switch PS, control is implemented as shown in FIGS. 41 and 42.

FIG. 41 illustrates an embodiment of control for transferring the flexible top member 3 to the position over the trunk lid 5, the top member 3 being located in its closed state (first posture) or in a position between its first and second postures.

As shown in FIG. 41, it is first judged at step S150 whether an opening instruction is given by operation of the driver. When the opening instruction is confirmed, it is then judged at step S151 whether the brake switch PS is turned on. If NO, it is decided that the vehicle is in a running state and the control by the OPN/CLS control subunit 230a is inhibited at step S152. This inhibits the opening operation of the flexible top member 3 even if the main switch 232 would be operated in such a state that the vehicle is running.

If it is decided at step S151 that the brake switch is turned on and the vehicle halts, the flow then proceeds to step S153 where the opening control by the OPN/CLS control subunit 230a starts. In other words, the motor unit 220 starts opening the flexible top member 3. When the brake switch PS is turned off in the course of operation of opening the flexible top member 3 (step S154) and the vehicle turned to a running state, on the one hand, the control by the OPN/CLS control subunit 230a is inhibited to suspend the opening operation of the top member 3 in the position as it was. When the brake switch PS maintains its ON state in the course of the opening operation of the top member 3, on the other hand, it is judged at step S155 whether the limit switch 223 is switched to an OFF state. When the limit switch 223 is shifted to its OFF state, it is decided that the flexible top member 3 starts transferring from its second posture to its third posture and, at step S156, the top member 3 is kept moving downward up to the position over the trunk lid 5, regardless of whether the brake switch PS maintains its ON state or whether it is shifted to its OFF state.

More specifically, when the flexible top member 3 is in the course of transferring from its second posture to its third posture in this opening operation, on the one hand, the downward movement of the flexible top member 3 is suspended in the position as it was when the vehicle starts running. When the vehicle is shifted to its running state while the flexible top member 3 is being transferred from its second posture to its third posture and the limit switch has been switched to an off state, the top member 3 keeps moving downward as it was.

FIG. 42 illustrates an embodiment of control for transferring the flexible top member 3 from its third posture on the trunk lid 5 up to the first posture.

Given the location of the flexible top member 3 in the third posture over the trunk lid 5, it is first judged at step S170 whether the driver has given a closing instruction. When the closing instruction is confirmed, the flow proceeds to step S171 and it is judged whether the brake switch PS is turned on. When it is decided that the brake switch PS is not turned on, on the one hand, the control by the OPN/CLS control subunit 230a is inhibited at step S172. This means that no closing operation can be performed while the vehicle is running even if the main switch 231 would be operated.

When it is decided at step S171 that the brake switch PS is turned on and that the vehicle is in a state of a halt, on the other hand, the OPN/CLS control subunit 230a starts at step S173 to drive the motor unit 220 to thereby upwardly moving and closing the flexible top member 3. It is to be noted herein that the upward movement of the flexible top member 3 is continued regardless of the maintenance of the ON state of the brake switch PS or a shift thereof to the OFF state (steps S173 and S174).

Then at step S176, when the limit switch 223 is shifted to its ON state, it is decided that the flexible top member 3 is directed to its first posture from its second posture and it is then judged at step S177 whether the brake switch PS is turned on. When the brake switch PS is in its ON state, the vehicle is in a state of running so that the control by the OPN/CLS control subunit 230a is inhibited. In other words, when the vehicle is shifted to its running state in the course of transferring the flexible top member 3 from the second posture to the first posture, on the one hand, the closing operation of the top member 3 is suspended at that time. When the brake switch PS maintains its ON state in the course of transfer thereof from the second posture to the first posture, on the other hand, the flexible top member 3 is transferred up to its first posture at step S179, thereby closing the roof aperture 2.

Figure 43:
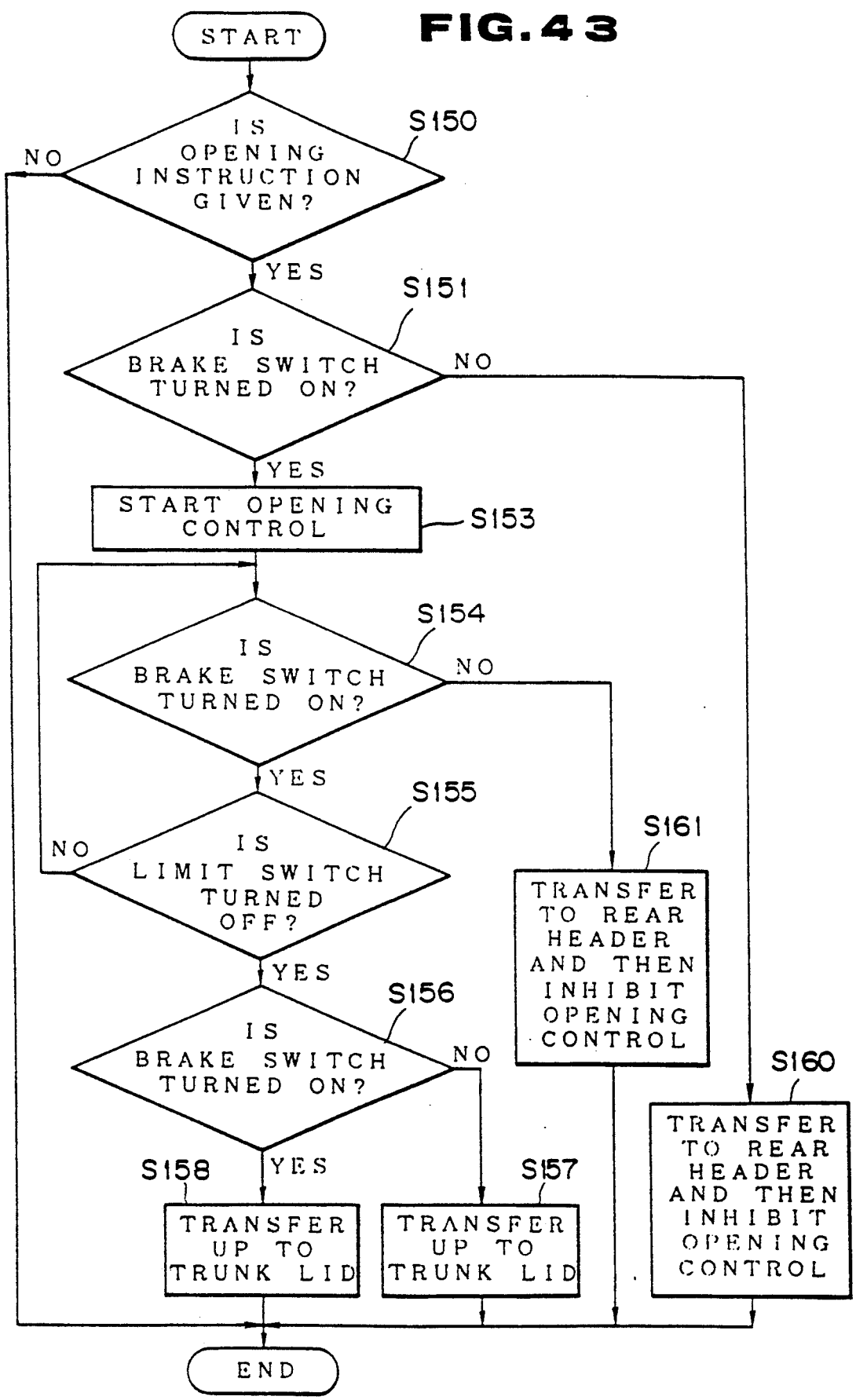

FIG. 43 illustrates a variation in the opening control in FIG. 41. FIG. 44 illustrates a variation in the closing control in FIG. 42. In FIGS. 43 and 44, the same steps are provided with the same step numbers and description of those steps will be omitted for brevity of description.

In the opening control as shown in FIG. 43, the flexible top member 3 is transferred to the second posture even if the vehicle is in a state of running (step S160). After the top member 3 starts opening while the vehicle halts, it is transferred up to its second posture even if the vehicle is shifted to its running state in the course of transferring the top member 3 from the first posture to the second posture (step S161).

The closing control as shown in FIG. 44 permits control of transferring the flexible top member 3 to the first posture to close the roof aperture 2, even if the vehicle is shifted to its running state in the course of transferring the top member 3 from the second posture to the first posture.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A flexible top apparatus of a vehicle having: a roof panel connected to a vehicle body through at least a pair of left-hand and right-hand front pillars and a pair of left-hand and right-hand rear pillars; said roof panel being provided around its perimeter with a front header, a pair of left-hand and right-hand roof side rails, and a rear header, said front header, pair of left-hand and right-hand roof side rails and rear header defining a roof opening formed in said roof panel; and a rear window glass panel fixed to said rear pillars and said rear header; comprising: a flexible top having a size as substantially large as the roof opening in a state in which said flexible top is longitudinally unfolded and expanded and being disposed to selectively take a first posture in which the roof opening is closed and a second posture in which said flexible top is longitudinally contracted at a position in the vicinity of said rear header to open the roof opening;
- a guide means disposed between said flexible top and the vehicle body for guiding said flexible top in a contracted state between said second posture and a third posture located in a vicinity of a lower end portion of said rear window glass panel, said guide means extends from the lower end portion to in front of the rear header;
- a driving means for transferring said flexible top between the second posture and the third posture;
- a switch for selectively giving an instruction to start transferring said flexible top between the second posture and the third posture;
- a state detecting means for detecting a presumed standing state in which the vehicle halts;
- a first control means for controlling the transfer of the flexible top when the vehicle is in the presumed standing state; and
- a second control means for continuing control of the transfer of the flexible top regardless of whether or not the vehicle is shifted from said presumed standing state to a presumed running state after the flexible top starts transferring between the second posture and the third posture.

2. A flexible top apparatus as claimed in claim 1, wherein said driving means is a first driving means, and said flexible top apparatus further comprising:
- a second driving means for transferring the flexible top between the first posture and the second posture;
- a second switch for selectively instructing start of transferring the flexible top between the first posture and the second posture;
- a third control means for controlling the transfer of the flexible top between the first posture and the second posture in response to a control start signal from the second switch; and
- a fourth control means for inhibiting the control for transfer of the flexible top when the vehicle is shifted from said presumed standing state to said presumed running state after the flexible top starts transferring between the first posture and the second posture.

3. A flexible top apparatus as claimed in claim 1, further comprising:
- a second driving means for transferring the flexible top between the first posture and the second posture;
- a second switch for selectively instructing start of transferring the flexible top between the first posture and the second posture;
- a third control means for controlling the transfer of the flexible top between the first posture and the second posture in response to a control start signal from the second switch; and
- a fourth control means for continuing the control for transfer of the flexible top when the vehicle is shifted from said presumed standing state to said presumed running state after the flexible top starts transferring between the first posture and the second posture.

4. A flexible top apparatus as claimed in claim 2, wherein the third control means starts transferring said flexible top between said first posture and said second posture when the vehicle is in said presumed standing state.

5. A flexible top apparatus as claimed in claim 3, wherein the third control means starts transferring said flexible top between said first posture and said second posture when the vehicle is in said presumed standing state.

6. A flexible top apparatus as claimed in claim 3, wherein the third control means includes means for closing said flexible top from said second posture to said first posture regardless of said presumed standing state or said presumed running state.

7. A flexible top apparatus as claimed in claim 2, wherein the second driving means and the first driving means for transferring said flexible top between the second and the third posture are constituted by different electrically-driven motors.

8. A flexible top apparatus as claimed in claim 2, wherein the second driving means and said driving means for transferring said flexible top between the second posture and the third posture are driven by a common electrically-driven motor.

9. A flexible top apparatus as claimed in claim 1, wherein the flexible top is in a state in which it is longitudinally folded when it assumes the second posture.

10. A flexible top apparatus as claimed in claim 9, wherein the guide means comprises a pivotable link member.

11. A flexible top apparatus as claimed in claim 10, further comprising a hard board member, on which the flexible top in the second posture is placed, in a position nearby the rear header;

wherein the hard board member is mounted to the vehicle body through the link member; and wherein the flexible top is transferred between the second posture and the third posture, together with the hard board member, in accordance with a pivotal movement of the link member.

* * * * *